US 11,283,877 B2

United States Patent
Kentley-Klay et al.

(10) Patent No.: US 11,283,877 B2
(45) Date of Patent: Mar. 22, 2022

(54) SOFTWARE APPLICATION AND LOGIC TO MODIFY CONFIGURATION OF AN AUTONOMOUS VEHICLE

(71) Applicant: Zoox, Inc., Foster City, CA (US)

(72) Inventors: Timothy David Kentley-Klay, Stanford, CA (US); Rachad Youssef Gamara, San Francisco, CA (US)

(73) Assignee: Zoox, Inc., Foster City, CA (US)

(*) Notice: Subject to any disclaimer, the term of this patent is extended or adjusted under 35 U.S.C. 154(b) by 0 days.

(21) Appl. No.: 16/450,281

(22) Filed: Jun. 24, 2019

(65) Prior Publication Data

US 2019/0387060 A1    Dec. 19, 2019

Related U.S. Application Data

(63) Continuation of application No. 14/933,665, filed on Nov. 5, 2015, now Pat. No. 10,334,050, which is a
(Continued)

(51) Int. Cl.
*G06F 3/048* (2013.01)
*H04L 67/125* (2022.01)
(Continued)

(52) U.S. Cl.
CPC .......... *H04L 67/125* (2013.01); *G06F 3/0482* (2013.01); *G06F 3/04842* (2013.01);
(Continued)

(58) Field of Classification Search
CPC ..... H04L 67/125; H04L 29/00; G06F 3/0482; G06F 3/04842; G06F 3/04847; G06Q 10/00
(Continued)

(56) References Cited

U.S. PATENT DOCUMENTS

| 5,220,507 A | 6/1993 | Kirson |
| 5,558,370 A | 9/1996 | Behr |

(Continued)

FOREIGN PATENT DOCUMENTS

| CN | 1773568 A | 5/2006 |
| CN | 1786667 A | 6/2006 |

(Continued)

OTHER PUBLICATIONS

The European Office Action dated Dec. 20, 2019 for European Patent Application No. 16804949.2, a counterpart of U.S. Pat. No. 9,507,346, 4 pages.

Non Final Office Action dated Dec. 19, 2019 for U.S. Appl. No. 15/432,654 "Autonomous Vehicle Fleet Service and System" Kentley-Klay, 6 page.

Final Office Action dated Feb. 20, 2020 for U.S. Appl. No. 15/438,353 "Adaptive Mapping To Navigate Autonomous Vehicles Responsive To Physical Environment Changes", Levinson, 22 pages.

(Continued)

*Primary Examiner* — David Phantana-angkool
(74) *Attorney, Agent, or Firm* — Lee & Hayes, P.C.

(57) ABSTRACT

Various embodiments relate generally to autonomous vehicles and associated mechanical, electrical and electronic hardware, computer software and systems, and wired and wireless network communications to provide an autonomous vehicle fleet as a service. In particular, a method may include identifying a location of a user device associated with a user, transmitting a command to an autonomous vehicle system associated with an autonomous vehicle service to transit to the location, and providing information associated with the user device to the autonomous vehicle system, where the information includes configuration data to adapt one or more sub-systems of the autonomous vehicle. Sub-systems of the autonomous vehicle may include interior lighting, ambient sound, road handling, seating configura- (Continued)

tion, communication synchronization, and temperature control systems.

20 Claims, 50 Drawing Sheets

Related U.S. Application Data continuation-in-part of application No. 14/932,959, filed on Nov. 4, 2015, now Pat. No. 9,606,539, which is a continuation-in-part of application No. 14/932,963, filed on Nov. 4, 2015, now Pat. No. 9,612,123, which is a continuation-in-part of application No. 14/932,966, filed on Nov. 4, 2015, now Pat. No. 9,507,346, which is a continuation-in-part of application No. 14/756,995, filed on Nov. 4, 2015, now Pat. No. 9,958,864, which is a continuation-in-part of application No. 14/756,992, filed on Nov. 4, 2015, now Pat. No. 9,910,441.

(51) Int. Cl.
*G06F 3/0482* (2013.01)
*G06F 3/04842* (2022.01)
*G06F 3/04847* (2022.01)
*H04L 69/00* (2022.01)
*G06Q 10/00* (2012.01)
*G07C 5/00* (2006.01)
*B60Q 1/28* (2006.01)
*B60Q 1/30* (2006.01)

(52) U.S. Cl.
CPC ......... *G06F 3/04847* (2013.01); *G06Q 10/00* (2013.01); *H04L 29/00* (2013.01); *B60Q 1/28* (2013.01); *B60Q 1/30* (2013.01); *G07C 5/008* (2013.01)

(58) Field of Classification Search
USPC ........................................................ 715/735
See application file for complete search history.

(56) References Cited

U.S. PATENT DOCUMENTS

| | | |
|---|---|---|
| 5,959,552 A | 9/1999 | Cho |
| 6,122,572 A | 9/2000 | Yavnai |
| 6,301,542 B1 | 10/2001 | Kirchberger et al. |
| 6,374,168 B1 | 4/2002 | Fujii |
| 6,728,616 B1 | 4/2004 | Tabe |
| 7,036,128 B1 | 4/2006 | Julia et al. |
| 7,426,429 B2 | 9/2008 | Tabe |
| 8,123,642 B2 | 2/2012 | Ishikawa et al. |
| 8,126,642 B2 | 2/2012 | Trepagnier |
| 8,260,485 B1 | 9/2012 | Meuth et al. |
| 8,272,827 B2* | 9/2012 | Bufano ............. H01L 21/67379 414/217.1 |
| 8,392,064 B2 | 3/2013 | Thrun et al. |
| 8,434,919 B2 | 5/2013 | Schofield |
| 8,880,272 B1 | 11/2014 | Ferguson et al. |
| 8,914,182 B2 | 12/2014 | Casado et al. |
| 8,977,007 B1 | 3/2015 | Ferguson et al. |
| 8,989,053 B1* | 3/2015 | Skaaksrud ............. B65B 25/02 370/255 |
| 8,996,224 B1 | 3/2015 | Herbach et al. |
| 9,002,634 B1 | 4/2015 | Kalyanasundaram et al. |
| 9,008,952 B2 | 4/2015 | Caskey et al. |
| 9,120,484 B1 | 9/2015 | Ferguson et al. |
| 9,151,628 B1 | 10/2015 | Saito et al. |
| 9,171,268 B1 | 10/2015 | Penilla et al. |
| D743,978 S | 11/2015 | Amin |
| 9,194,168 B1 | 11/2015 | Lu et al. |
| 9,201,426 B1 | 12/2015 | Bonawitz |
| 9,373,149 B2 | 6/2016 | Abhyanker |
| 9,384,443 B2 | 7/2016 | Passot et al. |
| 9,395,727 B1 | 7/2016 | Smith et al. |
| 9,411,780 B1 | 8/2016 | Awad et al. |
| 9,459,620 B1 | 10/2016 | Schaffalitzky |
| 9,494,439 B1 | 11/2016 | Ross et al. |
| 9,495,874 B1 | 11/2016 | Zhu et al. |
| 9,507,346 B1 | 11/2016 | Levinson et al. |
| 9,547,309 B2 | 1/2017 | Ross et al. |
| 9,613,274 B2 | 4/2017 | Stevens et al. |
| 9,625,907 B2 | 4/2017 | Hu et al. |
| 9,646,428 B1 | 5/2017 | Konrardy et al. |
| 9,658,620 B1* | 5/2017 | Urmson ............... G05D 1/0055 |
| 9,667,710 B2* | 5/2017 | Wilbur .................... G06F 16/29 |
| 9,686,306 B2 | 6/2017 | Chizeck et al. |
| 9,714,089 B1 | 7/2017 | Louw et al. |
| 9,716,565 B2 | 7/2017 | Mandeville-Clarke et al. |
| 9,754,490 B2* | 9/2017 | Kentley ................ G06Q 50/30 |
| 9,760,090 B2 | 9/2017 | Shashua et al. |
| 9,813,541 B2 | 11/2017 | Elie et al. |
| 9,830,757 B2* | 11/2017 | Weicker .................. G07C 9/23 |
| 9,836,057 B2 | 12/2017 | Fairfield et al. |
| 9,849,784 B1 | 12/2017 | Chan et al. |
| 9,928,434 B1 | 3/2018 | Chan et al. |
| 9,939,817 B1* | 4/2018 | Kentley-Klay ........... B60L 3/04 |
| 9,940,834 B1 | 4/2018 | Konrardy et al. |
| 9,953,538 B1 | 4/2018 | Matthiesen et al. |
| 9,956,910 B2 | 5/2018 | McNew |
| 9,958,864 B2 | 5/2018 | Kentley-Klay et al. |
| 9,963,106 B1* | 5/2018 | Ricci ................... B60R 25/2018 |
| 9,989,645 B2 | 6/2018 | Donnelly |
| 10,012,990 B2 | 7/2018 | Rander |
| 10,033,814 B2* | 7/2018 | Kim ....................... H01L 23/528 |
| 10,048,683 B2* | 8/2018 | Levinson ................ G06Q 10/06 |
| 10,053,088 B1* | 8/2018 | Askeland ................ B60W 30/18 |
| 10,074,224 B2* | 9/2018 | Ho ....................... G07C 9/00563 |
| 10,089,537 B2* | 10/2018 | Nix ..................... G06K 9/00805 |
| 10,139,828 B2 | 11/2018 | Ho et al. |
| 10,147,325 B1* | 12/2018 | Copeland ................ H04W 4/02 |
| 10,150,448 B2* | 12/2018 | Huennekens .......... G08B 21/22 |
| 10,255,648 B2 | 4/2019 | Wengreen et al. |
| 10,259,471 B2 | 4/2019 | Sato et al. |
| 10,303,961 B1* | 5/2019 | Stoffel ..................... B60Q 3/76 |
| 10,361,802 B1 | 7/2019 | Hoffberg-Borghesani et al. |
| 10,415,983 B2* | 9/2019 | Ramalingam ....... G01C 21/3423 |
| 10,459,444 B1* | 10/2019 | Kentley-Klay ....... G05D 1/0221 |
| 10,477,159 B1 | 11/2019 | Fredinburg et al. |
| 10,518,785 B2* | 12/2019 | Nordbruch ........... B60W 30/06 |
| 10,556,568 B2* | 2/2020 | Boehm ................ G06K 9/00832 |
| 10,573,093 B2* | 2/2020 | Breed .................... G07C 5/008 |
| 10,579,788 B2* | 3/2020 | Dyer ..................... H04W 12/06 |
| 10,591,910 B2* | 3/2020 | Levinson ............... G01S 7/4972 |
| 10,598,504 B2* | 3/2020 | Oh ........................ B60R 25/257 |
| 10,605,613 B2* | 3/2020 | Houston ................ G08G 1/13 |
| 10,616,218 B2* | 4/2020 | Boehm ............ G06Q 20/40145 |
| 10,623,162 B2* | 4/2020 | Bugenhagen ......... H04L 5/0053 |
| 10,647,250 B1* | 5/2020 | Diehl ..................... G06Q 50/30 |
| 10,656,275 B1 | 5/2020 | Bills et al. |
| 10,712,750 B2* | 7/2020 | Kentley-Klay ......... G01S 7/497 |
| 10,740,863 B2* | 8/2020 | Iagnemma ........... G05D 1/0027 |
| 10,745,018 B2* | 8/2020 | Abendroth ......... G06K 9/00892 |
| 10,783,781 B2* | 9/2020 | Ootsuji ............. G08G 1/096725 |
| 10,887,155 B2* | 1/2021 | Keerthi .................. H04L 67/10 |
| 10,915,769 B2* | 2/2021 | Meng ................ G06K 9/00228 |
| 10,919,497 B1* | 2/2021 | DeLong ................ B60R 25/246 |
| 10,929,819 B2* | 2/2021 | Oz ........................ G06Q 10/20 |
| 10,970,571 B2* | 4/2021 | Meng ................ G06K 9/00845 |
| 10,981,497 B2* | 4/2021 | Lee ..................... G05D 1/0246 |
| 11,054,818 B2* | 7/2021 | Lavoie .................. G05D 1/021 |
| 11,072,311 B2* | 7/2021 | Luchner ................ B60W 50/08 |
| 11,106,218 B2* | 8/2021 | Levinson ........... G01C 21/3446 |
| 11,151,482 B2* | 10/2021 | Dyer ..................... G01C 21/343 |
| 2001/0029425 A1 | 10/2001 | Myr |
| 2002/0097145 A1 | 7/2002 | Tumey et al. |
| 2002/0131608 A1 | 9/2002 | Lobb et al. |
| 2004/0017073 A1 | 1/2004 | Pavlov et al. |
| 2004/0066316 A1 | 4/2004 | Ogawa |
| 2004/0068354 A1 | 4/2004 | Tabe |
| 2005/0182558 A1 | 8/2005 | Maruta |

(56) References Cited

U.S. PATENT DOCUMENTS

| | | |
|---|---|---|
| 2005/0216181 A1 | 9/2005 | Estkowski et al. |
| 2006/0064202 A1 | 3/2006 | Gutmann et al. |
| 2006/0089763 A1 | 4/2006 | Barrett et al. |
| 2006/0100871 A1 | 5/2006 | Choi et al. |
| 2006/0175116 A1 | 8/2006 | Friedman et al. |
| 2006/0207820 A1 | 9/2006 | Joshi et al. |
| 2006/0267799 A1 | 11/2006 | Mendelson |
| 2007/0093946 A1 | 4/2007 | Gideoni |
| 2007/0096447 A1 | 5/2007 | Tabe |
| 2007/0198145 A1 | 8/2007 | Norris et al. |
| 2007/0246927 A1 | 10/2007 | Okada |
| 2007/0273557 A1 | 11/2007 | Baillot |
| 2008/0033645 A1 | 2/2008 | Levinson et al. |
| 2008/0084283 A1 | 4/2008 | Kalik |
| 2008/0097699 A1 | 4/2008 | Ono |
| 2008/0320421 A1 | 12/2008 | Demaris et al. |
| 2009/0036090 A1 | 2/2009 | Cho et al. |
| 2009/0240647 A1 | 9/2009 | Green et al. |
| 2009/0248587 A1* | 10/2009 | Van Buskirk .. G06Q 10/063112 705/80 |
| 2009/0276149 A1 | 11/2009 | Kauffman et al. |
| 2009/0306989 A1 | 12/2009 | Kaji |
| 2009/0326713 A1 | 12/2009 | Moriya |
| 2010/0017046 A1 | 1/2010 | Cheung et al. |
| 2010/0045482 A1 | 2/2010 | Strauss |
| 2010/0082193 A1 | 4/2010 | Chiappetta |
| 2010/0106356 A1 | 4/2010 | Trepagnier et al. |
| 2010/0153111 A1 | 6/2010 | Hirai et al. |
| 2010/0228533 A1 | 9/2010 | Cummings et al. |
| 2010/0256852 A1 | 10/2010 | Mudalige |
| 2010/0286845 A1 | 11/2010 | Rekow et al. |
| 2011/0029235 A1 | 2/2011 | Berry |
| 2011/0029301 A1 | 2/2011 | Han et al. |
| 2011/0035086 A1 | 2/2011 | Kim et al. |
| 2011/0098922 A1 | 4/2011 | Ibrahim |
| 2011/0106615 A1 | 5/2011 | Churchill et al. |
| 2011/0130111 A1 | 6/2011 | Crandall et al. |
| 2011/0190972 A1 | 8/2011 | Timmons et al. |
| 2011/0288684 A1 | 11/2011 | Farlow et al. |
| 2012/0029817 A1 | 2/2012 | Khorashadi et al. |
| 2012/0083960 A1 | 4/2012 | Zhu et al. |
| 2012/0086573 A1 | 4/2012 | Bischoff et al. |
| 2012/0136561 A1 | 5/2012 | Barker et al. |
| 2012/0158280 A1 | 6/2012 | Ravenscroft |
| 2012/0163670 A1 | 6/2012 | Eaton et al. |
| 2012/0226391 A1 | 9/2012 | Fryer et al. |
| 2012/0256448 A1 | 10/2012 | Yasui et al. |
| 2013/0046421 A1 | 2/2013 | El Fassi et al. |
| 2013/0054133 A1 | 2/2013 | Lewis et al. |
| 2013/0246301 A1 | 9/2013 | Radhakrishnan et al. |
| 2013/0268138 A1 | 10/2013 | Moughler et al. |
| 2013/0304514 A1 | 11/2013 | Hyde et al. |
| 2013/0317693 A1 | 11/2013 | Jefferies et al. |
| 2013/0338854 A1 | 12/2013 | Yamamoto |
| 2013/0338856 A1 | 12/2013 | Yelland et al. |
| 2014/0032012 A1 | 1/2014 | Joshi et al. |
| 2014/0032049 A1 | 1/2014 | Moshchuk et al. |
| 2014/0074339 A1 | 3/2014 | Casado et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0136414 A1 | 5/2014 | Abhyanker |
| 2014/0142830 A1 | 5/2014 | Bernzen et al. |
| 2014/0185880 A1 | 7/2014 | Fairfield et al. |
| 2014/0188347 A1 | 7/2014 | Tabe |
| 2014/0195072 A1 | 7/2014 | Graumann |
| 2014/0214255 A1 | 7/2014 | Dolgov et al. |
| 2014/0214260 A1 | 7/2014 | Eckert et al. |
| 2014/0220923 A1 | 8/2014 | Shoshan et al. |
| 2014/0244151 A1 | 8/2014 | Matsubara et al. |
| 2014/0257661 A1 | 9/2014 | Schulman et al. |
| 2014/0278074 A1 | 9/2014 | Annapureddy et al. |
| 2014/0303827 A1 | 10/2014 | Dolgov et al. |
| 2014/0309833 A1 | 10/2014 | Ferguson et al. |
| 2014/0309866 A1* | 10/2014 | Ricci ........................ G06F 16/25 701/36 |
| 2014/0333468 A1 | 11/2014 | Zhu et al. |
| 2014/0336935 A1 | 11/2014 | Zhu et al. |
| 2014/0358353 A1 | 12/2014 | Ibanez-Guzman et al. |
| 2014/0358427 A1 | 12/2014 | Fuhrman |
| 2014/0365228 A1 | 12/2014 | Ng-Thow-Hing et al. |
| 2015/0025708 A1 | 1/2015 | Anderson |
| 2015/0039157 A1 | 2/2015 | Wolfe et al. |
| 2015/0039391 A1 | 2/2015 | Hershkovitz et al. |
| 2015/0057871 A1 | 2/2015 | Ono et al. |
| 2015/0081169 A1* | 3/2015 | Pisz ................... B60H 1/00742 701/36 |
| 2015/0091374 A1 | 4/2015 | Lenius et al. |
| 2015/0094850 A1 | 4/2015 | Passot et al. |
| 2015/0127224 A1 | 5/2015 | Tabe |
| 2015/0127239 A1 | 5/2015 | Breed et al. |
| 2015/0149088 A1 | 5/2015 | Attard et al. |
| 2015/0160024 A1 | 6/2015 | Fowe |
| 2015/0185034 A1 | 7/2015 | Abhyanker |
| 2015/0202770 A1 | 7/2015 | Patron et al. |
| 2015/0202962 A1 | 7/2015 | Habashima et al. |
| 2015/0203107 A1 | 7/2015 | Lippman |
| 2015/0234387 A1 | 8/2015 | Mullan et al. |
| 2015/0248131 A1 | 9/2015 | Fairfield et al. |
| 2015/0254986 A1* | 9/2015 | Fairfield ............... G05D 1/0088 707/687 |
| 2015/0258928 A1 | 9/2015 | Goto et al. |
| 2015/0268665 A1 | 9/2015 | Ludwick et al. |
| 2015/0271290 A1 | 9/2015 | Tao et al. |
| 2015/0292894 A1 | 10/2015 | Goddard et al. |
| 2015/0298636 A1 | 10/2015 | Furst |
| 2015/0331422 A1 | 11/2015 | Hartung et al. |
| 2015/0336502 A1 | 11/2015 | Hillis et al. |
| 2015/0336524 A1 | 11/2015 | Larner et al. |
| 2015/0338226 A1 | 11/2015 | Mason et al. |
| 2015/0338849 A1 | 11/2015 | Nemec et al. |
| 2015/0338852 A1 | 11/2015 | Ramanujam |
| 2015/0339928 A1 | 11/2015 | Ramanujam |
| 2015/0346724 A1 | 12/2015 | Jones et al. |
| 2015/0346727 A1 | 12/2015 | Ramanujam |
| 2015/0348221 A1 | 12/2015 | Pedersen et al. |
| 2015/0356368 A1 | 12/2015 | Liu et al. |
| 2015/0359032 A1 | 12/2015 | Menard et al. |
| 2015/0369569 A1 | 12/2015 | Jahne et al. |
| 2015/0370251 A1 | 12/2015 | Siegel et al. |
| 2015/0371631 A1 | 12/2015 | Weinstein et al. |
| 2015/0375764 A1 | 12/2015 | Rajendran et al. |
| 2016/0001720 A1 | 1/2016 | Vadgama et al. |
| 2016/0004904 A1 | 1/2016 | Senechal et al. |
| 2016/0009291 A1 | 1/2016 | Pallett et al. |
| 2016/0016315 A1 | 1/2016 | Kuffner, Jr. et al. |
| 2016/0027452 A1 | 1/2016 | Kalinli-Akbacak et al. |
| 2016/0033963 A1 | 2/2016 | Noh |
| 2016/0071278 A1 | 3/2016 | Leonard et al. |
| 2016/0107703 A1 | 4/2016 | Briceno et al. |
| 2016/0110572 A1 | 4/2016 | Kalhous et al. |
| 2016/0159402 A1 | 6/2016 | Nakaya et al. |
| 2016/0159407 A1 | 6/2016 | Holmstrom et al. |
| 2016/0161266 A1 | 6/2016 | Crawford et al. |
| 2016/0165775 P1 | 6/2016 | Maillard et al. |
| 2016/0165786 P1 | 6/2016 | Giesen |
| 2016/0171521 A1 | 6/2016 | Ramirez et al. |
| 2016/0189544 A1 | 6/2016 | Ricci |
| 2016/0209220 A1 | 7/2016 | Laetz |
| 2016/0247106 A1 | 8/2016 | Dalloro et al. |
| 2016/0247109 A1 | 8/2016 | Scicluna et al. |
| 2016/0251016 A1 | 9/2016 | Pallett et al. |
| 2016/0267734 A1 | 9/2016 | Hamada et al. |
| 2016/0275801 A1 | 9/2016 | Kopardekar |
| 2016/0301698 A1 | 10/2016 | Katara et al. |
| 2016/0334230 A1 | 11/2016 | Ross et al. |
| 2016/0334797 A1 | 11/2016 | Ross et al. |
| 2016/0342145 A1 | 11/2016 | Westcott |
| 2016/0351057 A1 | 12/2016 | Elmasry et al. |
| 2016/0358391 A1 | 12/2016 | Drako et al. |
| 2016/0358475 A1 | 12/2016 | Prokhorov |
| 2016/0370801 A1 | 12/2016 | Fairfield et al. |
| 2017/0060234 A1 | 3/2017 | Sung |

(56) References Cited

U.S. PATENT DOCUMENTS

| | | | |
|---|---|---|---|
| 2017/0067747 A1 | 3/2017 | Ricci | |
| 2017/0084175 A1 | 3/2017 | Sedlik et al. | |
| 2017/0090480 A1 | 3/2017 | Ho et al. | |
| 2017/0092028 A1* | 3/2017 | Weicker | G07C 9/00309 |
| 2017/0115125 A1 | 4/2017 | Outwater et al. | |
| 2017/0123419 A1 | 5/2017 | Levinson et al. | |
| 2017/0123422 A1 | 5/2017 | Kentley et al. | |
| 2017/0124476 A1 | 5/2017 | Levinson et al. | |
| 2017/0126810 A1 | 5/2017 | Kentley et al. | |
| 2017/0132934 A1 | 5/2017 | Kentley et al. | |
| 2017/0144630 A1 | 5/2017 | Katou et al. | |
| 2017/0158023 A1 | 6/2017 | Stevanovic et al. | |
| 2017/0162057 A1 | 6/2017 | Ross et al. | |
| 2017/0248963 A1 | 8/2017 | Levinson et al. | |
| 2017/0248964 A1 | 8/2017 | Kentley et al. | |
| 2017/0277191 A1 | 9/2017 | Fairfield et al. | |
| 2017/0297571 A1 | 10/2017 | Sorstedt et al. | |
| 2017/0316333 A1 | 11/2017 | Levinson et al. | |
| 2017/0327082 A1* | 11/2017 | Kamhi | B60R 25/102 |
| 2018/0017399 A1 | 1/2018 | Rolnik | |
| 2018/0033310 A1 | 2/2018 | Kentley-Klay et al. | |
| 2018/0074495 A1* | 3/2018 | Myers | G05D 1/0066 |
| 2018/0075565 A1* | 3/2018 | Myers | G06Q 30/02 |
| 2018/0082172 A1 | 3/2018 | Patel et al. | |
| 2018/0136644 A1 | 5/2018 | Levinson et al. | |
| 2018/0136651 A1* | 5/2018 | Levinson | G05D 1/0027 |
| 2018/0141562 A1* | 5/2018 | Singhal | B60W 30/0956 |
| 2018/0189717 A1 | 7/2018 | Cao | |
| 2018/0194356 A1 | 7/2018 | Richards et al. | |
| 2018/0211523 A1 | 7/2018 | Ashida et al. | |
| 2018/0216958 A1 | 8/2018 | Park | |
| 2018/0290627 A1 | 10/2018 | Hariri et al. | |
| 2018/0322775 A1* | 11/2018 | Chase | G01C 21/3438 |
| 2018/0329411 A1 | 11/2018 | Levinson et al. | |
| 2018/0348023 A1 | 12/2018 | Klein et al. | |
| 2019/0012909 A1 | 1/2019 | Mintz | |
| 2019/0056742 A1 | 2/2019 | Ho et al. | |
| 2019/0227553 A1 | 7/2019 | Kentley-Klay et al. | |
| 2019/0299933 A1 | 10/2019 | Suzuki et al. | |
| 2019/0361432 A1 | 11/2019 | Levinson et al. | |
| 2019/0385025 A1* | 12/2019 | McMichael | G06K 9/00791 |
| 2019/0387060 A1* | 12/2019 | Kentley-Klay | H04L 67/306 |
| 2020/0004241 A1 | 1/2020 | Levinson et al. | |
| 2020/0371533 A1 | 11/2020 | Kentley-Klay et al. | |

FOREIGN PATENT DOCUMENTS

| | | |
|---|---|---|
| CN | 101305263 A | 11/2008 |
| CN | 101315285 A | 12/2008 |
| CN | 101641610 A | 2/2010 |
| CN | 101825470 A | 9/2010 |
| CN | 101981080 A | 2/2011 |
| CN | 102089624 A | 6/2011 |
| CN | 102202257 A | 9/2011 |
| CN | 102265118 A | 11/2011 |
| CN | 103260013 A | 8/2013 |
| CN | 103465749 A | 12/2013 |
| CN | 103528593 A | 1/2014 |
| CN | 103907147 A | 7/2014 |
| CN | 104041172 A | 9/2014 |
| CN | 104812645 A | 7/2015 |
| CN | 104870288 A | 8/2015 |
| CN | 104960509 A | 10/2015 |
| CN | 104991554 A | 10/2015 |
| CN | 105009175 A | 10/2015 |
| EP | 2908202 A1 | 8/2015 |
| JP | 2003151083 A | 5/2003 |
| JP | 2006113836 A | 4/2006 |
| JP | 2007322172 A | 12/2007 |
| JP | 2008195289 A | 8/2008 |
| JP | 2009291540 A | 12/2009 |
| JP | 2010066782 A | 3/2010 |
| JP | 2011225212 A | 11/2011 |
| JP | 2014516441 A | 7/2014 |
| JP | 2015001869 A | 1/2015 |
| JP | 2015092320 A | 5/2015 |
| JP | 2019501468 A | 1/2019 |
| WO | WO2014152554 A1 | 9/2014 |

OTHER PUBLICATIONS

Chinese Office Action dated Dec. 8, 2020 for Chinese Patent Application No. 201680064769.7, a counterpart foreign application of U.S. Pat. No. 9,632,502, 6 pages.
Chinese Office Action dated Dec. 7, 2020 for Chinese Patent Application No. 201680064768.2, a counterpart foreign application of U.S. Pat. No. 9,507,346, 5 pages.
The Chinese Office Action dated Sep. 29, 2020 for Chinese Patent Application No. 201680064836.5, a counterpart of U.S. Pat. No. 9,612,123, 11 pages.
Non Final Office Action dated Oct. 8, 2020 for U.S. Appl. No. 15/498,144, "Automated Extraction of Semantic Information To Enhance Incremental Mapping Modifications for Robotic Vehicles", Levinson, 34 pages.
Non Final Office Action dated Nov. 17, 2020 for U.S. Appl. No. 16/518,921, "Machine-Learning Systems and Techniques To Optimize Teleoperation And/Or Planner Decisions", Levinson, 8 pages.
Sayed, et al., "A Novel Approach for Diagnosing Road Safety Issues Using Automated Computer Vision Techniques", 16th Road Safety on Four Continents Conference, Beijing, China, May 15-17, 2013, 13 pages.
Chinese Office Action dated Jun. 3, 2021 for Chinese Patent Application No. 201680064679.8, a foreign counterpart to U.S. Pat. No. 9,754,490, 21 pages.
Chinese Office Action dated Jul. 5, 2021 for Chinese Patent Application No. 201680064769.7, a foreign counterpart to U.S. Pat. No. 9,632,502, 11 pages.
The European Office Action dated Feb. 18, 2021 for European Patent Application No. 16862831.1, a counterpart of U.S. Pat. No. 9,754,490, 5 pages.
European Office Action dated May 12, 2021 for European Patent Application No. 16804949.2, a counterpart foreign application of U.S. Pat. No. 9,507,346, 4 pages.
European Office Action dated May 28, 2021 for European Patent Application No. 16862996.2, a counterpart foreign application of U.S. Pat. No. 9,632,502, 7 pages.
Japanese Office Action dated Mar. 2, 2021 for Japanese Patent Application No. 2018-544028, a counterpart foreign application of U.S. Pat. No. 9,507,346, 8 pages.
The Japanese Office Action dated Feb. 9, 2021 for Japanese Patent Application No. 2018-543270, a counterpart of U.S. Pat. No. 9,612,123, 8 pages.
The Japanese Office Action dated Mar. 2, 2021 for Japanese Patent Application No. 2018-544029, a counterpart of U.S. Pat. No. 9,754,490, 8 pages.
Office Action for U.S. Appl. No. 16/372,104, dated Feb. 1, 2021, Kentley-Klay, "Interactive Autonomous Vehicle Command Controller", 12 pages.
Office Action for U.S. Appl. No. 15/498,144, dated Apr. 23, 2021, Levinson, "Automated Extraction of Semantic Information to Enhance Incremental Mapping Modifications for Robotic Vehicles", 37 pages.
Office Action for U.S. Appl. No. 16/372,104, dated Jun. 1, 2021, Kentley-Klay, "Interactive Autonomous Vehicle Command Controller", 13 pages.
Japanese Office Action dated Oct. 12, 2021 for Japanese Patent Application No. 2018-544029, a foreign counterpart to U.S. Pat. No. 9,754,490, 6 pages.
Office Action for U.S. Appl. No. 16/557,899, dated Aug. 9, 2021, Levinson, "Teleoperation System and Method for Trajectory Modification of Autonomous Vehicles ", 15 pages.
Office Action for U.S. Appl. No. 16/372,104, dated Sep. 14, 2021, Kentley-Kay, "Interactive Autonomous Vehicle Command Controller", 11 pages.

* cited by examiner

SOFTWARE APPLICATION AND LOGIC TO MODIFY CONFIGURATION OF AN AUTONOMOUS VEHICLE

CROSS-REFERENCE TO RELATED APPLICATIONS

This application is a continuation of, and claims priority to and the benefit of, U.S. patent application Ser. No. 14/933,665, filed Nov. 5, 2015, which is a continuation-in-part of, and claims priority to and the benefit of: U.S. patent application Ser. No. 14/932,959 filed Nov. 4, 2015, now U.S. Pat. No. 9,606,539, issued Mar. 28, 2017; U.S. patent application Ser. No. 14/932,963 filed Nov. 4, 2015, now U.S. Pat. No. 9,612,123, issued Apr. 4, 2017; U.S. Patent application Ser. No. 14/932,966 filed Nov. 4, 2015, now U.S. Pat. No. 9,507,346, issued Nov. 29, 2016; U.S. Patent Application No. 14,756,995 filed on Nov. 4, 2015, now U.S. Pat. No. 9,958,864, issued May 1, 2018; U.S. patent application Ser. No. 14/756,992 filed on Nov. 4, 2015, now U.S. Pat. No. 9,910,441, issued Mar. 6, 2018, and which is also related to: U.S. patent application Ser. No. 14/932,940 filed Nov. 4, 2015 entitled "AUTOMATED EXTRACTION OF SEMANTIC INFORMATION TO ENHANCE INCREMENTAL MAPPING MODIFICATIONS FOR ROBOTIC VEHICLES," U.S. patent application Ser. No. 14/933,602 filed Nov. 5, 2015 entitled "SYSTEMS AND METHOD TO OPTIMIZE NAVIGATION OF AUTONOMOUS VEHICLE TELEOPERATION AND PLANNING LOGIC," U.S. patent application Ser. No. 14/757,016 filed Nov. 5, 2015 entitled "SIMULATION SYSTEM AND METHODS FOR AUTONOMOUS VEHICLES," U.S. patent application Ser. No. 14/933,469 filed Nov. 5, 2015, now U.S. Pat. No. 9,754,490, issued Sep. 5, 2017 entitled "SOFTWARE APPLICATION TO REQUEST AND CONTROL AN AUTONOMOUS VEHICLE SERVICE," U.S. patent application Ser. No. 14/756,993 filed Nov. 4, 2015, now U.S. Pat. No. 9,878,664, issued Jan. 30, 2018 entitled "METHOD FOR ROBOTIC VEHICLE COMMUNICATION WITH AN EXTERNAL ENVIRONMENT VIA ACOUSTIC BEAM FORMING," U.S. patent application Ser. No. 14/756,991 filed Nov. 4, 2015, now U.S. Pat. No. 9,720,415, issued Aug. 1, 2017 entitled "SENSOR-BASED OBJECT-DETECTION OPTIMIZATION FOR AUTONOMOUS VEHICLES," U.S. patent application Ser. No. 14/756,996 filed Nov. 4, 2015, now U.S. Pat. No. 9,916,703, issued Mar. 13, 2018 entitled "CALIBRATION FOR AUTONOMOUS VEHICLE OPERATION," U.S. patent application Ser. No. 14/932,948 filed Nov. 4, 2015 entitled "ACTIVE LIGHTING CONTROL FOR COMMUNICATING A STATE OF AN AUTONOMOUS VEHICLE TO ENTITIES IN A SURROUNDING ENVIRONMENT," U.S. patent application Ser. No. 14/933,706 filed Nov. 5, 2015, now U.S. Pat. No. 10,248,119, issued Apr. 2, 2019 entitled "INTERACTIVE AUTONOMOUS VEHICLE COMMAND CONTROLLER," U.S. patent application Ser. No. 14/932,958 filed Nov. 4, 2015, now U.S. Pat. No. 9,494,940, issued Nov. 15, 2016 entitled "QUADRANT CONFIGURATION OF ROBOTIC VEHICLES," and U.S. patent application Ser. No. 14/932,962 filed Nov. 4, 2015, now U.S. Pat. No. 9,630,619, issued Apr. 25 2017 entitled "ROBOTIC VEHICLE ACTIVE SAFETY SYSTEMS AND METHODS," all of which are hereby incorporated by reference in their entirety for all purposes.

FIELD

Various embodiments relate generally to autonomous vehicles and associated mechanical, electrical and electronic hardware, computer software and systems, and wired and wireless network communications to request and control an autonomous vehicle service.

BACKGROUND

A variety of approaches to developing driverless vehicles focus predominately on automating conventional vehicles (e.g., manually-driven automotive vehicles) with an aim toward producing driverless vehicles for consumer purchase. For example, a number of automotive companies and affiliates are modifying conventional automobiles and control mechanisms, such as steering, to provide consumers with an ability to own a vehicle that may operate without a driver. In some approaches, a conventional driverless vehicle performs safety-critical driving functions in some conditions, but requires a driver to assume control (e.g., steering, etc.) should the vehicle controller fail to resolve certain issues that might jeopardize the safety of the occupants.

Although functional, conventional driverless vehicles typically have a number of drawbacks. For example, a large number of driverless cars under development have evolved from vehicles requiring manual (i.e., human-controlled) steering and other like automotive functions. Therefore, a majority of driverless cars are based on a paradigm that a vehicle is to be designed to accommodate a licensed driver, for which a specific seat or location is reserved within the vehicle. As such, driverless vehicles are designed suboptimally and generally forego opportunities to simplify vehicle design and conserve resources (e.g., reducing costs of producing a driverless vehicle). Other drawbacks are also present in conventional driverless vehicles.

Other drawbacks are also present in conventional transportation services, which are not well-suited for managing, for example, inventory of vehicles effectively due to the common approaches of providing conventional transportation and ride-sharing services. In one conventional approach, passengers are required to access a mobile application to request transportation services via a centralized service that assigns a human driver and vehicle (e.g., under private ownership) to a passenger. With the use of differently-owned vehicles, maintenance of private vehicles and safety systems generally go unchecked. In another conventional approach, some entities enable ride-sharing for a group of vehicles by allowing drivers, who enroll as members, access to vehicles that are shared among the members. This approach is not well-suited to provide for convenient transportation services as drivers need to pick up and drop off shared vehicles at specific locations, which typically are rare and sparse in city environments, and require access to relatively expensive real estate (i.e., parking lots) at which to park ride-shared vehicles. In the above-described conventional approaches, the traditional vehicles used to provide transportation services are generally under-utilized, from an inventory perspective, as the vehicles are rendered immobile once a driver departs. Further, ride-sharing approaches (as well as individually-owned vehicle transportation services) generally are not well-suited to rebalance inventory to match demand of transportation services to accommodate usage and typical travel patterns. Note, too, that some conventionally-described vehicles having limited self-driving automation capabilities also are not well-suited to rebalance inventories as a human driver generally may be required. Examples of vehicles having limited self-driving automation capabilities are vehicles designated as Level 3

("L3") vehicles, according to the U.S. Department of Transportation's National Highway Traffic Safety Administration ("NHTSA").

As another drawback, typical approaches to driverless vehicles are generally not well-suited to detect and navigate vehicles relative to interactions (e.g., social interactions) between a vehicle-in-travel and other drivers of vehicles or individuals. For example, some conventional approaches are not sufficiently able to identify pedestrians, cyclists, etc., and associated interactions, such as eye contact, gesturing, and the like, for purposes of addressing safety risks to occupants of a driverless vehicles, as well as drivers of other vehicles, pedestrians, etc.

Thus, what is needed is a solution for facilitating an implementation of autonomous vehicles, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
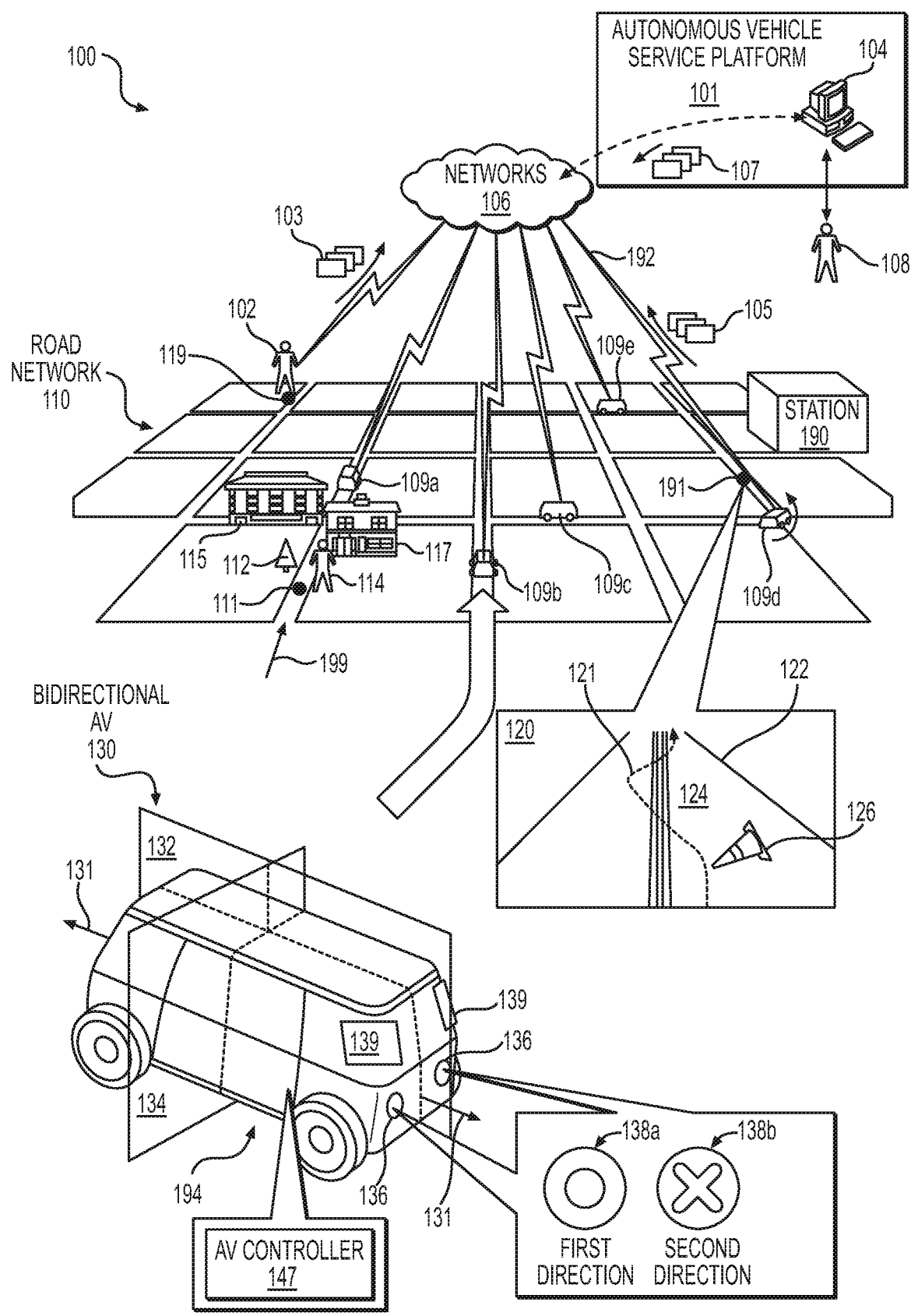
FIG. 1 is a diagram depicting implementation of a fleet of autonomous vehicles that are communicatively networked to an autonomous vehicle service platform, according to some embodiments.

FIG. 1 is a diagram depicting an implementation of a fleet of autonomous vehicles that are communicatively networked to an autonomous vehicle service platform, according to some embodiments. Diagram 100 depicts a fleet of autonomous vehicles 109 (e.g., one or more of autonomous vehicles 109a to 109e) operating as a service, each autonomous vehicle 109 being configured to self-drive a road network 110 and establish a communication link 192 with an autonomous vehicle service platform 101. In examples in which a fleet of autonomous vehicles 109 constitutes a service, a user 102 may transmit a request 103 for autonomous transportation via one or more networks 106 to autonomous vehicle service platform 101. In response, autonomous vehicle service platform 101 may dispatch one of autonomous vehicles 109 to transport user 102 autonomously from geographic location 119 to geographic location 111. Autonomous vehicle service platform 101 may dispatch an autonomous vehicle from a station 190 to geographic location 119, or may divert an autonomous vehicle 109c, already in transit (e.g., without occupants), to service the transportation request for user 102. Autonomous vehicle service platform 101 may be further configured to divert an autonomous vehicle 109c in transit, with passengers, responsive to a request from user 102 (e.g., as a passenger). In addition, autonomous vehicle service platform 101 may be configured to reserve an autonomous vehicle 109c in transit, with passengers, for diverting to service a request of user 102 subsequent to dropping off existing passengers. Note that multiple autonomous vehicle service platforms 101 (not shown) and one or more stations 190 may be implemented to service one or more autonomous vehicles 109 in connection with road network 110. One or more stations 190 may be configured to store, service, manage, and/or maintain an inventory of autonomous vehicles 109 (e.g., station 190 may include one or more computing devices implementing autonomous vehicle service platform 101).

According to some examples, at least some of autonomous vehicles 109a to 109e are configured as bidirectional autonomous vehicles, such as bidirectional autonomous vehicle ("AV") 130. Bidirectional autonomous vehicle 130 may be configured to travel in either direction principally along, but not limited to, a longitudinal axis 131. Accordingly, bidirectional autonomous vehicle 130 may be configured to implement active lighting external to the vehicle to alert others (e.g., other drivers, pedestrians, cyclists, etc.) in the adjacent vicinity, and a direction in which bidirectional autonomous vehicle 130 is traveling. For example, active sources of light 136 may be implemented as active lights 138a when traveling in a first direction, or may be implemented as active lights 138b when traveling in a second direction. Active lights 138a may be implemented using a first subset of one or more colors, with optional animation (e.g., light patterns of variable intensities of light or color that may change over time). Similarly, active lights 138b may be implemented using a second subset of one or more colors and light patterns that may be different than those of active lights 138a. For example, active lights 138a may be implemented using white-colored lights as "headlights," whereas active lights 138b may be implemented using red-colored lights as "taillights." Active lights 138a and 138b, or portions thereof, may be configured to provide other light-related functionalities, such as provide "turn signal indication" functions (e.g., using yellow light). According to various examples, logic in autonomous vehicle 130 may be configured to adapt active lights 138a and 138b to comply with various safety requirements and traffic regulations or laws for any number of jurisdictions.

In some embodiments, bidirectional autonomous vehicle 130 may be configured to have similar structural elements and components in each quad portion, such as quad portion 194. The quad portions are depicted, at least in this example, as portions of bidirectional autonomous vehicle 130 defined by the intersection of a plane 132 and a plane 134, both of which pass through the vehicle to form two similar halves on each side of planes 132 and 134. Further, bidirectional autonomous vehicle 130 may include an autonomous vehicle controller 147 that includes logic (e.g., hardware or software, or as combination thereof) that is configured to control a predominate number of vehicle functions, including driving control (e.g., propulsion, steering, etc.) and active sources 136 of light, among other functions. Bidirectional autonomous vehicle 130 also includes a number of sensors 139 disposed at various locations on the vehicle (other sensors are not shown).

Autonomous vehicle controller 147 may be further configured to determine a local pose (e.g., local position) of an autonomous vehicle 109 and to detect external objects relative to the vehicle. For example, consider that bidirectional autonomous vehicle 130 is traveling in the direction 119 in road network 110. A localizer (not shown) of autonomous vehicle controller 147 can determine a local pose at the geographic location 111. As such, the localizer may use acquired sensor data, such as sensor data associated with surfaces of buildings 115 and 117, which can be compared against reference data, such as map data (e.g., 3D map data, including reflectance data) to determine a local pose. Further, a perception engine (not shown) of autonomous vehicle controller 147 may be configured to detect, classify, and predict the behavior of external objects, such as external object 112 (a "tree") and external object 114 (a "pedestrian"). Classification of such external objects may broadly classify objects as static objects, such as external object 112, and dynamic objects, such as external object 114. The localizer and the perception engine, as well as other components of the AV controller 147, collaborate to cause autonomous vehicles 109 to drive autonomously.

According to some examples, autonomous vehicle service platform 101 is configured to provide teleoperator services should an autonomous vehicle 109 request teleoperation. For example, consider that an autonomous vehicle controller 147 in autonomous vehicle 109d detects an object 126 obscuring a path 124 on roadway 122 at point 191, as depicted in inset 120. If autonomous vehicle controller 147 cannot ascertain a path or trajectory over which vehicle 109d may safely transit with a relatively high degree of certainty, then autonomous vehicle controller 147 may transmit request message 105 for teleoperation services. In response, a teleoperator computing device 104 may receive instructions from a teleoperator 108 to perform a course of action to successfully (and safely) negotiate obstacles 126. Response data 107 then can be transmitted back to autonomous vehicle 109d to cause the vehicle to, for example, safely cross a set of double lines as it transits along the alternate path 121. In some examples, teleoperator computing device 104 may generate a response identifying geographic areas to exclude from planning a path. In particular, rather than provide a path to follow, a teleoperator 108 may define areas or locations that the autonomous vehicle must avoid.

In view of the foregoing, the structures and/or functionalities of autonomous vehicle 130 and/or autonomous vehicle controller 147, as well as their components, can perform real-time (or near real-time) trajectory calculations through autonomous-related operations, such as localization and perception, to enable autonomous vehicles 109 to self-drive.

In some cases, the bidirectional nature of bidirectional autonomous vehicle 130 provides for a vehicle that has quad portions 194 (or any other number of symmetric portions) that are similar or are substantially similar to each other. Such symmetry reduces complexity of design and decreases relatively the number of unique components or structures, thereby reducing inventory and manufacturing complexities. For example, a drivetrain and wheel system may be disposed in any of the quad portions 194. Further, autonomous vehicle controller 147 is configured to invoke teleoperation services to reduce the likelihood that an autonomous vehicle 109 is delayed in transit while resolving an event or issue that may otherwise affect the safety of the occupants. In some cases, the visible portion of road network 110 depicts a geo-fenced region that may limit or otherwise control the movement of autonomous vehicles 109 to the road network shown in FIG. 1. According to various examples, autonomous vehicle 109, and a fleet thereof, may be configurable to operate as a level 4 ("full self-driving automation," or L4) vehicle that can provide transportation on demand with the convenience and privacy of point-to-point personal mobility while providing the efficiency of shared vehicles. In some examples, autonomous vehicle 109, or any autonomous vehicle described herein, may be configured to omit a steering wheel or any other mechanical means of providing manual (i.e., human-controlled) steering for autonomous vehicle 109. Further, autonomous vehicle 109, or any autonomous vehicle described herein, may be configured to omit a seat or location reserved within the vehicle for an occupant to engage a steering wheel.

Figure 2:
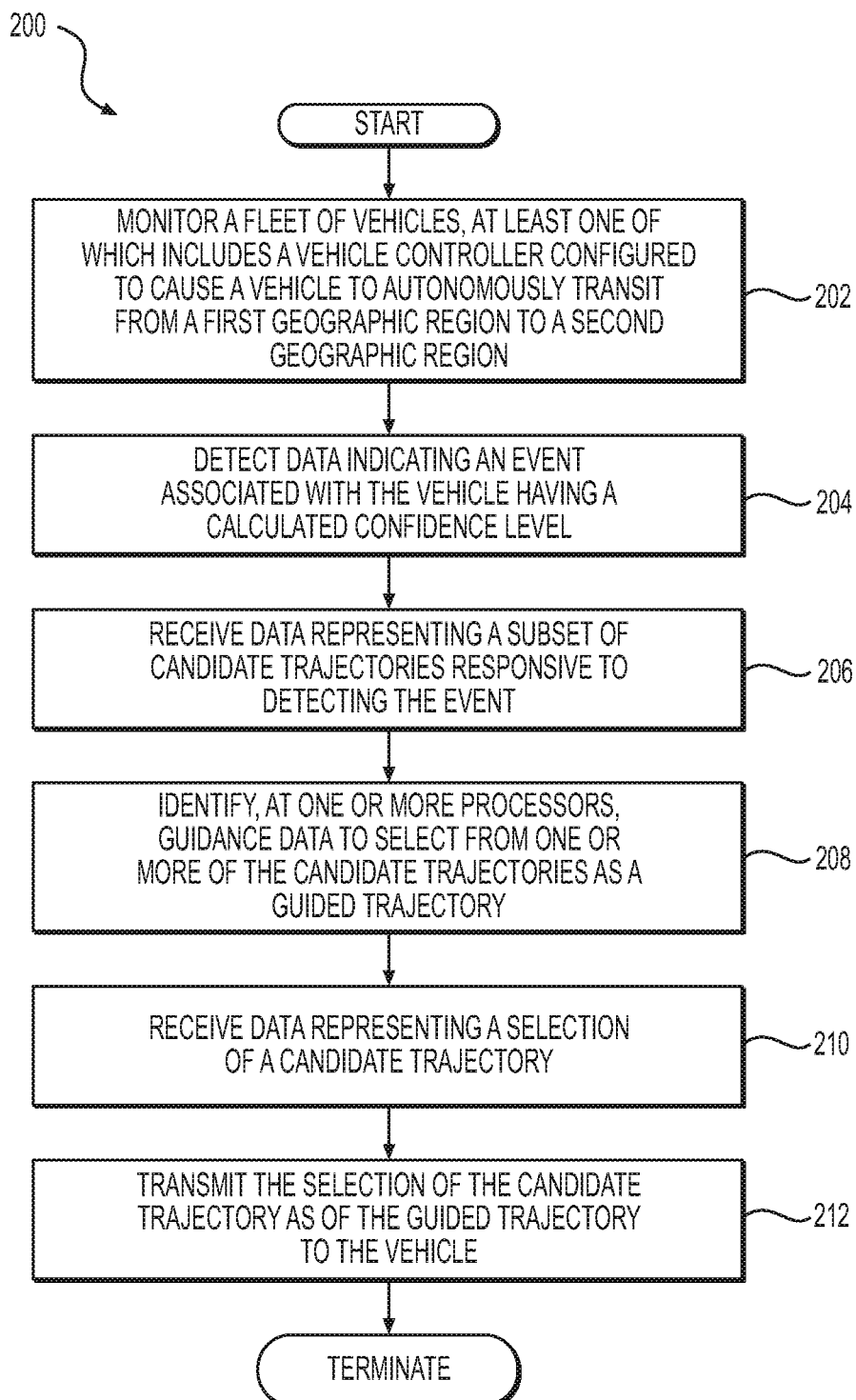
FIG. 2 is an example of a flow diagram to monitor a fleet of autonomous vehicles, according to some embodiments.

FIG. 2 is an example of a flow diagram to monitor a fleet of autonomous vehicles, according to some embodiments. At 202, flow 200 begins when a fleet of autonomous vehicles are monitored. At least one autonomous vehicle includes an autonomous vehicle controller configured to cause the vehicle to autonomously transit from a first geographic region to a second geographic region. At 204, data representing an event associated with a calculated confidence level for a vehicle is detected. An event may be a condition or situation affecting operation, or potentially affecting operation, of an autonomous vehicle. The events may be internal to an autonomous vehicle, or external. For example, an obstacle obscuring a roadway may be viewed as an event, as well as a reduction or loss of communication. An event may include traffic conditions or congestion, as well as unexpected or unusual numbers or types of external objects (or tracks) that are perceived by a perception engine. An event may include weather-related conditions (e.g., loss of friction due to ice or rain) or the angle at which the sun is shining (e.g., at sunset), such as low angle to the horizon that cause sun to shine brightly in the eyes of human drivers of other vehicles. These and other conditions may be viewed as events that cause invocation of the teleoperator service or for the vehicle to execute a safe-stop trajectory.

At 206, data representing a subset of candidate trajectories may be received from an autonomous vehicle responsive to the detection of the event. For example, a planner of an autonomous vehicle controller may calculate and evaluate large numbers of trajectories (e.g., thousands or greater) per unit time, such as a second. In some embodiments, candidate trajectories are a subset of the trajectories that provide for relatively higher confidence levels that an autonomous vehicle may move forward safely in view of the event (e.g., using an alternate path provided by a teleoperator). Note that some candidate trajectories may be ranked or associated with higher degrees of confidence than other candidate trajectories. According to some examples, subsets of candidate trajectories may originate from any number of sources, such as a planner, a teleoperator computing device (e.g., teleoperators can determine and provide approximate paths), etc., and may be combined as a superset of candidate trajectories. At 208, path guidance data may be identified at one or more processors. The path guidance data may be configured to assist a teleoperator in selecting a guided trajectory from one or more of the candidate trajectories. In some instances, the path guidance data specifies a value indicative of a confidence level or probability that indicates the degree of certainty that a particular candidate trajectory may reduce or negate the probability that the event may impact operation of an autonomous vehicle. A guided trajectory, as a selected candidate trajectory, may be received at 210, responsive to input from a teleoperator (e.g., a teleoperator may select at least one candidate trajectory as a guided trajectory from a group of differently-ranked candidate trajectories). The selection may be made via an operator interface that lists a number of candidate trajectories, for example, in order from highest confidence levels to lowest confidence levels. At 212, the selection of a candidate trajectory as a guided trajectory may be transmitted to the vehicle, which, in turn, implements the guided trajectory for resolving the condition by causing the vehicle to perform a teleoperator-specified maneuver. As such, the autonomous vehicle may transition from a non-normative operational state.

Figure 3A:
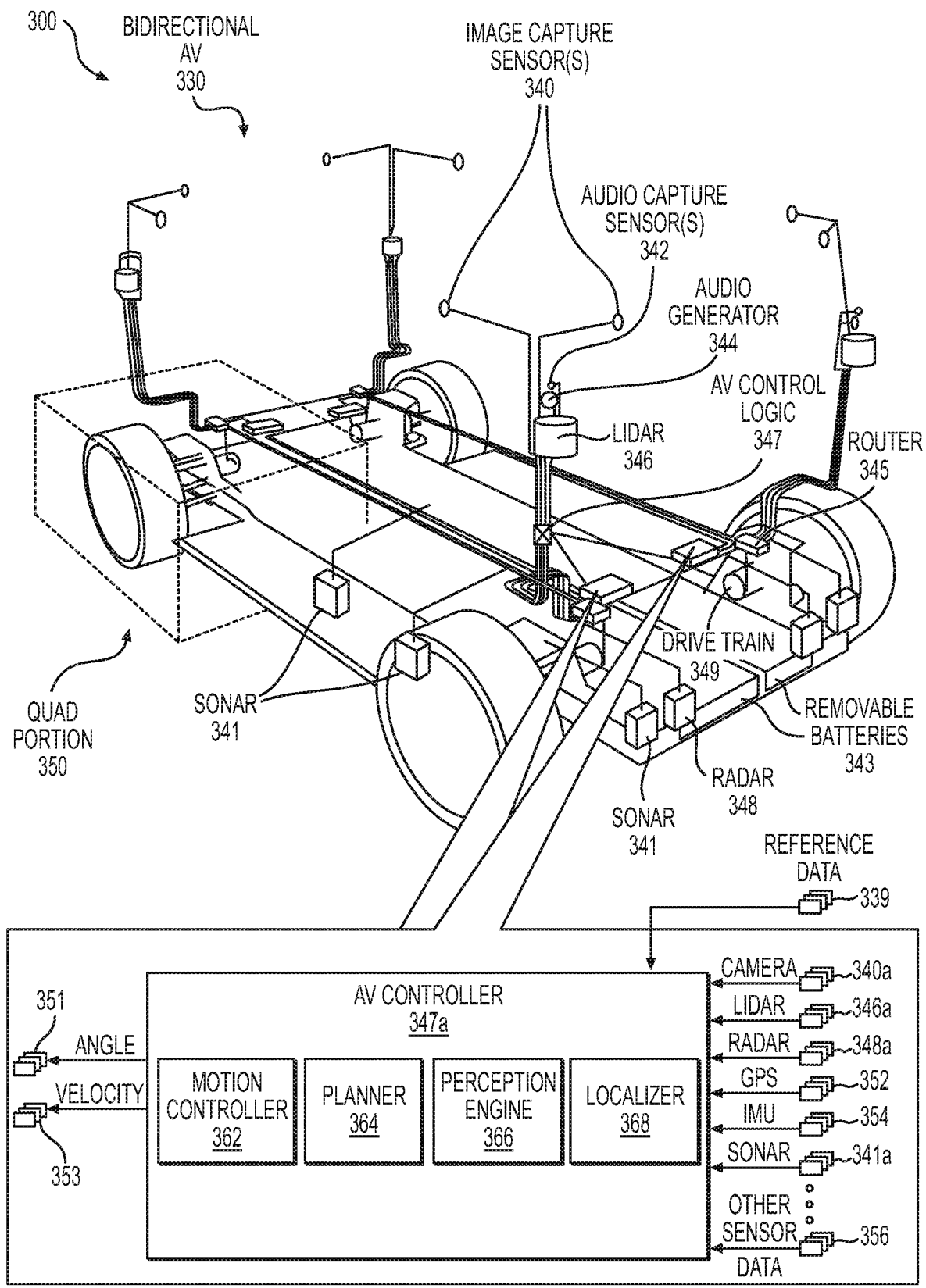
FIG. 3A is a diagram depicting examples of sensors and other autonomous vehicle components, according to some examples.

FIG. 3A is a diagram depicting examples of sensors and other autonomous vehicle components, according to some examples. Diagram 300 depicts an interior view of a bidirectional autonomous vehicle 330 that includes sensors, signal routers 345, drive trains 349, removable batteries 343, audio generators 344 (e.g., speakers or transducers), and autonomous vehicle ("AV") control logic 347. Sensors shown in diagram 300 include image capture sensors 340 (e.g., light capture devices or cameras of any type), audio capture sensors 342 (e.g., microphones of any type), radar devices 348, sonar devices 341 (or other like sensors, including ultrasonic sensors or acoustic-related sensors), and Lidar devices 346, among other sensor types and modalities (some of which are not shown, such inertial measurement units, or "IMUs," global positioning system ("GPS") sensors, sonar sensors, etc.). Note that quad portion 350 is representative of the symmetry of each of four "quad portions" of bidirectional autonomous vehicle 330 (e.g., each quad portion 350 may include a wheel, a drivetrain 349, similar steering mechanisms, similar structural support and members, etc. beyond that which is depicted). As depicted in FIG. 3A, similar sensors may be placed in similar locations in each quad portion 350, however any other configuration may implemented. Each wheel may be steerable individually and independent of the others. Note, too, that removable batteries 343 may be configured to facilitate being swapped in and swapped out rather than charging in situ, thereby ensuring reduced or negligible downtimes due to the necessity of charging batteries 343. While autonomous vehicle controller 347a is depicted as being used in a bidirectional autonomous vehicle 330, autonomous vehicle controller 347a is not so limited and may be implemented in unidirectional autonomous vehicles or any other type of vehicle, whether on land, in air, or at sea. Note that the depicted and described positions, locations, orientations, quantities, and types of sensors shown in FIG. 3A are not intended to be limiting, and, as such, there may be any number and type of sensor, and any sensor may be located and oriented anywhere on autonomous vehicle 330.

According to some embodiments, portions of the autonomous vehicle ("AV") control logic 347 may be implemented using clusters of graphics processing units ("GPUs") implementing a framework and programming model suitable for programming the clusters of GPUs. For example, a compute unified device architecture ("CUDA")-compatible programming language and application programming interface ("API") model may be used to program the GPUs. CUDA™ is produced and maintained by NVIDIA of Santa Clara, Calif. Note that other programming languages may be implemented, such as OpenCL, or any other parallel programming language.

According to some embodiments, autonomous vehicle control logic 347 may be implemented in hardware and/or software as autonomous vehicle controller 347a, which is shown to include a motion controller 362, a planner 364, a perception engine 366, and a localizer 368. As shown, autonomous vehicle controller 347a is configured to receive camera data 340a, Lidar data 346a, and radar data 348a, or any other range-sensing or localization data, including sonar data 341a or the like. Autonomous vehicle controller 347a is also configured to receive positioning data, such as GPS data 352, IMU data 354, and other position-sensing data (e.g., wheel-related data, such as steering angles, angular velocity, etc.). Further, autonomous vehicle controller 347a may receive any other sensor data 356, as well as reference data 339. In some cases, reference data 339 includes map data (e.g., 3D map data, 2D map data, 4D map data (e.g., including Epoch Determination)) and route data (e.g., road network data, including, but not limited to, RNDF data (or similar data), MDF data (or similar data), etc.

Localizer 368 is configured to receive sensor data from one or more sources, such as GPS data 352, wheel data, IMU data 354, Lidar data 346a, camera data 340a, radar data 348a, and the like, as well as reference data 339 (e.g., 3D map data and route data). Localizer 368 integrates (e.g., fuses the sensor data) and analyzes the data by comparing sensor data to map data to determine a local pose (or position) of bidirectional autonomous vehicle 330. According to some examples, localizer 368 may generate or update the pose or position of any autonomous vehicle in real-time or near real-time. Note that localizer 368 and its functionality need not be limited to "bi-directional" vehicles and can be implemented in any vehicle of any type. Therefore, localizer 368 (as well as other components of AV controller 347a) may be implemented in a "uni-directional" vehicle or any non-autonomous vehicle. According to some embodiments, data describing a local pose may include one or more of an x-coordinate, a y-coordinate, a z-coordinate (or any coordinate of any coordinate system, including polar or cylindrical coordinate systems, or the like), a yaw value, a roll value, a pitch value (e.g., an angle value), a rate (e.g., velocity), altitude, and the like.

Perception engine 366 is configured to receive sensor data from one or more sources, such as Lidar data 346a, camera data 340a, radar data 348a, and the like, as well as local pose data. Perception engine 366 may be configured to determine locations of external objects based on sensor data and other data. External objects, for instance, may be objects that are not part of a drivable surface. For example, perception engine 366 may be able to detect and classify external objects as pedestrians, bicyclists, dogs, other vehicles, etc. (e.g., perception engine 366 is configured to classify the objects in accordance with a type of classification, which may be associated with semantic information, including a label). Based on the classification of these external objects, the external objects may be labeled as dynamic objects or static objects. For example, an external object classified as a tree may be labeled as a static object, while an external object classified as a pedestrian may be labeled as a static object. External objects labeled as static may or may not be described in map data. Examples of external objects likely to be labeled as static include traffic cones, cement barriers arranged across a roadway, lane closure signs, newly-placed mailboxes or trash cans adjacent a roadway, etc. Examples of external objects likely to be labeled as dynamic include bicyclists, pedestrians, animals, other vehicles, etc. If the external object is labeled as dynamic, and further data about the external object may indicate a typical level of activity and velocity, as well as behavior patterns associated with the classification type. Further data about the external object may be generated by tracking the external object. As such, the classification type can be used to predict or otherwise determine the likelihood that an external object may, for example, interfere with an autonomous vehicle traveling along a planned path. For example, an external object that is classified as a pedestrian may be associated with some maximum speed, as well as an average speed (e.g., based on tracking data). The velocity of the pedestrian relative to the velocity of an autonomous vehicle can be used to determine if a collision is likely. Further, perception engine 364 may determine a level of uncertainty associated with a current and future state of objects. In some examples, the level of uncertainty may be expressed as an estimated value (or probability).

Planner 364 is configured to receive perception data from perception engine 366, and may also include localizer data from localizer 368. According to some examples, the perception data may include an obstacle map specifying static and dynamic objects located in the vicinity of an autonomous vehicle, whereas the localizer data may include a local pose or position. In operation, planner 364 generates numerous trajectories, and evaluates the trajectories, based on at least the location of the autonomous vehicle against relative locations of external dynamic and static objects. Planner 364 selects an optimal trajectory based on a variety of criteria over which to direct the autonomous vehicle in way that provides for collision-free travel. In some examples, planner 364 may be configured to calculate the trajectories as probabilistically-determined trajectories. Further, planner 364 may transmit steering and propulsion commands (as well as decelerating or braking commands) to motion controller 362. Motion controller 362 subsequently may convert any of the commands, such as a steering command, a throttle or propulsion command, and a braking command, into control signals (e.g., for application to actuators or other mechanical interfaces) to implement changes in steering or wheel angles 351 and/or velocity 353.

Figure 3B:
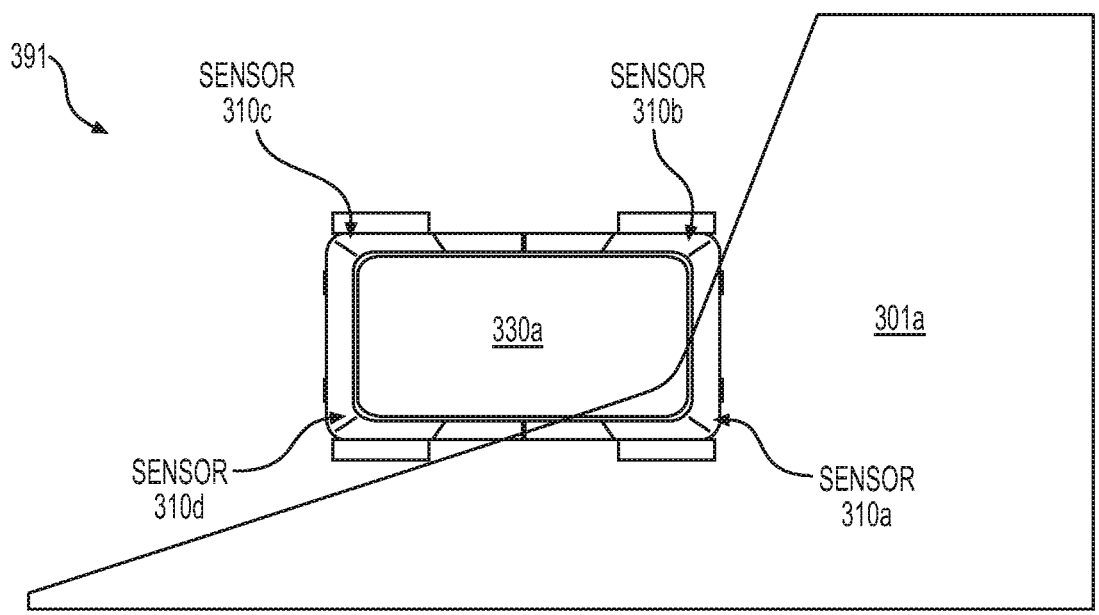
FIGS. 3B to 3E are diagrams depicting examples of sensor field redundancy and autonomous vehicle adaption to a loss of a sensor field, according to some examples.
Figure 3C:
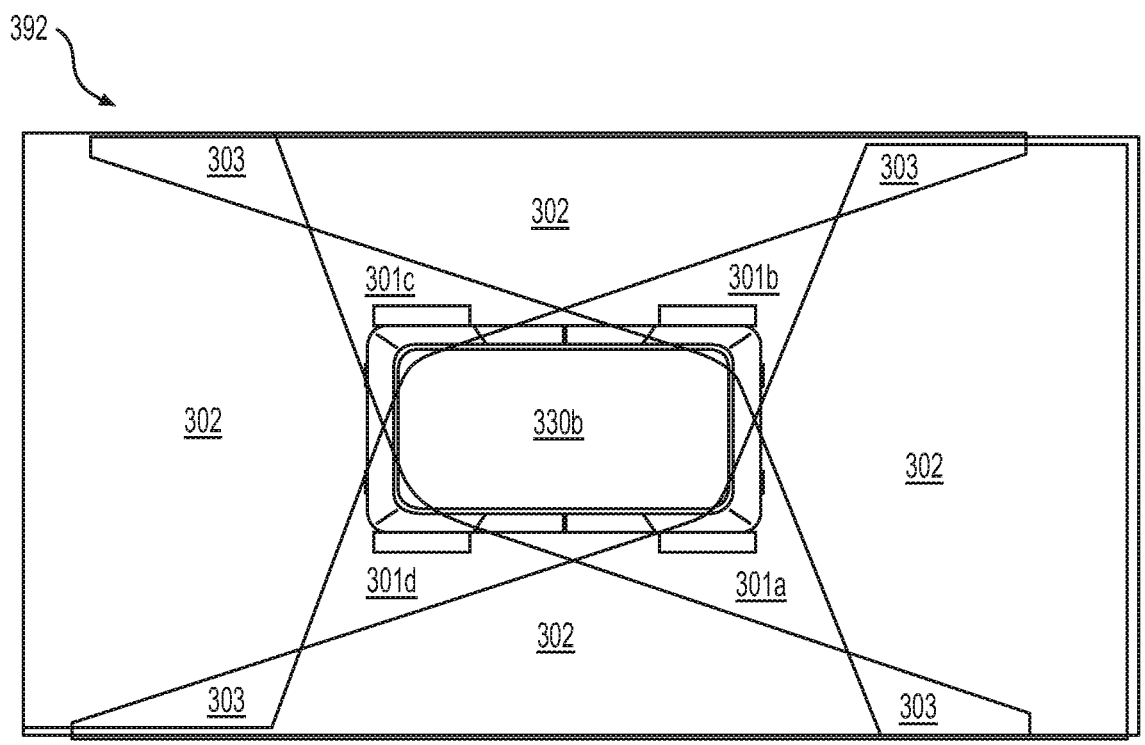

FIGS. 3B to 3E are diagrams depicting examples of sensor field redundancy and autonomous vehicle adaption to a loss of a sensor field, according to some examples. Diagram 391 of FIG. 3B depicts a sensor field 301a in which sensor 310a detects objects (e.g., for determining range or distance, or other information). While sensor 310a may implement any type of sensor or sensor modality, sensor 310a and similarly-described sensors, such as sensors 310b, 310c, and 310d, may include Lidar devices. Therefore, sensor fields 301a, 301b, 301c, and 301d each includes a field into which lasers extend. Diagram 392 of FIG. 3C depicts four overlapping sensor fields each of which is generated by a corresponding Lidar sensor 310 (not shown). As shown, portions 301 of the sensor fields include no overlapping sensor fields (e.g., a single Lidar field), portions 302 of the sensor fields include two overlapping sensor fields, and portions 303 include three overlapping sensor fields, whereby such sensors provide for multiple levels of redundancy should a Lidar sensor fail.

Figure 3D:
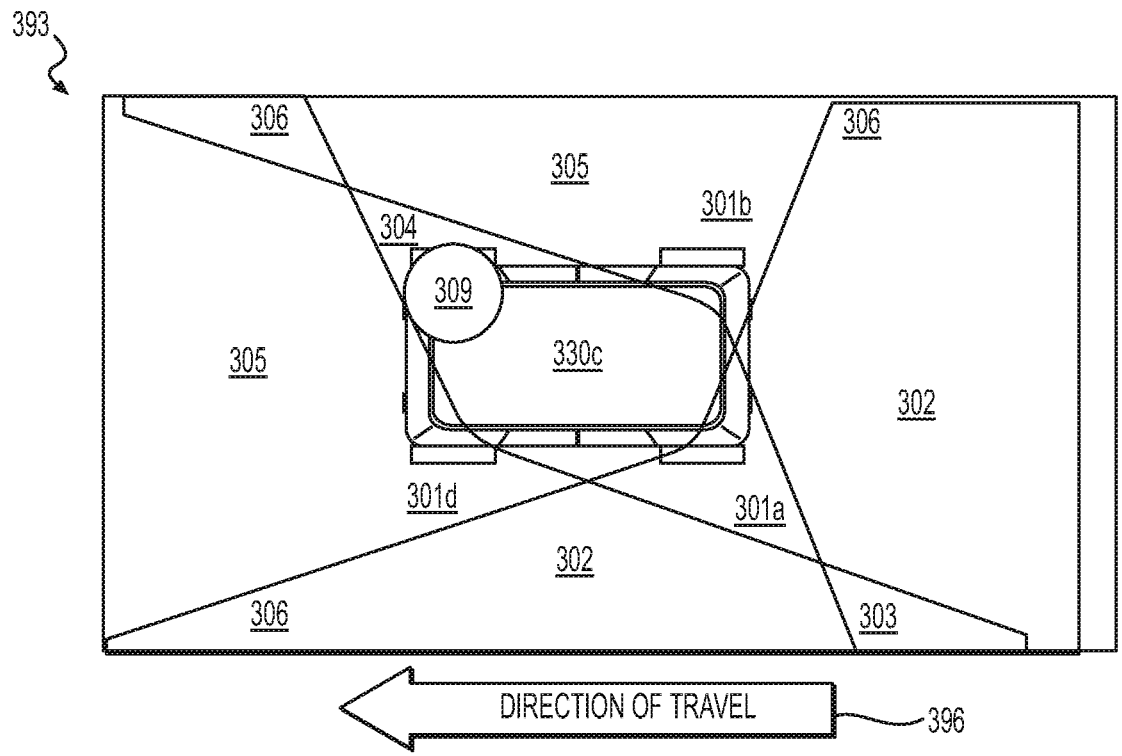
Figure 3E:
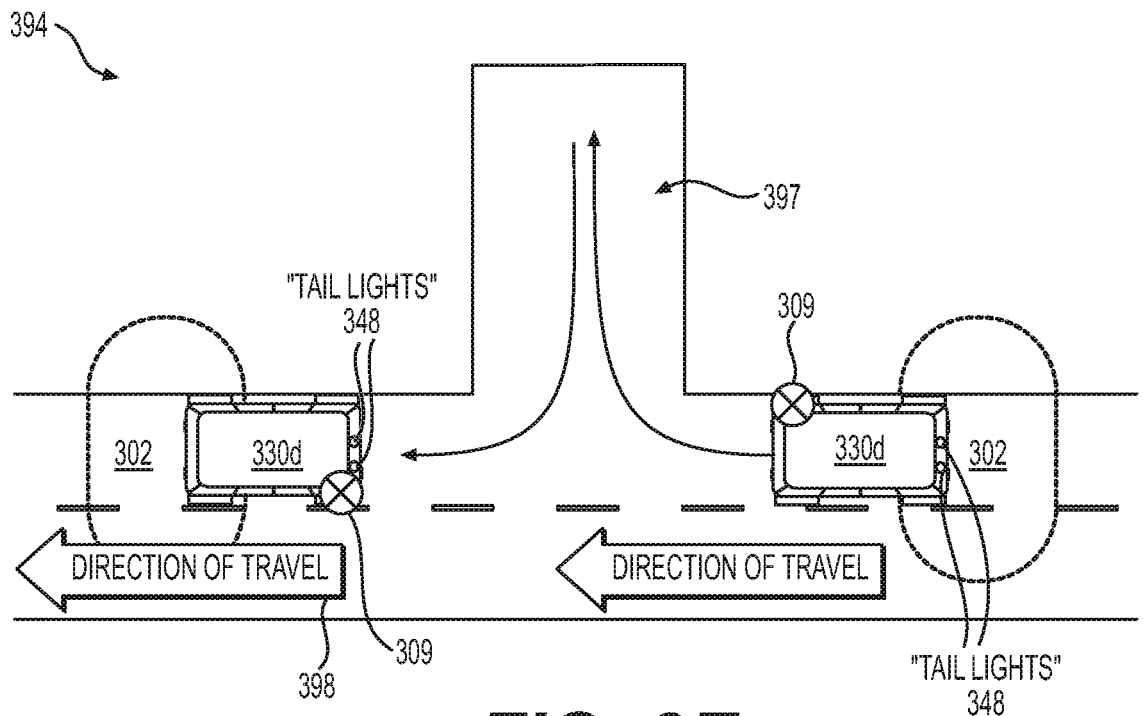

FIG. 3D depicts a loss of a sensor field due to failed operation of Lidar 309, according to some examples. Sensor field 302 of FIG. 3C is transformed into a single sensor field 305, one of sensor fields 301 of FIG. 3C is lost to a gap 304, and three of sensor fields 303 of FIG. 3C are transformed into sensor fields 306 (i.e., limited to two overlapping fields). Should autonomous car 330c be traveling in the direction of travel 396, the sensor field in front of the moving autonomous vehicle may be less robust than the one at the trailing end portion. According to some examples, an autonomous vehicle controller (not shown) is configured to leverage the bidirectional nature of autonomous vehicle 330c to address the loss of sensor field at the leading area in front of the vehicle. FIG. 3E depicts a bidirectional maneuver for restoring a certain robustness of the sensor field in front of autonomous vehicle 330d. As shown, a more robust sensor field 302 is disposed at the rear of the vehicle 330d coextensive with taillights 348. When convenient, autonomous vehicle 330d performs a bidirectional maneuver by pulling into a driveway 397 and switches its directionality such that taillights 348 actively switch to the other side (e.g., the trailing edge) of autonomous vehicle 330d. As shown, autonomous vehicle 330d restores a robust sensor field 302 in front of the vehicle as it travels along direction of travel 398. Further, the above-described bidirectional maneuver obviates a requirement for a more complicated maneuver that requires backing up into a busy roadway.

Figure 4:
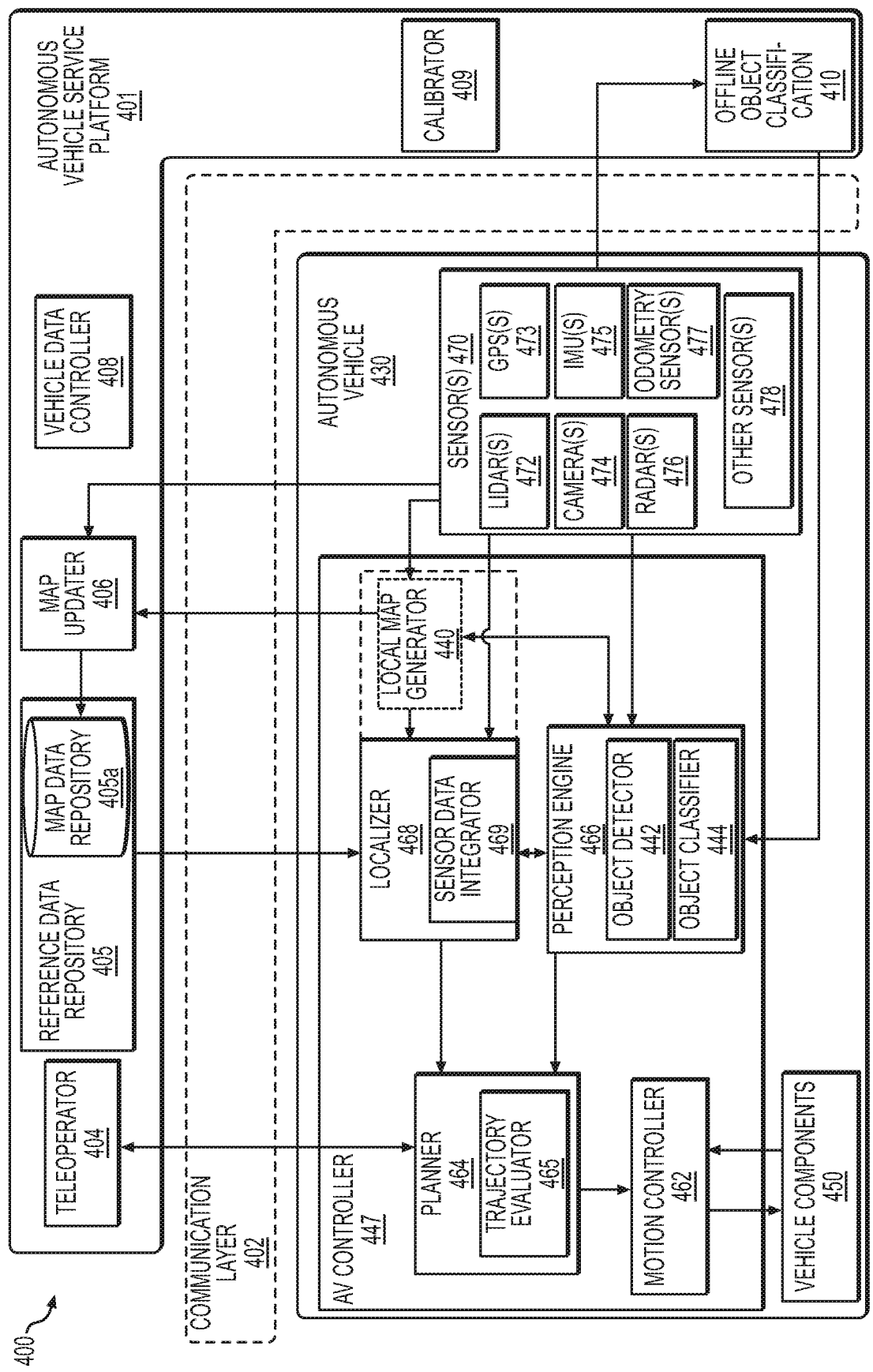
FIG. 4 is a functional block diagram depicting a system including an autonomous vehicle service platform that is communicatively coupled via a communication layer to an autonomous vehicle controller, according to some examples.

FIG. 4 is a functional block diagram depicting a system including an autonomous vehicle service platform that is communicatively coupled via a communication layer to an autonomous vehicle controller, according to some examples. Diagram 400 depicts an autonomous vehicle controller ("AV") 447 disposed in an autonomous vehicle 430, which, in turn, includes a number of sensors 470 coupled to autonomous vehicle controller 447. Sensors 470 include one or more Lidar devices 472, one or more cameras 474, one or more radars 476, one or more global positioning system ("GPS") data receiver-sensors, one or more inertial measurement units ("IMUs") 475, one or more odometry sensors 477 (e.g., wheel encoder sensors, wheel speed sensors, and the like), and any other suitable sensors 478, such as infrared cameras or sensors, hyperspectral-capable sensors, ultrasonic sensors (or any other acoustic energy-based sensor), radio frequency-based sensors, etc. In some cases, wheel angle sensors configured to sense steering angles of wheels may be included as odometry sensors 477 or suitable sensors 478. In a non-limiting example, autonomous vehicle controller 447 may include four or more Lidars 472, sixteen or more cameras 474 and four or more radar units 476. Further, sensors 470 may be configured to provide sensor data to components of autonomous vehicle controller 447 and to elements of autonomous vehicle service platform 401. As shown in diagram 400, autonomous vehicle controller 447 includes a planner 464, a motion controller 462, a localizer 468, a perception engine 466, and a local map generator 440. Note that elements depicted in diagram 400 of FIG. 4 may include structures and/or functions as similarly-named elements described in connection to one or more other drawings.

Localizer 468 is configured to localize autonomous vehicle (i.e., determine a local pose) relative to reference data, which may include map data, route data (e.g., road network data, such as RNDF-like data), and the like. In some cases, localizer 468 is configured to identify, for example, a point in space that may represent a location of autonomous vehicle 430 relative to features of a representation of an environment. Localizer 468 is shown to include a sensor data integrator 469, which may be configured to integrate multiple subsets of sensor data (e.g., of different sensor modalities) to reduce uncertainties related to each individual type of sensor. According to some examples, sensor data integrator 469 is configured to fuse sensor data (e.g., Lidar data, camera data, radar data, etc.) to form integrated sensor data values for determining a local pose. According to some examples, localizer 468 retrieves reference data originating from a reference data repository 405, which includes a map data repository 405a for storing 2D map data, 3D map data, 4D map data, and the like. Localizer 468 may be configured to identify at least a subset of features in the environment to match against map data to identify, or otherwise confirm, a pose of autonomous vehicle 430. According to some examples, localizer 468 may be configured to identify any amount of features in an environment, such that a set of features can one or more features, or all features. In a specific example, any amount of Lidar data (e.g., most or substantially all Lidar data) may be compared against data representing a map for purposes of localization. Generally, non-matched objects resulting from the comparison of the environment features and map data may be a dynamic object, such as a vehicle, bicyclist, pedestrian, etc. Note that detection of dynamic objects, including obstacles, may be performed with or without map data. In particular, dynamic objects may be detected and tracked independently of map data (i.e., in the absence of map data). In some instances, 2D map data and 3D map data may be viewed as "global map data" or map data that has been validated at a point in time by autonomous vehicle service platform 401. As map data in map data repository 405a may be updated and/or validated periodically, a deviation may exist between the map data and an actual environment in which the autonomous vehicle is positioned. Therefore, localizer 468 may retrieve locally-derived map data generated by local map generator 440 to enhance localization. Local map generator 440 is configured to generate local map data in real-time or near real-time. Optionally, local map generator 440 may receive static and dynamic object map data to enhance the accuracy of locally generated maps by, for example, disregarding dynamic objects in localization. According to at least some embodiments, local map generator 440 may be integrated with, or formed as part of, localizer 468. In at least one case, local map generator 440, either individually or in collaboration with localizer 468, may be configured to generate map and/or reference data based on simultaneous localization and mapping ("SLAM") or the like. Note that localizer 468 may implement a "hybrid" approach to using map data, whereby logic in localizer 468 may be configured to select various amounts of map data from either map data repository 405a or local map data from local map generator 440, depending on the degrees of reliability of each source of map data. Therefore, localizer 468 may still use out-of-date map data in view of locally-generated map data.

Perception engine 466 is configured to, for example, assist planner 464 in planning routes and generating trajectories by identifying objects of interest in a surrounding environment in which autonomous vehicle 430 is transiting. Further, probabilities may be associated with each of the object of interest, whereby a probability may represent a likelihood that an object of interest may be a threat to safe travel (e.g., a fast-moving motorcycle may require enhanced tracking rather than a person sitting at a bus stop bench while reading a newspaper). As shown, perception engine 466 includes an object detector 442 and an object classifier 444. Object detector 442 is configured to distinguish objects relative to other features in the environment, and object classifier 444 may be configured to classify objects as either dynamic or static objects and track the locations of the dynamic and the static objects relative to autonomous vehicle 430 for planning purposes. Further, perception engine 466 may be configured to assign an identifier to a static or dynamic object that specifies whether the object is (or has the potential to become) an obstacle that may impact path planning at planner 464. Although not shown in FIG. 4, note that perception engine 466 may also perform other perception-related functions, such as segmentation and tracking, examples of which are described below.

Planner 464 is configured to generate a number of candidate trajectories for accomplishing a goal to reaching a destination via a number of paths or routes that are available. Trajectory evaluator 465 is configured to evaluate candidate trajectories and identify which subsets of candidate trajectories are associated with higher degrees of confidence levels of providing collision-free paths to the destination. As such, trajectory evaluator 465 can select an optimal trajectory based on relevant criteria for causing commands to generate control signals for vehicle components 450 (e.g., actuators or other mechanisms). Note that the relevant criteria may include any number of factors that define optimal trajectories, the selection of which need not be limited to reducing collisions. For example, the selection of trajectories may be made to optimize user experience (e.g., user comfort) as well as collision-free trajectories that comply with traffic regulations and laws. User experience may be optimized by moderating accelerations in various linear and angular directions (e.g., to reduce jerking-like travel or other unpleasant motion). In some cases, at least a portion of the relevant criteria can specify which of the other criteria to override or supersede, while maintain optimized, collision-free travel. For example, legal restrictions may be temporarily lifted or deemphasized when generating trajectories in limited situations (e.g., crossing double yellow lines to go around a cyclist or travelling at higher speeds than the posted speed limit to match traffic flows). As such, the control signals are configured to cause propulsion and directional changes at the drivetrain and/or wheels. In this example, motion controller 462 is configured to transform commands into control signals (e.g., velocity, wheel angles, etc.) for controlling the mobility of autonomous vehicle 430. In the event that trajectory evaluator 465 has insufficient information to ensure a confidence level high enough to provide collision-free, optimized travel, planner 464 can generate a request to teleoperator 404 for teleoperator support.

Autonomous vehicle service platform 401 includes teleoperator 404 (e.g., a teleoperator computing device), reference data repository 405, a map updater 406, a vehicle data controller 408, a calibrator 409, and an off-line object classifier 410. Note that each element of autonomous vehicle service platform 401 may be independently located or distributed and in communication with other elements in autonomous vehicle service platform 401. Further, element of autonomous vehicle service platform 401 may independently communicate with the autonomous vehicle 430 via the communication layer 402. Map updater 406 is configured to receive map data (e.g., from local map generator 440, sensors 460, or any other component of autonomous vehicle controller 447), and is further configured to detect deviations, for example, of map data in map data repository 405a from a locally-generated map. Vehicle data controller 408 can cause map updater 406 to update reference data within repository 405 and facilitate updates to 2D, 3D, and/or 4D map data. In some cases, vehicle data controller 408 can control the rate at which local map data is received into autonomous vehicle service platform 408 as well as the frequency at which map updater 406 performs updating of the map data.

Calibrator 409 is configured to perform calibration of various sensors of the same or different types. Calibrator 409 may be configured to determine the relative poses of the sensors (e.g., in Cartesian space (x, y, z)) and orientations of the sensors (e.g., roll, pitch and yaw). The pose and orientation of a sensor, such a camera, Lidar sensor, radar sensor, etc., may be calibrated relative to other sensors, as well as globally relative to the vehicle's reference frame. Off-line self-calibration can also calibrate or estimate other parameters, such as vehicle inertial tensor, wheel base, wheel radius or surface road friction. Calibration can also be done online to detect parameter change, according to some examples. Note, too, that calibration by calibrator 409 may include intrinsic parameters of the sensors (e.g., optical distortion, beam angles, etc.) and extrinsic parameters. In some cases, calibrator 409 may be performed by maximizing a correlation between depth discontinuities in 3D laser data and edges of image data, as an example. Off-line object classification 410 is configured to receive data, such as sensor data, from sensors 470 or any other component of autonomous vehicle controller 447. According to some embodiments, an off-line classification pipeline of off-line object classification 410 may be configured to pre-collect and annotate objects (e.g., manually by a human and/or automatically using an offline labeling algorithm), and may further be configured to train an online classifier (e.g., object classifier 444), which can provide real-time classification of object types during online autonomous operation.

Figure 5:
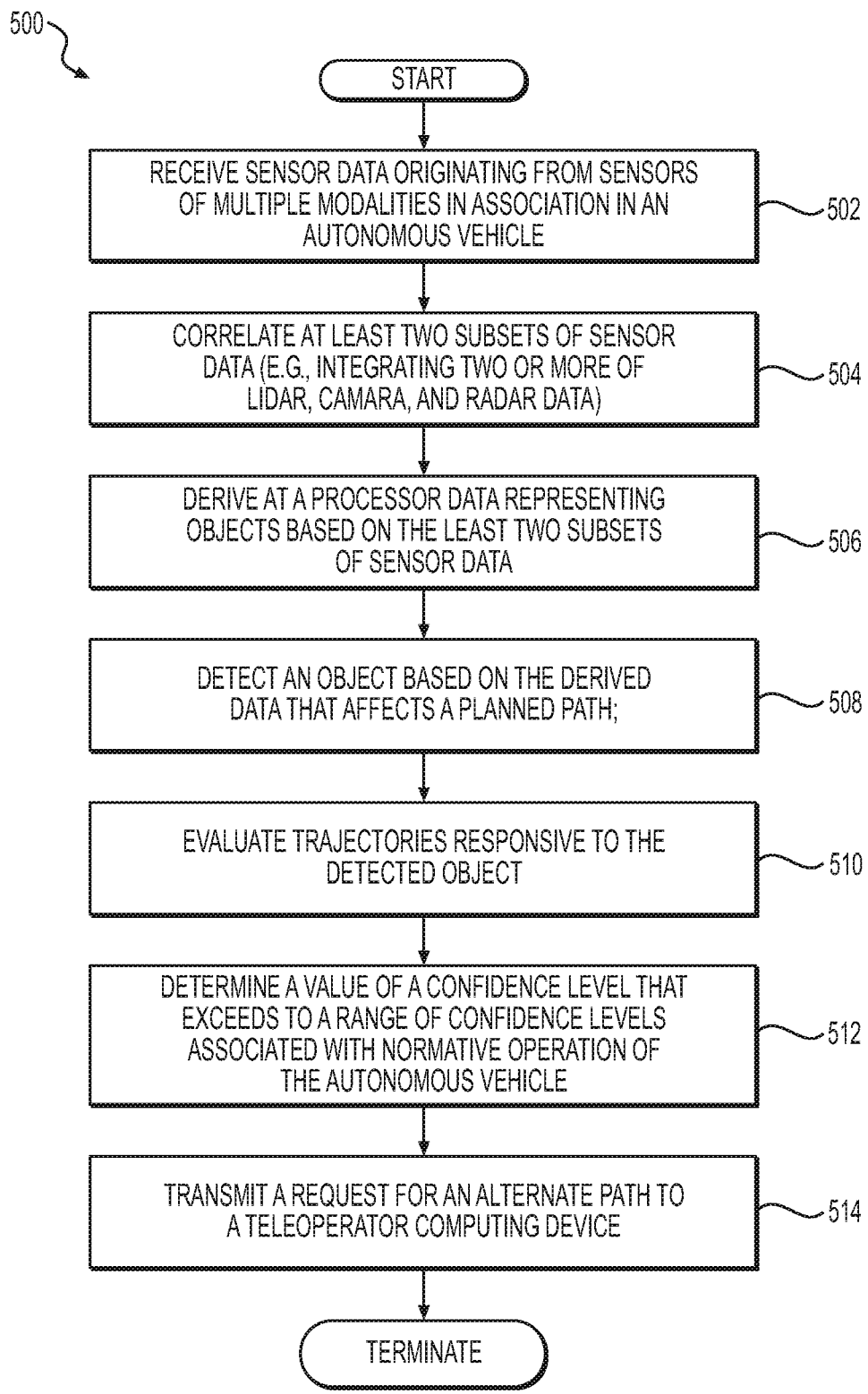
FIG. 5 is an example of a flow diagram to control an autonomous vehicle, according to some embodiments.

FIG. 5 is an example of a flow diagram to control an autonomous vehicle, according to some embodiments. At 502, flow 500 begins when sensor data originating from sensors of multiple modalities at an autonomous vehicle is received, for example, by an autonomous vehicle controller. One or more subsets of sensor data may be integrated for generating fused data to improve, for example, estimates. In some examples, a sensor stream of one or more sensors (e.g., of same or different modalities) may be fused to form fused sensor data at 504. In some examples, subsets of Lidar sensor data and camera sensor data may be fused at 504 to facilitate localization. At 506, data representing objects based on the least two subsets of sensor data may be derived at a processor. For example, data identifying static objects or dynamic objects may be derived (e.g., at a perception engine) from at least Lidar and camera data. At 508, a detected object is determined to affect a planned path, and a subset of trajectories are evaluated (e.g., at a planner) responsive to the detected object at 510. A confidence level is determined at 512 to exceed a range of acceptable confidence levels associated with normative operation of an autonomous vehicle. Therefore, in this case, a confidence level may be such that a certainty of selecting an optimized path is less likely, whereby an optimized path may be determined as a function of the probability of facilitating collision-free travel, complying with traffic laws, providing a comfortable user experience (e.g., comfortable ride), and/or generating candidate trajectories on any other factor. As such, a request for an alternate path may be transmitted to a teleoperator computing device at 514. Thereafter, the teleoperator computing device may provide a planner with an optimal trajectory over which an autonomous vehicle made travel. In situations, the vehicle may also determine that executing a safe-stop maneuver is the best course of action (e.g., safely and automatically causing an autonomous vehicle to a stop at a location of relatively low probabilities of danger). Note that the order depicted in this and other flow charts herein are not intended to imply a requirement to linearly perform various functions as each portion of a flow chart may be performed serially or in parallel with any one or more other portions of the flow chart, as well as independent or dependent on other portions of the flow chart.

Figure 6:
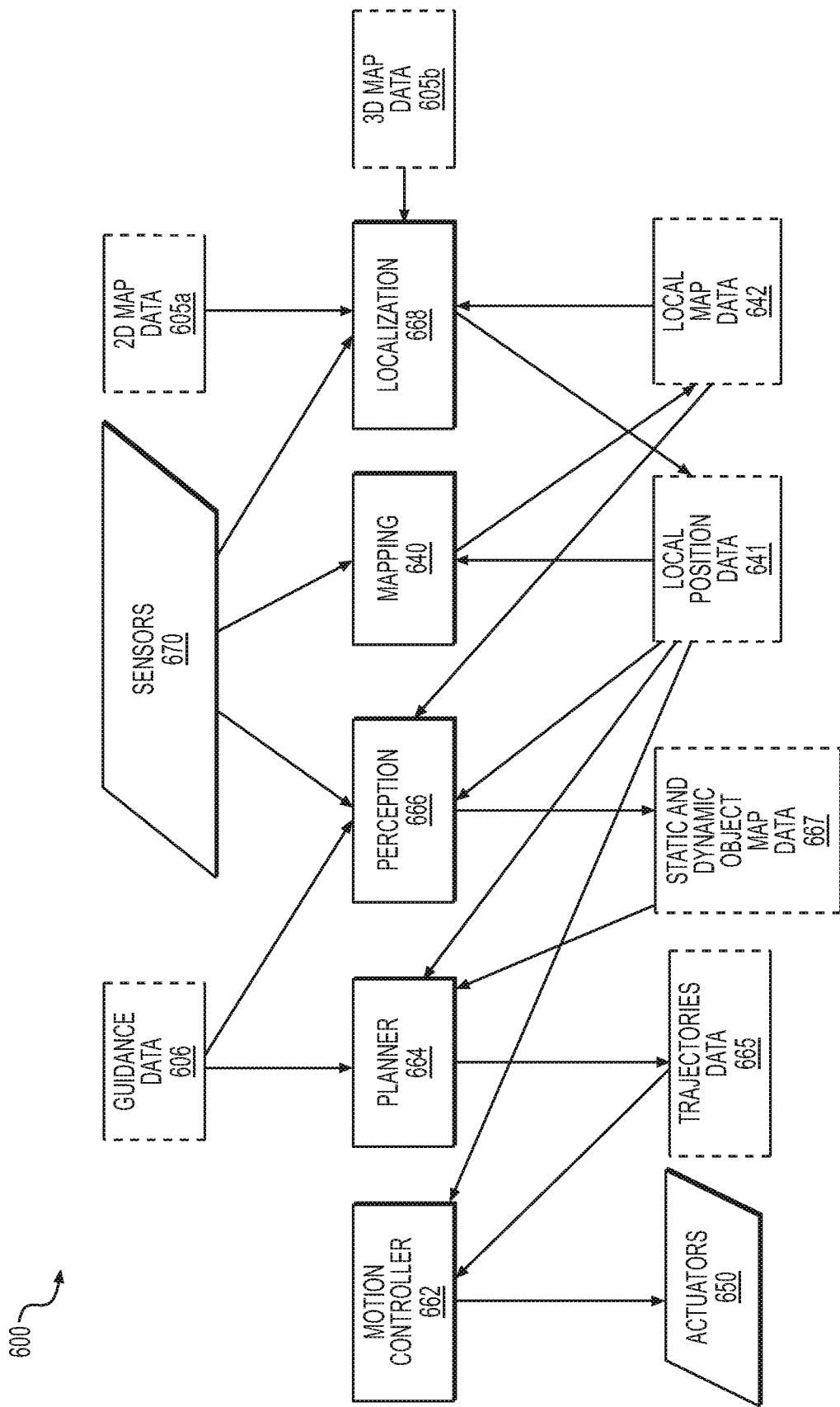
FIG. 6 is a diagram depicting an example of an architecture for an autonomous vehicle controller, according to some embodiments.

FIG. 6 is a diagram depicting an example of an architecture for an autonomous vehicle controller, according to some embodiments. Diagram 600 depicts a number of processes including a motion controller process 662, a planner processor 664, a perception process 666, a mapping process 640, and a localization process 668, some of which may generate or receive data relative to other processes. Other processes, such as such as processes 670 and 650 may facilitate interactions with one or more mechanical components of an autonomous vehicle. For example, perception process 666, mapping process 640, and localization process 668 are configured to receive sensor data from sensors 670, whereas planner process 664 and perception process 666 are configured to receive guidance data 606, which may include route data, such as road network data. Further to diagram 600, localization process 668 is configured to receive map data 605*a* (i.e., 2D map data), map data 605*b* (i.e., 3D map data), and local map data 642, among other types of map data. For example, localization process 668 may also receive other forms of map data, such as 4D map data, which may include, for example, an epoch determination. Localization process 668 is configured to generate local position data 641 representing a local pose. Local position data 641 is provided to motion controller process 662, planner process 664, and perception process 666. Perception process 666 is configured to generate static and dynamic object map data 667, which, in turn, may be transmitted to planner process 664. In some examples, static and dynamic object map data 667 may be transmitted with other data, such as semantic classification information and predicted object behavior. Planner process 664 is configured to generate trajectories data 665, which describes a number of trajectories generated by planner 664. Motion controller process uses trajectories data 665 to generate low-level commands or control signals for application to actuators 650 to cause changes in steering angles and/or velocity.

Figure 7:
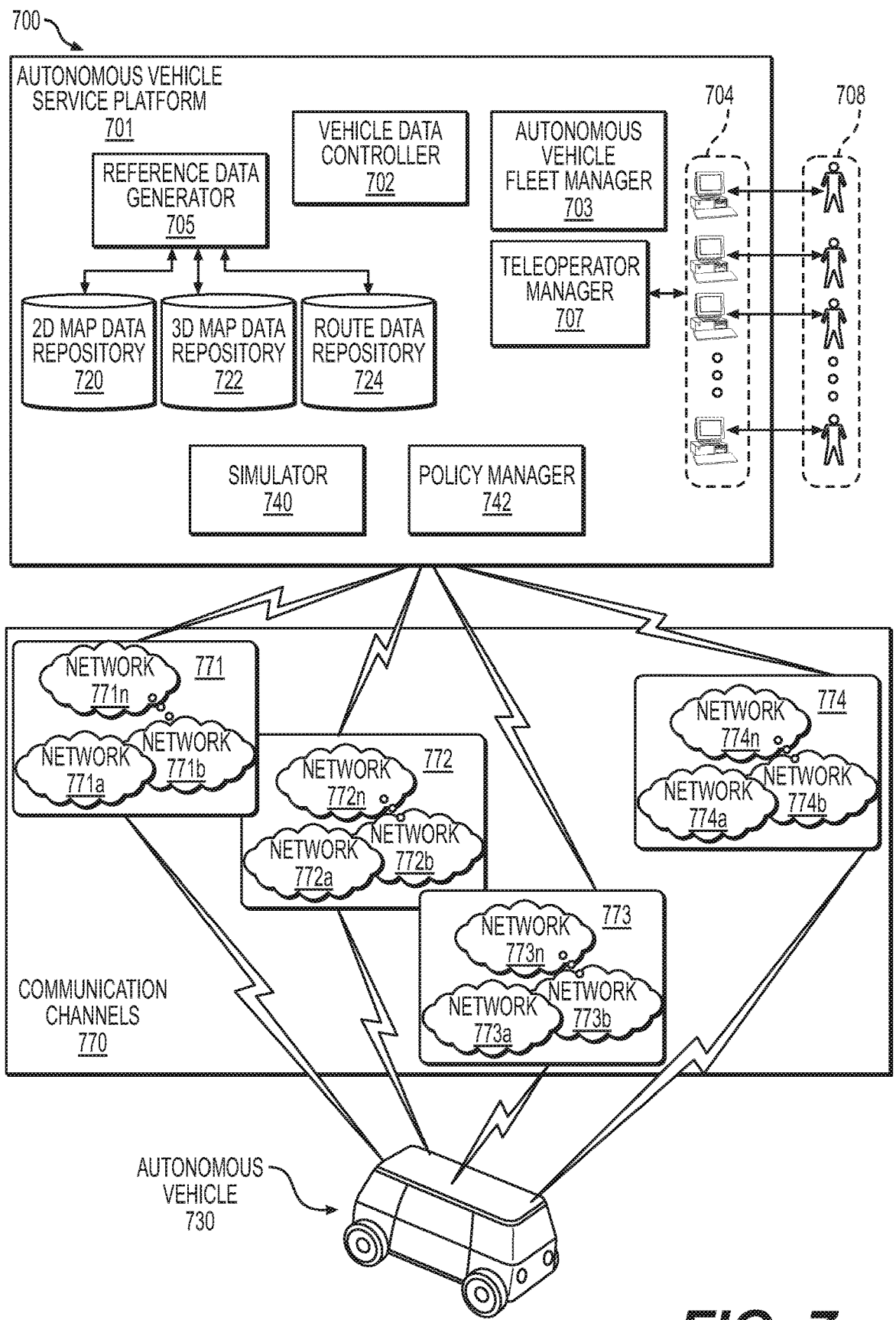
FIG. 7 is a diagram depicting an example of an autonomous vehicle service platform implementing redundant communication channels to maintain reliable communications with a fleet of autonomous vehicles, according to some embodiments.

FIG. 7 is a diagram depicting an example of an autonomous vehicle service platform implementing redundant communication channels to maintain reliable communications with a fleet of autonomous vehicles, according to some embodiments. Diagram 700 depicts an autonomous vehicle service platform 701 including a reference data generator 705, a vehicle data controller 702, an autonomous vehicle fleet manager 703, a teleoperator manager 707, a simulator 740, and a policy manager 742. Reference data generator 705 is configured to generate and modify map data and route data (e.g., RNDF data). Further, reference data generator 705 may be configured to access 2D maps in 2D map data repository 720, access 3D maps in 3D map data repository 722, and access route data in route data repository 724. Other map representation data and repositories may be implemented in some examples, such as 4D map data including Epoch Determination. Vehicle data controller 702 may be configured to perform a variety of operations. For example, vehicle data controller 702 may be configured to change a rate that data is exchanged between a fleet of autonomous vehicles and platform 701 based on quality levels of communication over channels 770. During bandwidth-constrained periods, for example, data communications may be prioritized such that teleoperation requests from autonomous vehicle 730 are prioritized highly to ensure delivery. Further, variable levels of data abstraction may be transmitted per vehicle over channels 770, depending on bandwidth available for a particular channel. For example, in the presence of a robust network connection, full Lidar data (e.g., substantially all Lidar data, but also may be less) may be transmitted, whereas in the presence of a degraded or low-speed connection, simpler or more abstract depictions of the data may be transmitted (e.g., bounding boxes with associated metadata, etc.). Autonomous vehicle fleet manager 703 is configured to coordinate the dispatching of autonomous vehicles 730 to optimize multiple variables, including an efficient use of battery power, times of travel, whether or not an air-conditioning unit in an autonomous vehicle 730 may be used during low charge states of a battery, etc., any or all of which may be monitored in view of optimizing cost functions associated with operating an autonomous vehicle service. An algorithm may be implemented to analyze a variety of variables with which to minimize costs or times of travel for a fleet of autonomous vehicles. Further, autonomous vehicle fleet manager 703 maintains an inventory of autonomous vehicles as well as parts for accommodating a service schedule in view of maximizing up-time of the fleet.

Teleoperator manager 707 is configured to manage a number of teleoperator computing devices 704 with which teleoperators 708 provide input. Simulator 740 is configured to simulate operation of one or more autonomous vehicles 730, as well as the interactions between teleoperator manager 707 and an autonomous vehicle 730. Simulator 740 may also simulate operation of a number of sensors (including the introduction of simulated noise) disposed in autonomous vehicle 730. Further, an environment, such as a city, may be simulated such that a simulated autonomous vehicle can be introduced to the synthetic environment, whereby simulated sensors may receive simulated sensor data, such as simulated laser returns. Simulator 740 may provide other functions as well, including validating software updates and/or map data. Policy manager 742 is configured to maintain data representing policies or rules by which an autonomous vehicle ought to behave in view of a variety of conditions or events that an autonomous vehicle encounters while traveling in a network of roadways. In some cases, updated policies and/or rules may be simulated in simulator 740 to confirm safe operation of a fleet of autonomous vehicles in view of changes to a policy. Some of the above-described elements of autonomous vehicle service platform 701 are further described hereinafter.

Communication channels 770 are configured to provide networked communication links among a fleet of autonomous vehicles 730 and autonomous vehicle service platform 701. For example, communication channel 770 includes a number of different types of networks 771, 772, 773, and 774, with corresponding subnetworks (e.g., 771a to 771n), to ensure a certain level of redundancy for operating an autonomous vehicle service reliably. For example, the different types of networks in communication channels 770 may include different cellular network providers, different types of data networks, etc., to ensure sufficient bandwidth in the event of reduced or lost communications due to outages in one or more networks 771, 772, 773, and 774.

Figure 8:
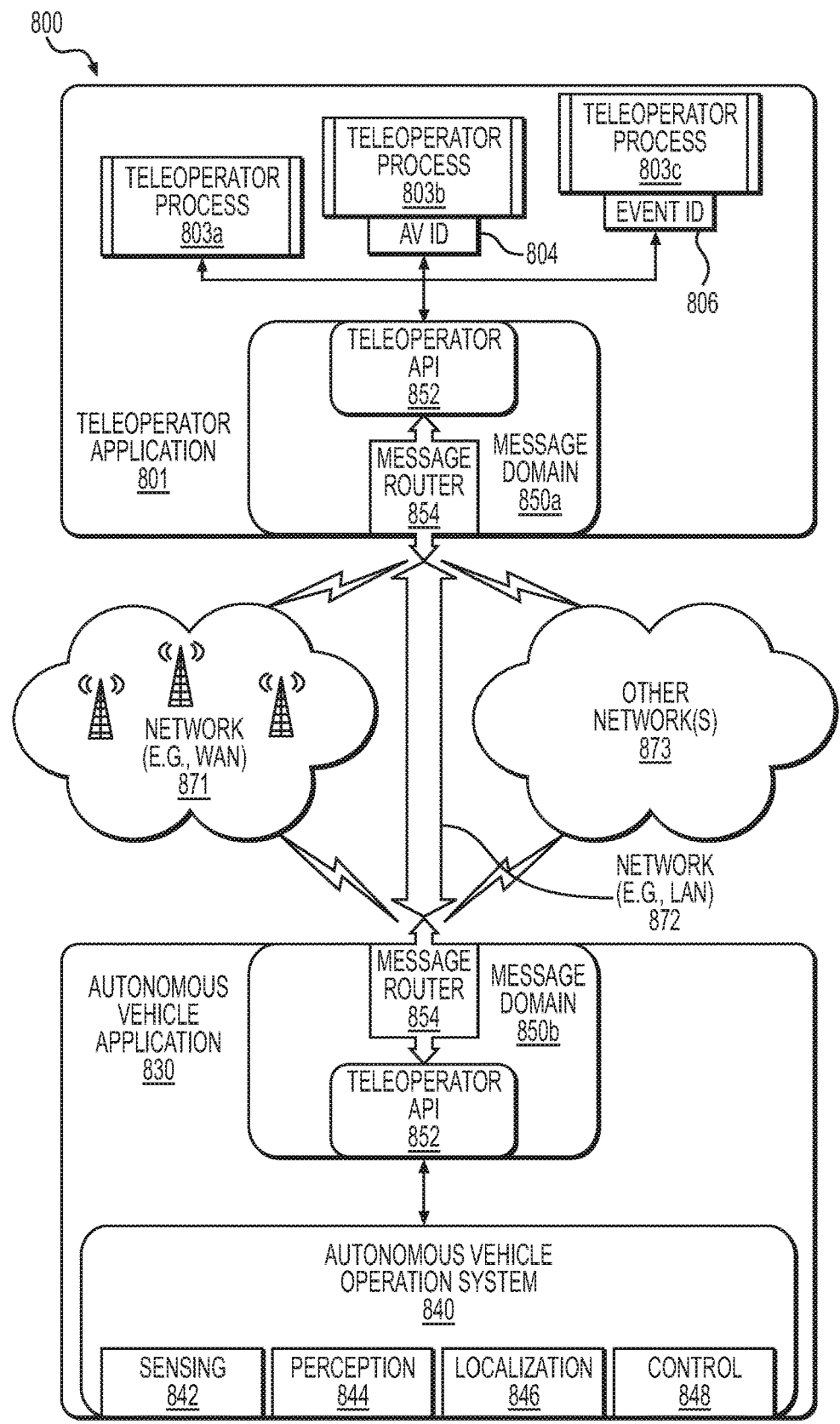
FIG. 8 is a diagram depicting an example of a messaging application configured to exchange data among various applications, according to some embodiment.

FIG. 8 is a diagram depicting an example of a messaging application configured to exchange data among various applications, according to some embodiments. Diagram 800 depicts an teleoperator application 801 disposed in a teleoperator manager, and an autonomous vehicle application 830 disposed in an autonomous vehicle, whereby teleoperator applications 801 and autonomous vehicle application 830 exchange message data via a protocol that facilitates communications over a variety of networks, such as network 871, 872, and other networks 873. According to some examples, the communication protocol is a middleware protocol implemented as a Data Distribution Service™ having a specification maintained by the Object Management Group consortium. In accordance with the communications protocol, teleoperator application 801 and autonomous vehicle application 830 may include a message router 854 disposed in a message domain, the message router being configured to interface with the teleoperator API 852. In some examples, message router 854 is a routing service. In some examples, message domain 850a in teleoperator application 801 may be identified by a teleoperator identifier, whereas message domain 850b be may be identified as a domain associated with a vehicle identifier. Teleoperator API 852 in teleoperator application 801 is configured to interface with teleoperator processes 803a to 803c, whereby teleoperator process 803b is associated with an autonomous vehicle identifier 804, and teleoperator process 803c is associated with an event identifier 806 (e.g., an identifier that specifies an intersection that may be problematic for collision-free path planning) Teleoperator API 852 in autonomous vehicle application 830 is configured to interface with an autonomous vehicle operating system 840, which includes sensing application 842, a perception application 844, a localization application 846, and a control application 848. In view of the foregoing, the above-described communications protocol may facilitate data exchanges to facilitate teleoperations as described herein. Further, the above-described communications protocol may be adapted to provide secure data exchanges among one or more autonomous vehicles and one or more autonomous vehicle service platforms. For example, message routers 854 may be configured to encrypt and decrypt messages to provide for secured interactions between, for example, a teleoperator process 803 and an autonomous vehicle operation system 840.

Figure 9:
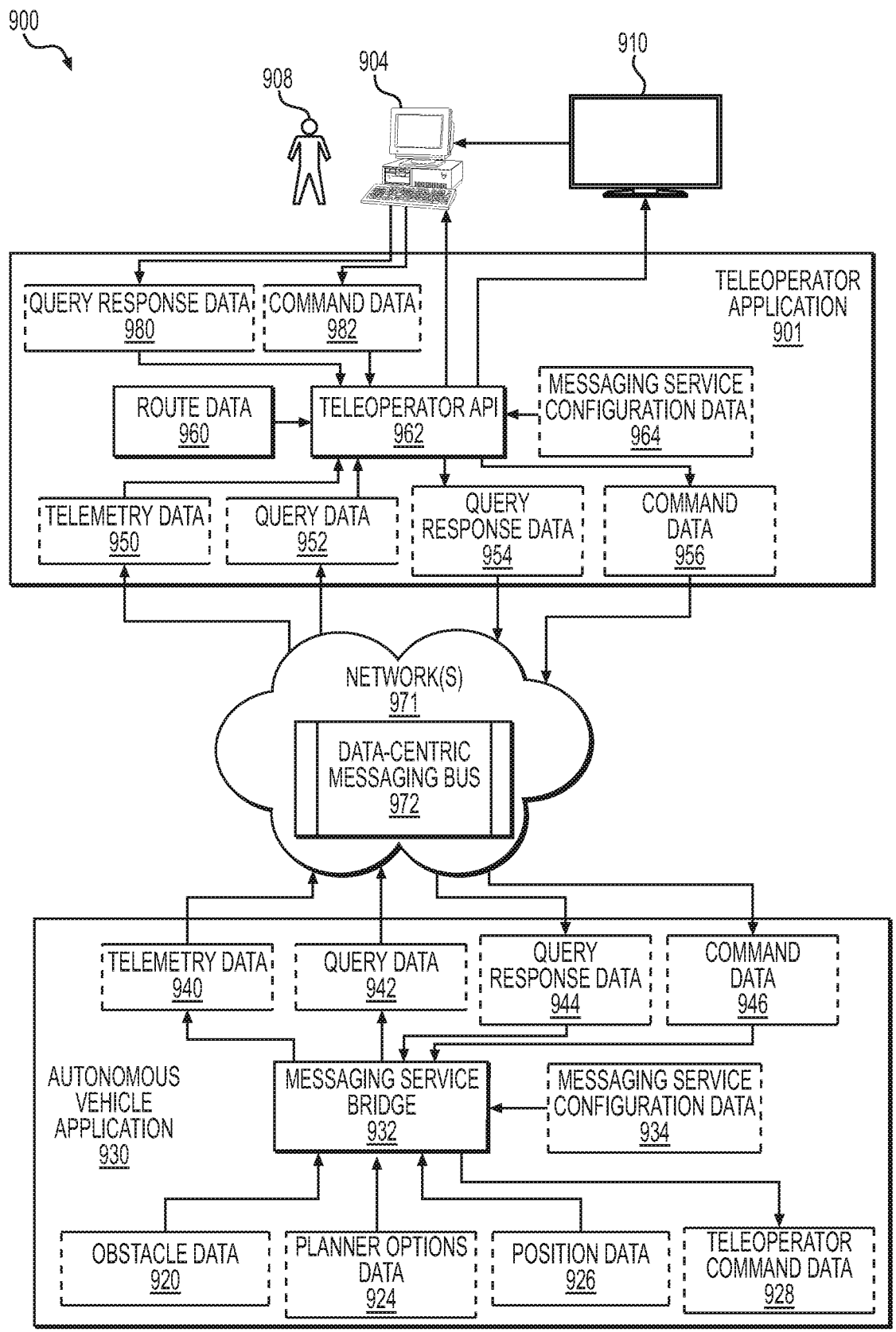
FIG. 9 is a diagram depicting types of data for facilitating teleoperations using a communications protocol described in FIG. 8, according to some examples.

FIG. 9 is a diagram depicting types of data for facilitating teleoperations using a communications protocol described in FIG. 8, according to some examples. Diagram 900 depicts a teleoperator 908 interfacing with a teleoperator computing device 904 coupled to a teleoperator application 901, which is configured to exchange data via a data-centric messaging bus 972 implemented in one or more networks 971. Data-centric messaging bus 972 provides a communication link between teleoperator application 901 and autonomous vehicle application 930. Teleoperator API 962 of teleoperator application 901 is configured to receive message service configuration data 964 and route data 960, such as road network data (e.g., RNDF-like data), mission data (e.g., MDF-data), and the like. Similarly, a messaging service bridge 932 is also configured to receive messaging service configuration data 934. Messaging service configuration data 934 and 964 provide configuration data to configure the messaging service between teleoperator application 901 and autonomous vehicle application 930. An example of messaging service configuration data 934 and 964 includes quality of service ("QoS") configuration data implemented to configure a Data Distribution Service™ application.

An example of a data exchange for facilitating teleoperations via the communications protocol is described as follows. Consider that obstacle data 920 is generated by a perception system of an autonomous vehicle controller. Further, planner options data 924 is generated by a planner to notify a teleoperator of a subset of candidate trajectories, and position data 926 is generated by the localizer. Obstacle data 920, planner options data 924, and position data 926 are transmitted to a messaging service bridge 932, which, in accordance with message service configuration data 934, generates telemetry data 940 and query data 942, both of which are transmitted via data-centric messaging bus 972 into teleoperator application 901 as telemetry data 950 and query data 952. Teleoperator API 962 receives telemetry data 950 and inquiry data 952, which, in turn are processed in view of Route data 960 and message service configuration data 964. The resultant data is subsequently presented to a teleoperator 908 via teleoperator computing device 904 and/or a collaborative display (e.g., a dashboard display visible to a group of collaborating teleoperators 908). Teleoperator 908 reviews the candidate trajectory options that are presented on the display of teleoperator computing device 904, and selects a guided trajectory, which generates command data 982 and query response data 980, both of which are passed through teleoperator API 962 as query response data 954 and command data 956. In turn, query response data 954 and command data 956 are transmitted via data-centric messaging bus 972 into autonomous vehicle application 930 as query response data 944 and command data 946. Messaging service bridge 932 receives query response data 944 and command data 946 and generates teleoperator command data 928, which is configured to generate a teleoperator-selected trajectory for implementation by a planner. Note that the above-described messaging processes are not intended to be limiting, and other messaging protocols may be implemented as well.

Figure 10:
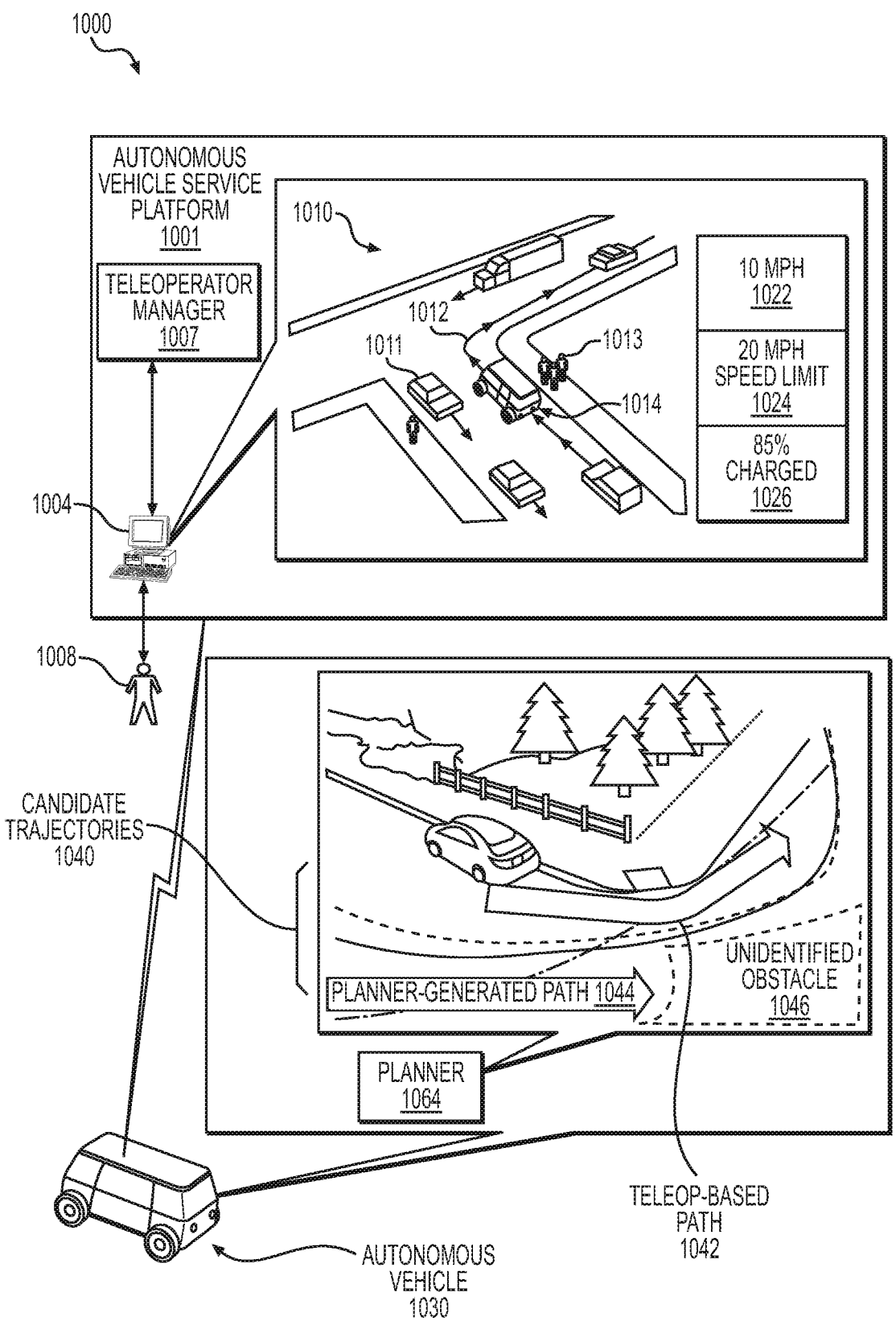
FIG. 10 is a diagram illustrating an example of a teleoperator interface with which a teleoperator may influence path planning, according to some embodiments.

FIG. 10 is a diagram illustrating an example of a teleoperator interface with which a teleoperator may influence path planning, according to some embodiments. Diagram 1000 depicts examples of an autonomous vehicle 1030 in communication with an autonomous vehicle service platform 1001, which includes a teleoperator manager 1007 configured to facilitate teleoperations. In a first example, teleoperator manager 1007 receives data that requires teleoperator 1008 to preemptively view a path of an autonomous vehicle approaching a potential obstacle or an area of low planner confidence levels so that teleoperator 1008 may be able to address an issue in advance. To illustrate, consider that an intersection that an autonomous vehicle is approaching may be tagged as being problematic. As such, user interface 1010 displays a representation 1014 of a corresponding autonomous vehicle 1030 transiting along a path 1012, which has been predicted by a number of trajectories generated by a planner. Also displayed are other vehicles 1011 and dynamic objects 1013, such as pedestrians, that may cause sufficient confusion at the planner, thereby requiring teleoperation support. User interface 1010 also presents to teleoperator 1008 a current velocity 1022, a speed limit 1024, and an amount of charge 1026 presently in the batteries. According to some examples, user interface 1010 may display other data, such as sensor data as acquired from autonomous vehicle 1030. In a second example, consider that planner 1064 has generated a number of trajectories that are coextensive with a planner-generated path 1044 regardless of a detected unidentified object 1046. Planner 1064 may also generate a subset of candidate trajectories 1040, but in this example, the planner is unable to proceed given present confidence levels. If planner 1064 fails to determine an alternative path, a teleoperation request may be transmitted. In this case, a teleoperator may select one of candidate trajectories 1040 to facilitate travel by autonomous vehicle 1030 that is consistent with teleoperator-based path 1042.

Figure 11:
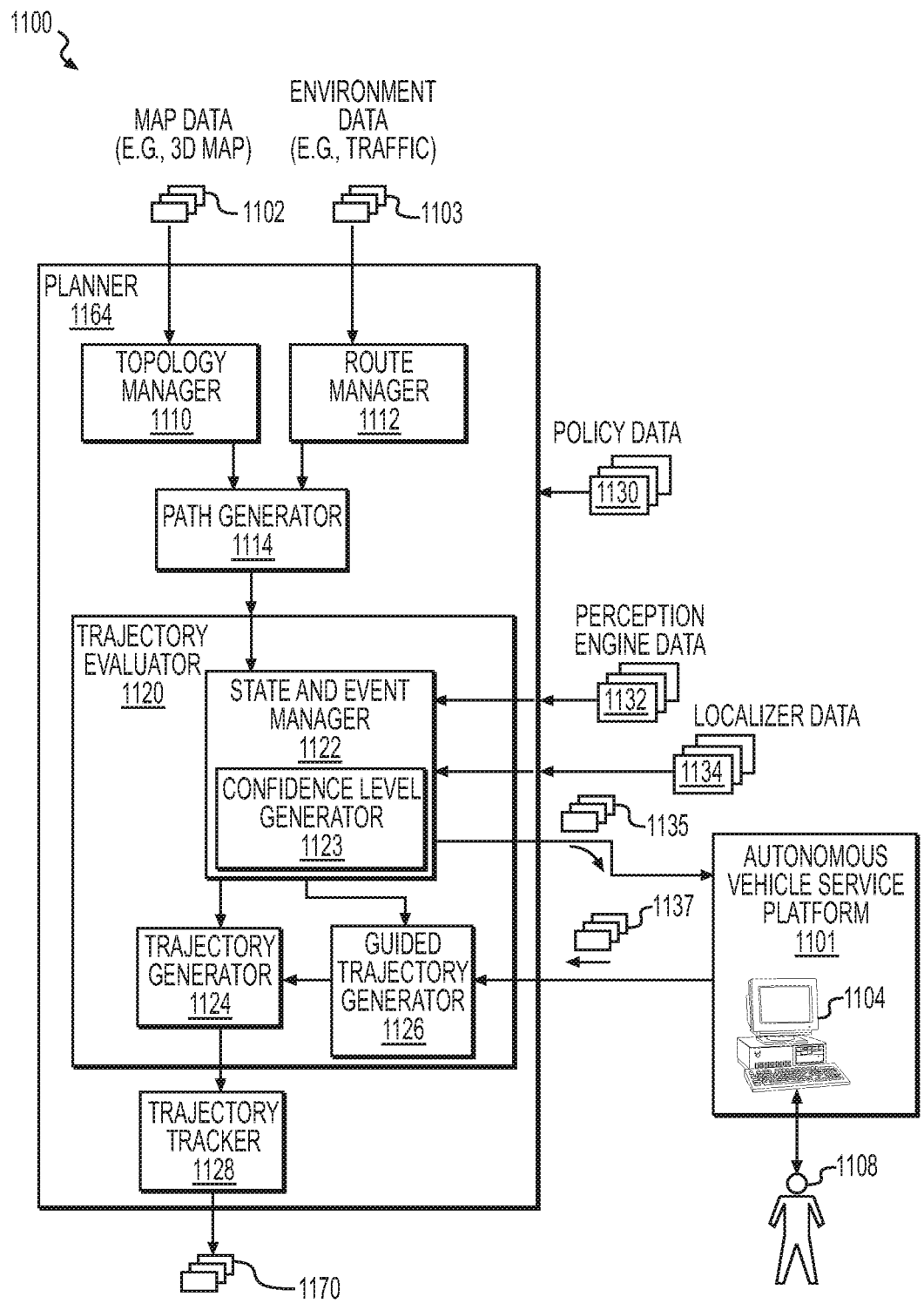
FIG. 11 is a diagram depicting an example of a planner configured to invoke teleoperations, according to some examples.

FIG. 11 is a diagram depicting an example of a planner configured to invoke teleoperations, according to some examples. Diagram 1100 depicts a planner 1164 including a topography manager 1110, a route manager 1112, a path generator 1114, a trajectory evaluator 1120, and a trajectory tracker 1128. Topography manager 1110 is configured to receive map data, such as 3D map data or other like map data that specifies topographic features. Topography manager 1110 is further configured to identify candidate paths based on topographic-related features on a path to a destination. According to various examples, topography manager 1110 receives 3D maps generated by sensors associated with one or more autonomous vehicles in the fleet. Route manager 1112 is configured to receive environmental data 1103, which may include traffic-related information associated with one or more routes that may be selected as a path to the destination. Path generator 1114 receives data from topography manager 1110 and route manager 1112, and generates one or more paths or path segments suitable to direct autonomous vehicle toward a destination. Data representing one or more paths or path segments is transmitted into trajectory evaluator 1120.

Trajectory evaluator 1120 includes a state and event manager 1122, which, in turn, may include a confidence level generator 1123. Trajectory evaluator 1120 further includes a guided trajectory generator 1126 and a trajectory generator 1124. Further, planner 1164 is configured to receive policy data 1130, perception engine data 1132, and localizer data 1134.

Policy data 1130 may include criteria with which planner 1164 uses to determine a path that has a sufficient confidence level with which to generate trajectories, according to some examples. Examples of policy data 1130 include policies that specify that trajectory generation is bounded by stand-off distances to external objects (e.g., maintaining a safety buffer of 3 feet from a cyclist, as possible), or policies that require that trajectories must not cross a center double yellow line, or policies that require trajectories to be limited to a single lane in a 4-lane roadway (e.g., based on past events, such as typically congregating at a lane closest to a bus stop), and any other similar criteria specified by policies. Perception engine data 1132 includes maps of locations of static objects and dynamic objects of interest, and localizer data 1134 includes at least a local pose or position.

State and event manager 1122 may be configured to probabilistically determine a state of operation for an autonomous vehicle. For example, a first state of operation (i.e., "normative operation") may describe a situation in which trajectories are collision-free, whereas a second state of operation (i.e., "non-normative operation") may describe another situation in which the confidence level associated with possible trajectories are insufficient to guarantee collision-free travel. According to some examples, state and event manager 1122 is configured to use perception data 1132 to determine a state of autonomous vehicle that is either normative or non-normative. Confidence level generator 1123 may be configured to analyze perception data 1132 to determine a state for the autonomous vehicle. For example, confidence level generator 1123 may use semantic information associated with static and dynamic objects, as well as associated probabilistic estimations, to enhance a degree of certainty that planner 1164 is determining safe course of action. For example, planner 1164 may use perception engine data 1132 that specifies a probability that an object is either a person or not a person to determine whether planner 1164 is operating safely (e.g., planner 1164 may receive a degree of certainty that an object has a 98% probability of being a person, and a probability of 2% that the object is not a person).

Upon determining a confidence level (e.g., based on statistics and probabilistic determinations) is below a threshold required for predicted safe operation, a relatively low confidence level (e.g., single probability score) may trigger planner 1164 to transmit a request 1135 for teleoperation support to autonomous vehicle service platform 1101. In some cases, telemetry data and a set of candidate trajectories may accompany the request. Examples of telemetry data include sensor data, localization data, perception data, and the like. A teleoperator 1108 may transmit via teleoperator computing device 1104 a selected trajectory 1137 to guided trajectory generator 1126. As such, selected trajectory 1137 is a trajectory formed with guidance from a teleoperator. Upon confirming there is no change in the state (e.g., a non-normative state is pending), guided trajectory generator 1126 passes data to trajectory generator 1124, which, in turn, causes trajectory tracker 1128, as a trajectory tracking controller, to use the teleop-specified trajectory for generating control signals 1170 (e.g., steering angles, velocity, etc.). Note that planner 1164 may trigger transmission of a request 1135 for teleoperation support prior to a state transitioning to a non-normative state. In particular, an autonomous vehicle controller and/or its components can predict that a distant obstacle may be problematic and preemptively cause planner 1164 to invoke teleoperations prior to the autonomous vehicle reaching the obstacle. Otherwise, the autonomous vehicle may cause a delay by transitioning to a safe state upon encountering the obstacle or scenario (e.g., pulling over and off the roadway). In another example, teleoperations may be automatically invoked prior to an autonomous vehicle approaching a particular location that is known to be difficult to navigate. This determination may optionally take into consideration other factors, including the time of day, the position of the sun, if such situation is likely to cause a disturbance to the reliability of sensor readings, and traffic or accident data derived from a variety of sources.

Figure 12:
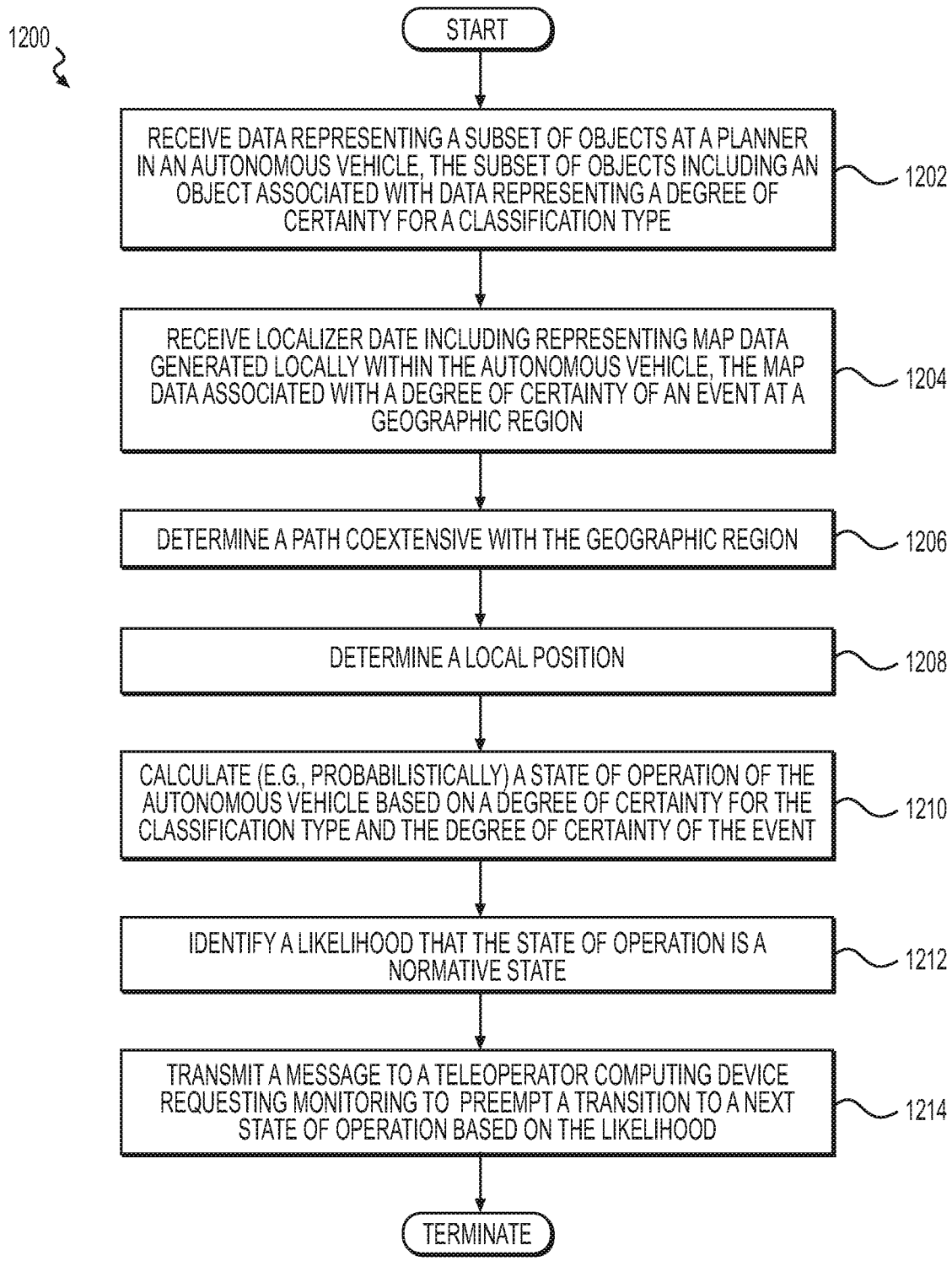
FIG. 12 is an example of a flow diagram configured to control an autonomous vehicle, according to some embodiments.

FIG. 12 is an example of a flow diagram configured to control an autonomous vehicle, according to some embodiments. At 1202, flow 1200 begins. Data representing a subset of objects that are received at a planner in an autonomous vehicle, the subset of objects including at least one object associated with data representing a degree of certainty for a classification type. For example, perception engine data may include metadata associated with objects, whereby the metadata specifies a degree of certainty associated with a specific classification type. For instance, a dynamic object may be classified as a "young pedestrian" with an 85% confidence level of being correct. At 1204, localizer data may be received (e.g., at a planner). The localizer data may include map data that is generated locally within the autonomous vehicle. The local map data may specify a degree of certainty (including a degree of uncertainty) that an event at a geographic region may occur. An event may be a condition or situation affecting operation, or potentially affecting operation, of an autonomous vehicle. The events may be internal (e.g., failed or impaired sensor) to an autonomous vehicle, or external (e.g., roadway obstruction). Examples of events are described herein, such as in FIG. 2 as well as in other figures and passages. A path coextensive with the geographic region of interest may be determined at 1206. For example, consider that the event is the positioning of the sun in the sky at a time of day in which the intensity of sunlight impairs the vision of drivers during rush hour traffic. As such, it is expected or predicted that traffic may slow down responsive to the bright sunlight. Accordingly, a planner may preemptively invoke teleoperations if an alternate path to avoid the event is less likely. At 1208, a local position is determined at a planner based on local pose data. At 1210, a state of operation of an autonomous vehicle may be determined (e.g., probabilistically), for example, based on a degree of certainty for a classification type and a degree of certainty of the event, which is may be based on any number of factors, such as speed, position, and other state information. To illustrate, consider an example in which a young pedestrian is detected by the autonomous vehicle during the event in which other drivers' vision likely will be impaired by the sun, thereby causing an unsafe situation for the young pedestrian. Therefore, a relatively unsafe situation can be detected as a probabilistic event that may be likely to occur (i.e., an unsafe situation for which teleoperations may be invoked). At 1212, a likelihood that the state of operation is in a normative state is determined, and based on the determination, a message is transmitted to a teleoperator computing device requesting teleoperations to preempt a transition to a next state of operation (e.g., preempt transition from a normative to non-normative state of operation, such as an unsafe state of operation).

Figure 13:
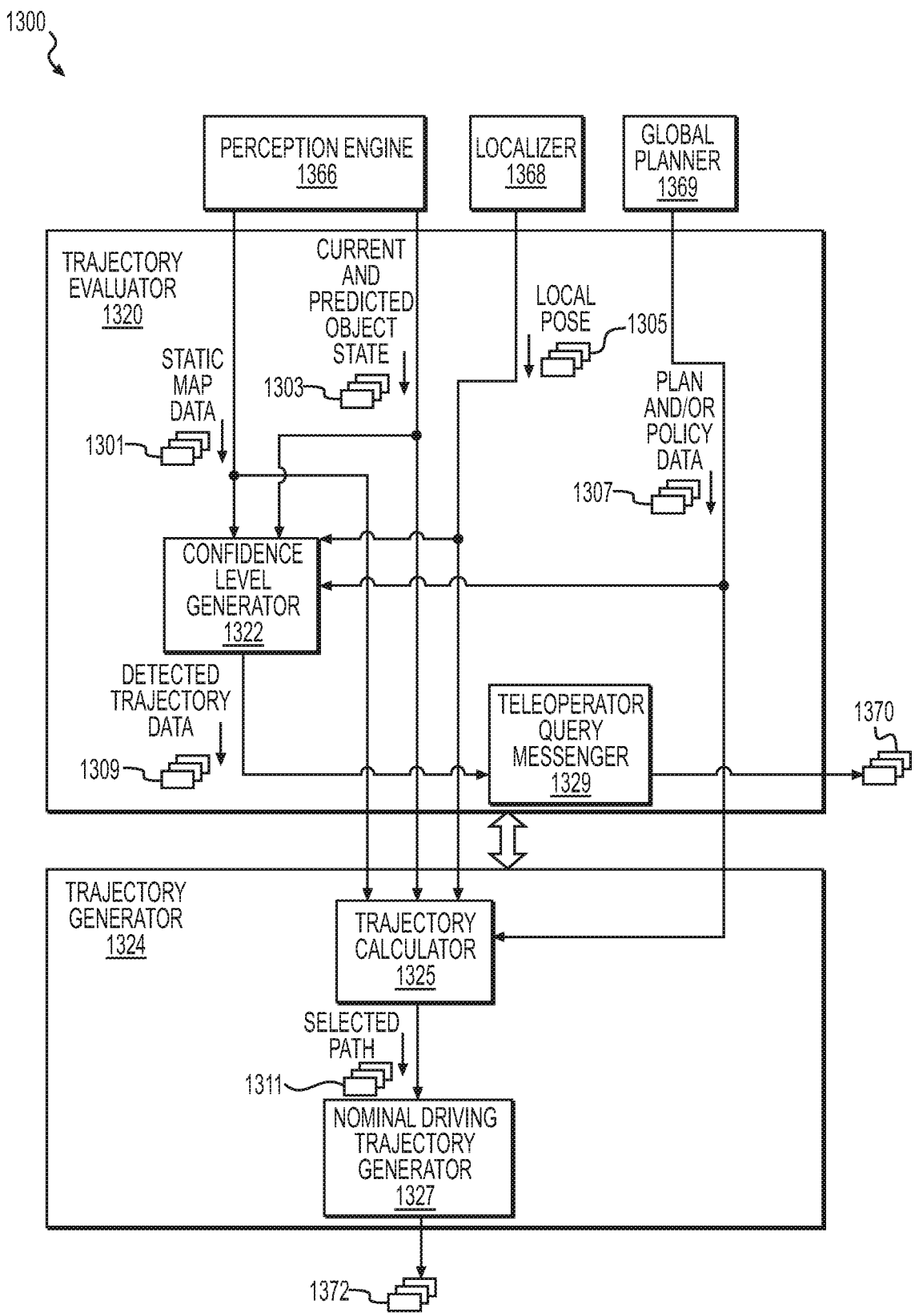
FIG. 13 depicts an example in which a planner may generate a trajectory, according to some examples.

FIG. 13 depicts an example in which a planner may generate a trajectory, according to some examples. Diagram 1300 includes a trajectory evaluator 1320 and a trajectory generator 1324. Trajectory evaluator 1320 includes a confidence level generator 1322 and a teleoperator query messenger 1329. As shown, trajectory evaluator 1320 is coupled to a perception engine 1366 to receive static map data 1301, and current and predicted object state data 1303. Trajectory evaluator 1320 also receives local pose data 1305 from localizer 1368 and plan data 1307 from a global planner 1369. In one state of operation (e.g., non-normative), confidence level generator 1322 receives static map data 1301 and current and predicted object state data 1303. Based on this data, confidence level generator 1322 may determine that detected trajectories are associated with unacceptable confidence level values. As such, confidence level generator 1322 transmits detected trajectory data 1309 (e.g., data including candidate trajectories) to notify a teleoperator via teleoperator query messenger 1329, which, in turn, transmits a request 1370 for teleoperator assistance.

In another state of operation (e.g., a normative state), static map data 1301, current and predicted object state data 1303, local pose data 1305, and plan data 1307 (e.g., global plan data) are received into trajectory calculator 1325, which is configured to calculate (e.g., iteratively) trajectories to determine an optimal one or more paths. Next, at least one path is selected and is transmitted as selected path data 1311. According to some embodiments, trajectory calculator 1325 is configured to implement re-planning of trajectories as an example. Nominal driving trajectory generator 1327 is configured to generate trajectories in a refined approach, such as by generating trajectories based on receding horizon control techniques. Nominal driving trajectory generator 1327 subsequently may transmit nominal driving trajectory path data 1372 to, for example, a trajectory tracker or a vehicle controller to implement physical changes in steering, acceleration, and other components.

Figure 14:
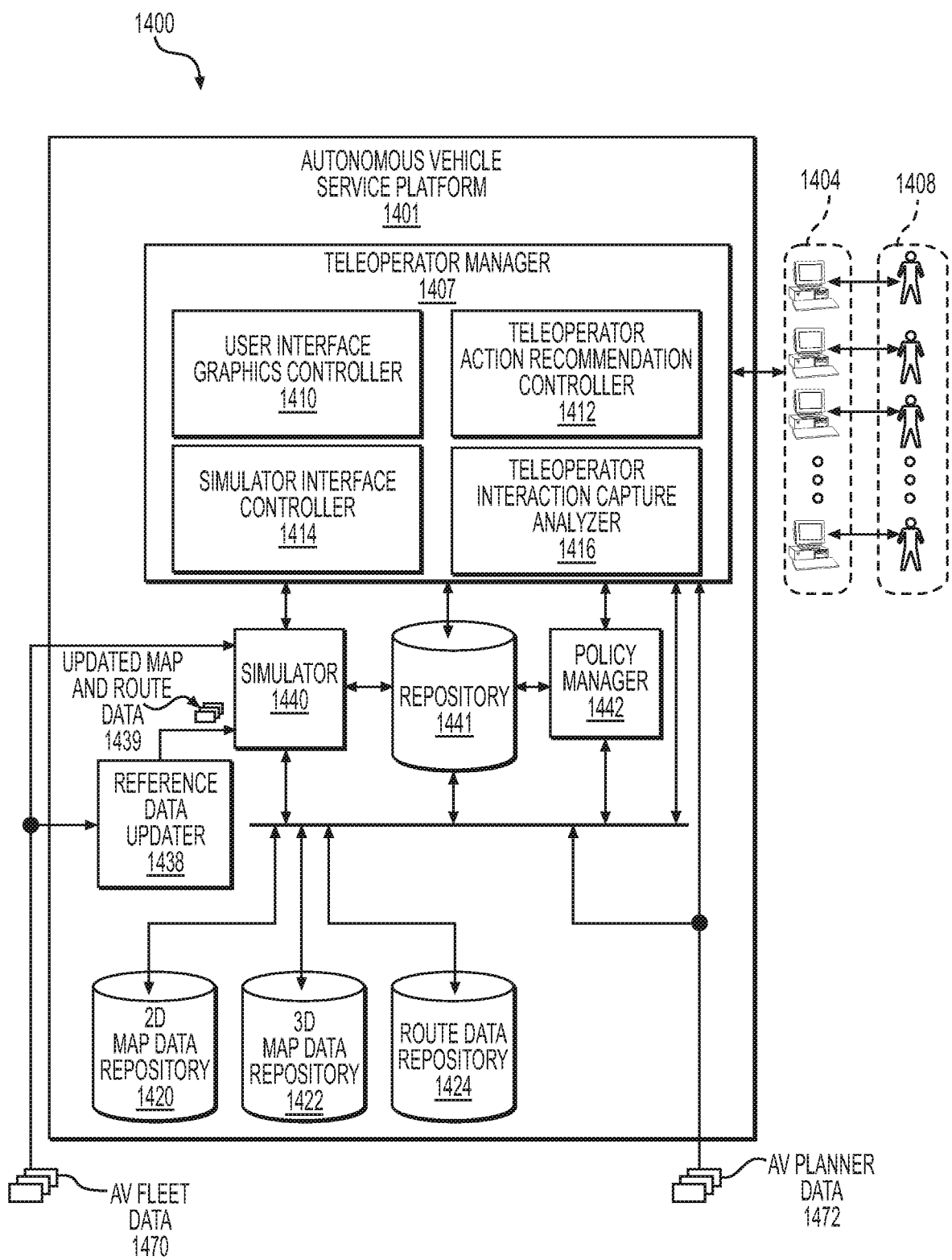
FIG. 14 is a diagram depicting another example of an autonomous vehicle service platform, according to some embodiments.

FIG. 14 is a diagram depicting another example of an autonomous vehicle service platform, according to some embodiments. Diagram 1400 depicts an autonomous vehicle service platform 1401 including a teleoperator manager 1407 that is configured to manage interactions and/or communications among teleoperators 1408, teleoperator computing devices 1404, and other components of autonomous vehicle service platform 1401. Further to diagram 1400, autonomous vehicle service platform 1401 includes a simulator 1440, a repository 1441, a policy manager 1442, a reference data updater 1438, a 2D map data repository 1420, a 3D map data repository 1422, and a route data repository 1424. Other map data, such as 4D map data (e.g., using epoch determination), may be implemented and stored in a repository (not shown).

Teleoperator action recommendation controller 1412 includes logic configured to receive and/or control a teleoperation service request via autonomous vehicle ("AV") planner data 1472, which can include requests for teleoperator assistance as well as telemetry data and other data. As such, planner data 1472 may include recommended candidate trajectories or paths from which a teleoperator 1408 via teleoperator computing device 1404 may select. According to some examples, teleoperator action recommendation controller 1412 may be configured to access other sources of recommended candidate trajectories from which to select an optimum trajectory. For example, candidate trajectories contained in autonomous vehicle planner data 1472 may, in parallel, be introduced into simulator 1440, which is configured to simulate an event or condition being experienced by an autonomous vehicle requesting teleoperator assistance. Simulator 1440 can access map data and other data necessary for performing a simulation on the set of candidate trajectories, whereby simulator 1440 need not exhaustively reiterate simulations to confirm sufficiency. Rather, simulator 1440 may provide either confirm the appropriateness of the candidate trajectories, or may otherwise alert a teleoperator to be cautious in their selection.

Teleoperator interaction capture analyzer 1416 may be configured to capture numerous amounts of teleoperator transactions or interactions for storage in repository 1441, which, for example, may accumulate data relating to a number of teleoperator transactions for analysis and generation of policies, at least in some cases. According to some embodiments, repository 1441 may also be configured to store policy data for access by policy manager 1442. Further, teleoperator interaction capture analyzer 1416 may apply machine learning techniques to empirically determine how best to respond to events or conditions causing requests for teleoperation assistance. In some cases, policy manager 1442 may be configured to update a particular policy or generate a new policy responsive to analyzing the large set of teleoperator interactions (e.g., subsequent to applying machine learning techniques). Policy manager 1442 manages policies that may be viewed as rules or guidelines with which an autonomous vehicle controller and its components operate under to comply with autonomous operations of a vehicle. In some cases, a modified or updated policy may be applied to simulator 1440 to confirm the efficacy of permanently releasing or implementing such policy changes.

Simulator interface controller 1414 is configured to provide an interface between simulator 1440 and teleoperator computing devices 1404. For example, consider that sensor data from a fleet of autonomous vehicles is applied to reference data updater 1438 via autonomous ("AV") fleet data 1470, whereby reference data updater 1438 is configured to generate updated map and route data 1439. In some implementations, updated map and route data 1439 may be preliminarily released as an update to data in map data repositories 1420 and 1422, or as an update to data in route data repository 1424. In this case, such data may be tagged as being a "beta version" in which a lower threshold for requesting teleoperator service may be implemented when, for example, a map tile including preliminarily updated information is used by an autonomous vehicle. Further, updated map and route data 1439 may be introduced to simulator 1440 for validating the updated map data. Upon full release (e.g., at the close of beta testing), the previously lowered threshold for requesting a teleoperator service related to map tiles is canceled. User interface graphics controller 1410 provides rich graphics to teleoperators 1408, whereby a fleet of autonomous vehicles may be simulated within simulator 1440 and may be accessed via teleoperator computing device 1404 as if the simulated fleet of autonomous vehicles were real.

Figure 15:
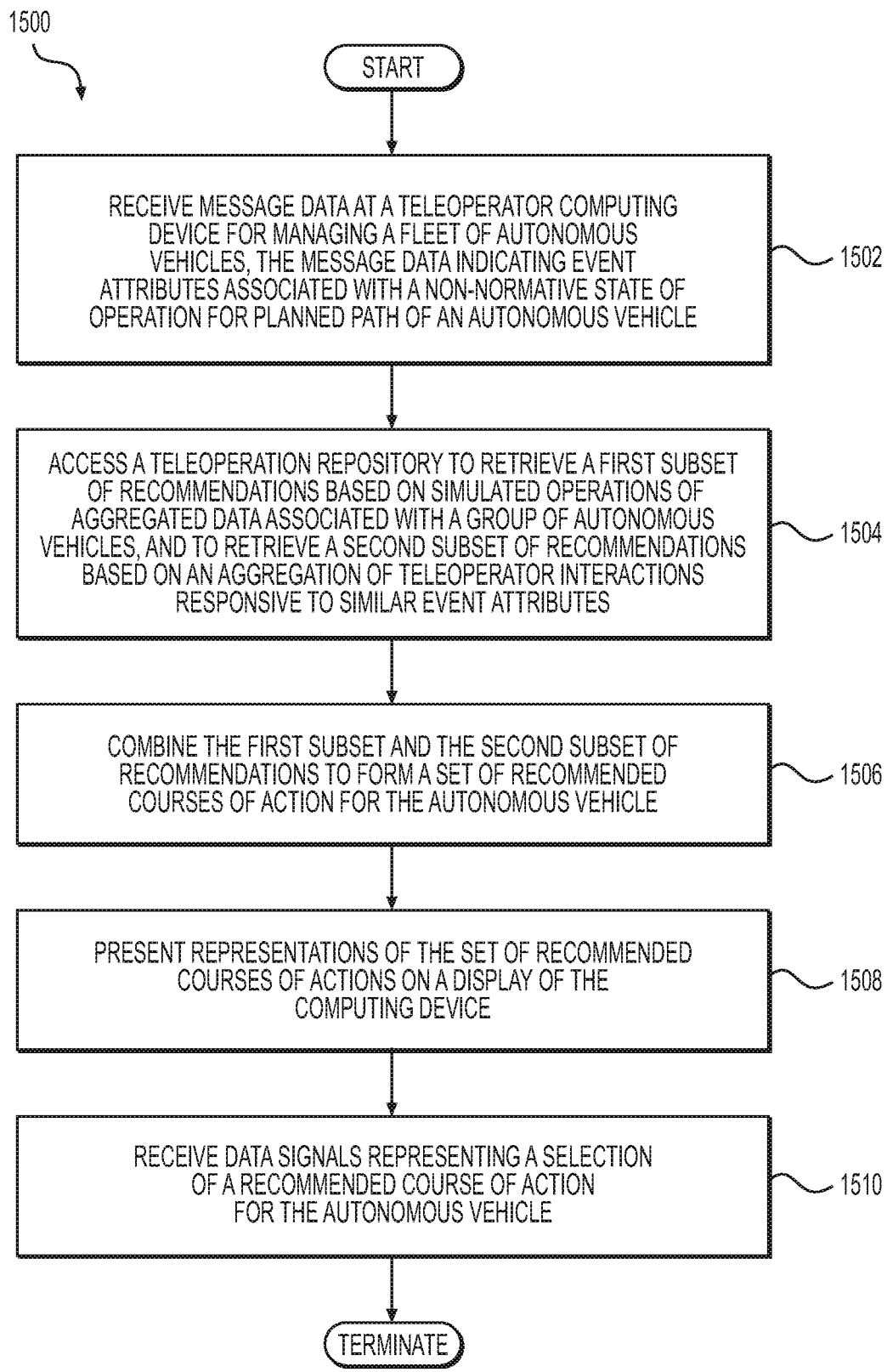
FIG. 15 is an example of a flow diagram to control an autonomous vehicle, according to some embodiments.

FIG. 15 is an example of a flow diagram to control an autonomous vehicle, according to some embodiments. At 1502, flow 1500 begins. Message data may be received at a teleoperator computing device for managing a fleet of autonomous vehicles. The message data may indicate event attributes associated with a non-normative state of operation in the context of a planned path for an autonomous vehicle. For example, an event may be characterized as a particular intersection that becomes problematic due to, for example, a large number of pedestrians, hurriedly crossing the street against a traffic light. The event attributes describe the characteristics of the event, such as, for example, the number of people crossing the street, the traffic delays resulting from an increased number of pedestrians, etc. At 1504, a teleoperation repository may be accessed to retrieve a first subset of recommendations based on simulated operations of aggregated data associated with a group of autonomous vehicles. In this case, a simulator may be a source of recommendations with which a teleoperator may implement. Further, the teleoperation repository may also be accessed to retrieve a second subset of recommendations based on an aggregation of teleoperator interactions responsive to similar event attributes. In particular, a teleoperator interaction capture analyzer may apply machine learning techniques to empirically determine how best to respond to events having similar attributes based on previous requests for teleoperation assistance. At 1506, the first subset and the second subset of recommendations are combined to form a set of recommended courses of action for the autonomous vehicle. At 1508, representations of the set of recommended courses of actions may be presented visually on a display of a teleoperator computing device. At 1510, data signals representing a selection (e.g., by teleoperator) of a recommended course of action may be detected.

Figure 16:
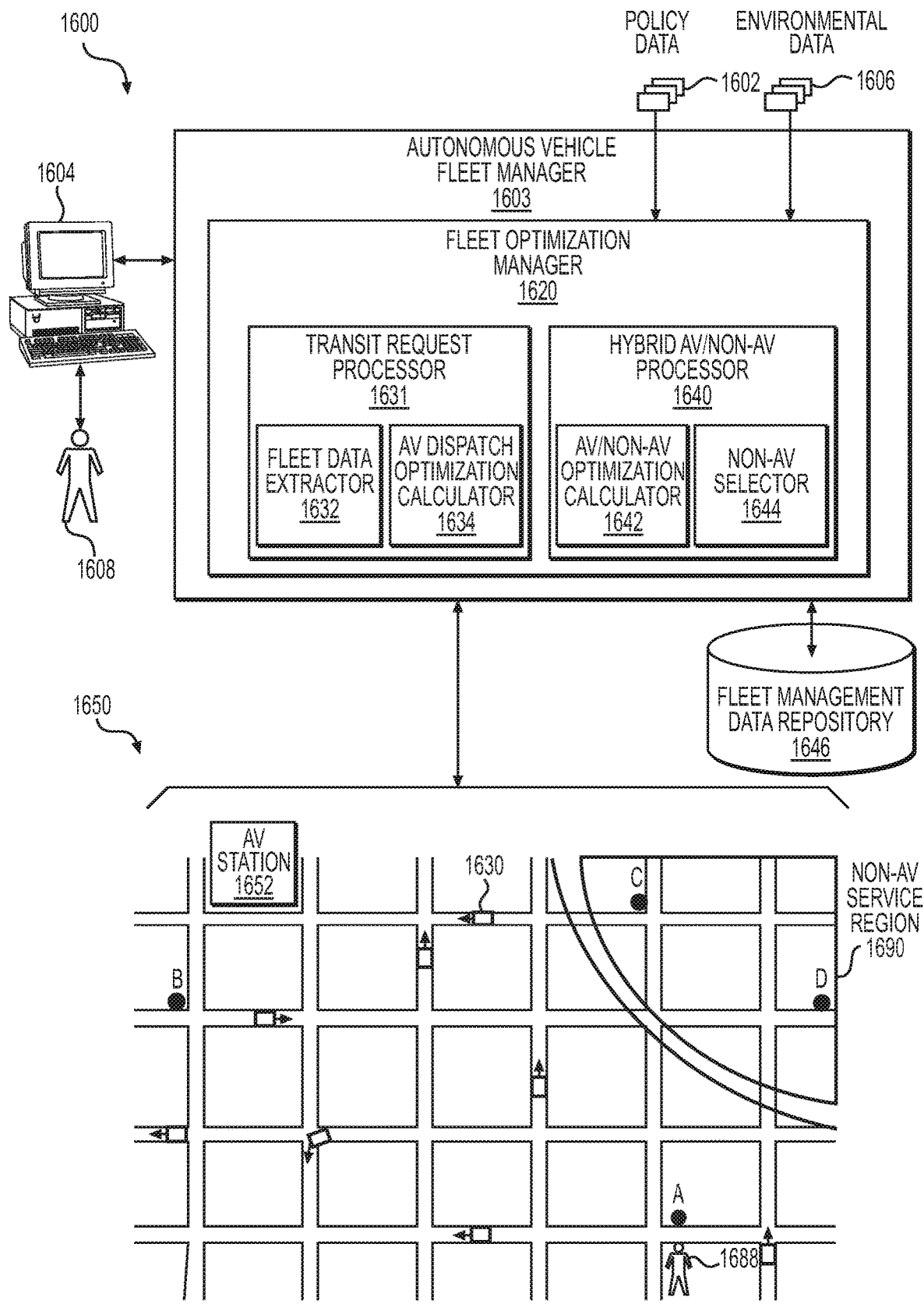
FIG. 16 is a diagram of an example of an autonomous vehicle fleet manager implementing a fleet optimization manager, according to some examples.

FIG. 16 is a diagram of an example of an autonomous vehicle fleet manager implementing a fleet optimization manager, according to some examples. Diagram 1600 depicts an autonomous vehicle fleet manager that is configured to manage a fleet of autonomous vehicles 1630 transiting within a road network 1650. Autonomous vehicle fleet manager 1603 is coupled to a teleoperator 1608 via a teleoperator computing device 1604, and is also coupled to a fleet management data repository 1646. Autonomous vehicle fleet manager 1603 is configured to receive policy data 1602 and environmental data 1606, as well as other data. Further to diagram 1600, fleet optimization manager 1620 is shown to include a transit request processor 1631, which, in turn, includes a fleet data extractor 1632 and an autonomous vehicle dispatch optimization calculator 1634. Transit request processor 1631 is configured to process transit requests, such as from a user 1688 who is requesting autonomous vehicle service. Fleet data extractor 1632 is configured to extract data relating to autonomous vehicles in the fleet. Data associated with each autonomous vehicle is stored in repository 1646. For example, data for each vehicle may describe maintenance issues, scheduled service calls, daily usage, battery charge and discharge rates, and any other data, which may be updated in real-time, may be used for purposes of optimizing a fleet of autonomous vehicles to minimize downtime. Autonomous vehicle dispatch optimization calculator 1634 is configured to analyze the extracted data and calculate optimized usage of the fleet so as to ensure that the next vehicle dispatched, such as from station 1652, provides for the least travel times and/or costs—in the aggregate—for the autonomous vehicle service.

Fleet optimization manager 1620 is shown to include a hybrid autonomous vehicle/non-autonomous vehicle processor 1640, which, in turn, includes an AV/non-AV optimization calculator 1642 and a non-AV selector 1644. According to some examples, hybrid autonomous vehicle/non-autonomous vehicle processor 1640 is configured to manage a hybrid fleet of autonomous vehicles and human-driven vehicles (e.g., as independent contractors). As such, autonomous vehicle service may employ non-autonomous vehicles to meet excess demand, or in areas, such as non-AV service region 1690, that may be beyond a geo-fence or in areas of poor communication coverage. AV/non-AV optimization calculator 1642 is configured to optimize usage of the fleet of autonomous and to invite non-AV drivers into the transportation service (e.g., with minimal or no detriment to the autonomous vehicle service). Non-AV selector 1644 includes logic for selecting a number of non-AV drivers to assist based on calculations derived by AV/non-AV optimization calculator 1642.

Figure 17:
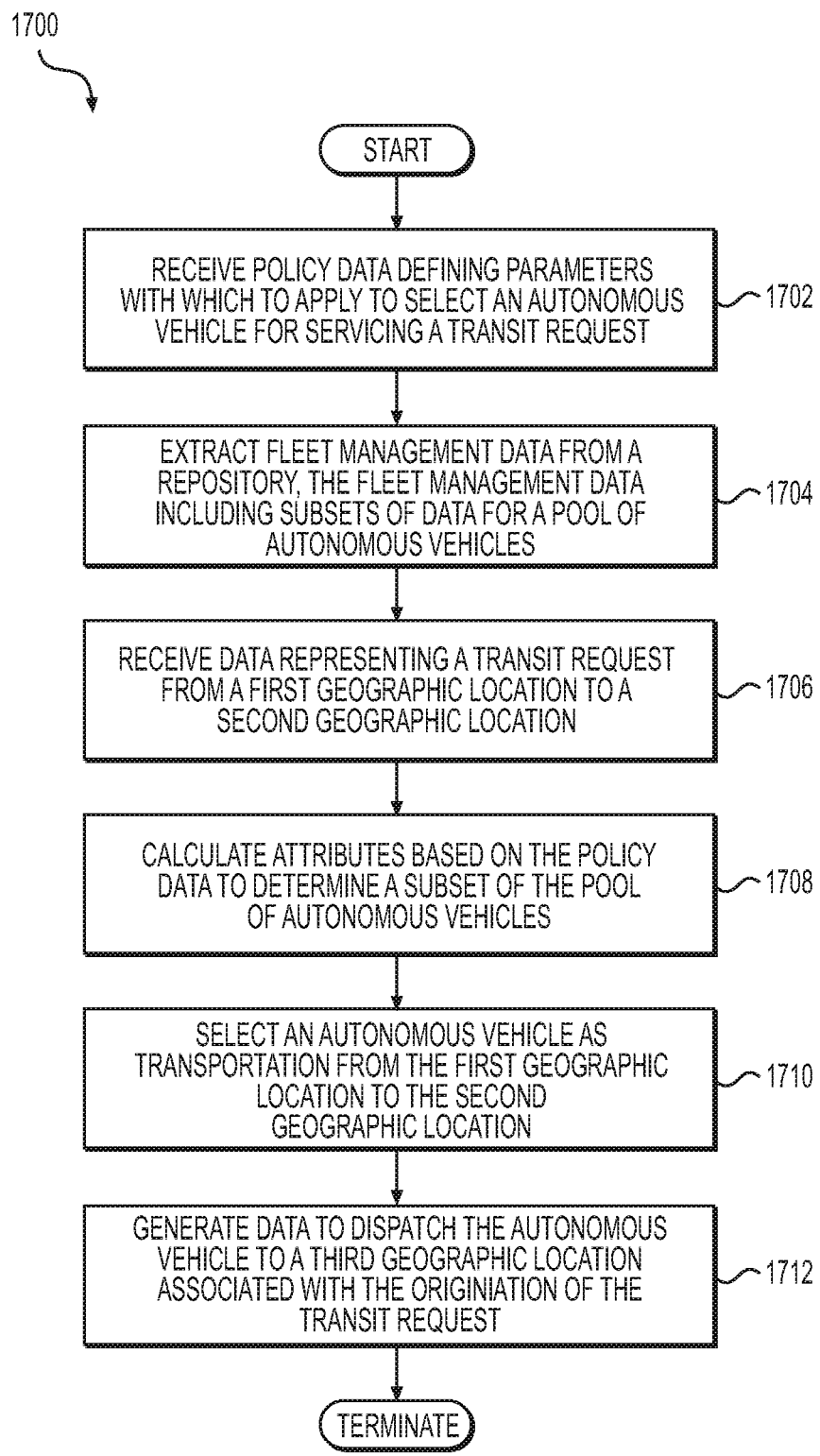
FIG. 17 is an example of a flow diagram for managing a fleet of autonomous vehicles, according to some embodiments.

FIG. 17 is an example of a flow diagram to manage a fleet of autonomous vehicles, according to some embodiments. At 1702, flow 1700 begins. At 1702, policy data is received. The policy data may include parameters that define how best apply to select an autonomous vehicle for servicing a transit request. At 1704, fleet management data from a repository may be extracted. The fleet management data includes subsets of data for a pool of autonomous vehicles (e.g., the data describes the readiness of vehicles to service a transportation request). At 1706, data representing a transit request is received. For exemplary purposes, the transit request could be for transportation from a first geographic location to a second geographic location. At 1708, attributes based on the policy data are calculated to determine a subset of autonomous vehicles that are available to service the request. For example, attributes may include a battery charge level and time until next scheduled maintenance. At 1710, an autonomous vehicle is selected as transportation from the first geographic location to the second geographic location, and data is generated to dispatch the autonomous vehicle to a third geographic location associated with the origination of the transit request.

Figure 18:
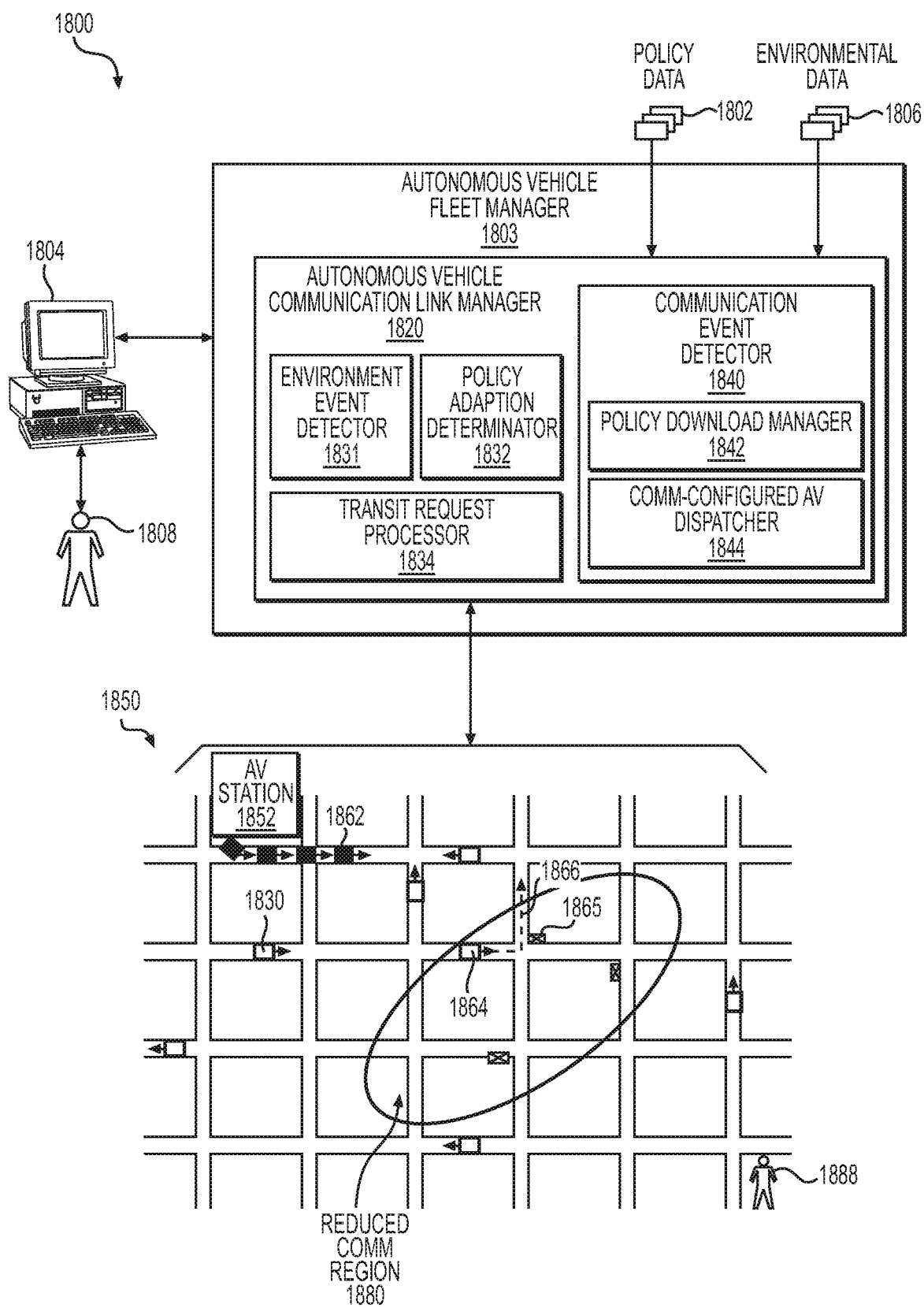
FIG. 18 is a diagram illustrating an autonomous vehicle fleet manager implementing an autonomous vehicle communications link manager, according to some embodiments.

FIG. 18 is a diagram illustrating an autonomous vehicle fleet manager implementing an autonomous vehicle communications link manager, according to some embodiments. Diagram 1800 depicts an autonomous vehicle fleet manager that is configured to manage a fleet of autonomous vehicles 1830 transiting within a road network 1850 that coincides with a communication outage at an area identified as "reduced communication region" 1880. Autonomous vehicle fleet manager 1803 is coupled to a teleoperator 1808 via a teleoperator computing device 1804. Autonomous vehicle fleet manager 1803 is configured to receive policy data 1802 and environmental data 1806, as well as other data. Further to diagram 1800, an autonomous vehicle communications link manager 1820 is shown to include an environment event detector 1831, a policy adaption determinator 1832, and a transit request processor 1834. Environment event detector 1831 is configured to receive environmental data 1806 specifying a change within the environment in which autonomous vehicle service is implemented. For example, environmental data 1806 may specify that region 1880 has degraded communication services, which may affect the autonomous vehicle service. Policy adaption determinator 1832 may specify parameters with which to apply when receiving transit requests during such an event (e.g., during a loss of communications). Transit request processor 1834 is configured to process transit requests in view of the degraded communications. In this example, a user 1888 is requesting autonomous vehicle service. Further, transit request processor 1834 includes logic to apply an adapted policy for modifying the way autonomous vehicles are dispatched so to avoid complications due to poor communications.

Communication event detector 1840 includes a policy download manager 1842 and communications-configured ("COMM-configured") AV dispatcher 1844. Policy download manager 1842 is configured to provide autonomous vehicles 1830 an updated policy in view of reduced communications region 1880, whereby the updated policy may specify routes to quickly exit region 1880 if an autonomous vehicle enters that region. For example, autonomous vehicle 1864 may receive an updated policy moments before driving into region 1880. Upon loss of communications, autonomous vehicle 1864 implements the updated policy and selects route 1866 to drive out of region 1880 quickly. COMM-configured AV dispatcher 1844 may be configured to identify points 1865 at which to park autonomous vehicles that are configured as relays to establishing a peer-to-peer network over region 1880. As such, COMM-configured AV dispatcher 1844 is configured to dispatch autonomous vehicles 1862 (without passengers) to park at locations 1865 for the purposes of operating as communication towers in a peer-to-peer ad hoc network.

Figure 19:
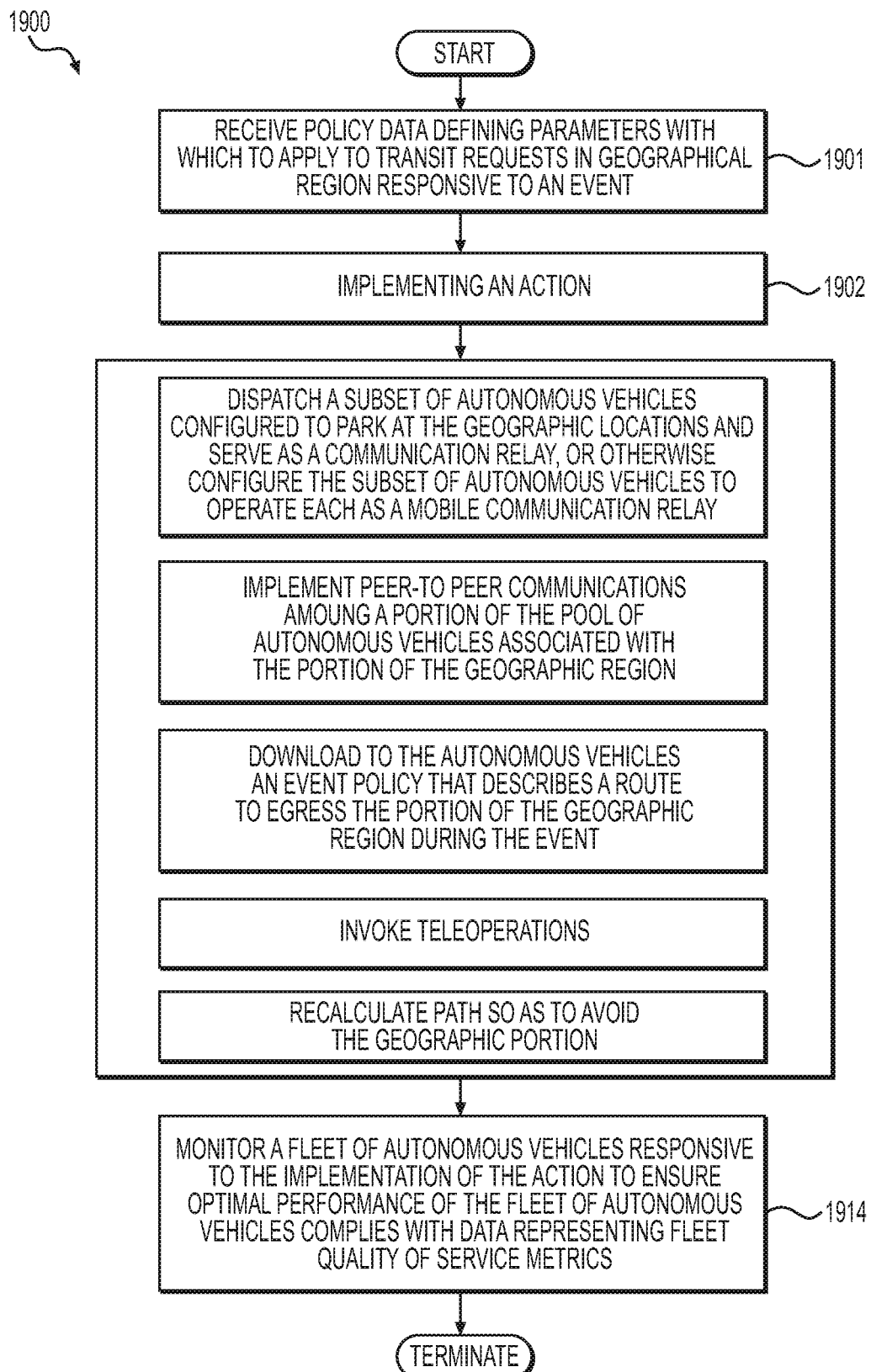
FIG. 19 is an example of a flow diagram to determine actions for autonomous vehicles during an event, according to some embodiments.

FIG. 19 is an example of a flow diagram to determine actions for autonomous vehicles during an event, such as degraded or lost communications, according to some embodiments. At 1901, flow 1900 begins. Policy data is received, whereby the policy data defines parameters with which to apply to transit requests in a geographical region during an event. At 1902, one or more of the following actions may be implemented: (1) dispatch a subset of autonomous vehicles to geographic locations in the portion of the geographic location, the subset of autonomous vehicles being configured to either park at specific geographic locations and each serve as a static communication relay, or transit in a geographic region to each serve as a mobile communication relay, (2) implement peer-to-peer communications among a portion of the pool of autonomous vehicles associated with the portion of the geographic region, (3) provide to the autonomous vehicles an event policy that describes a route to egress the portion of the geographic region during an event, (4) invoke teleoperations, and (5) recalculate paths so as to avoid the geographic portion. Subsequent to implementing the action, the fleet of autonomous vehicles is monitored at 1914.

Figure 20:
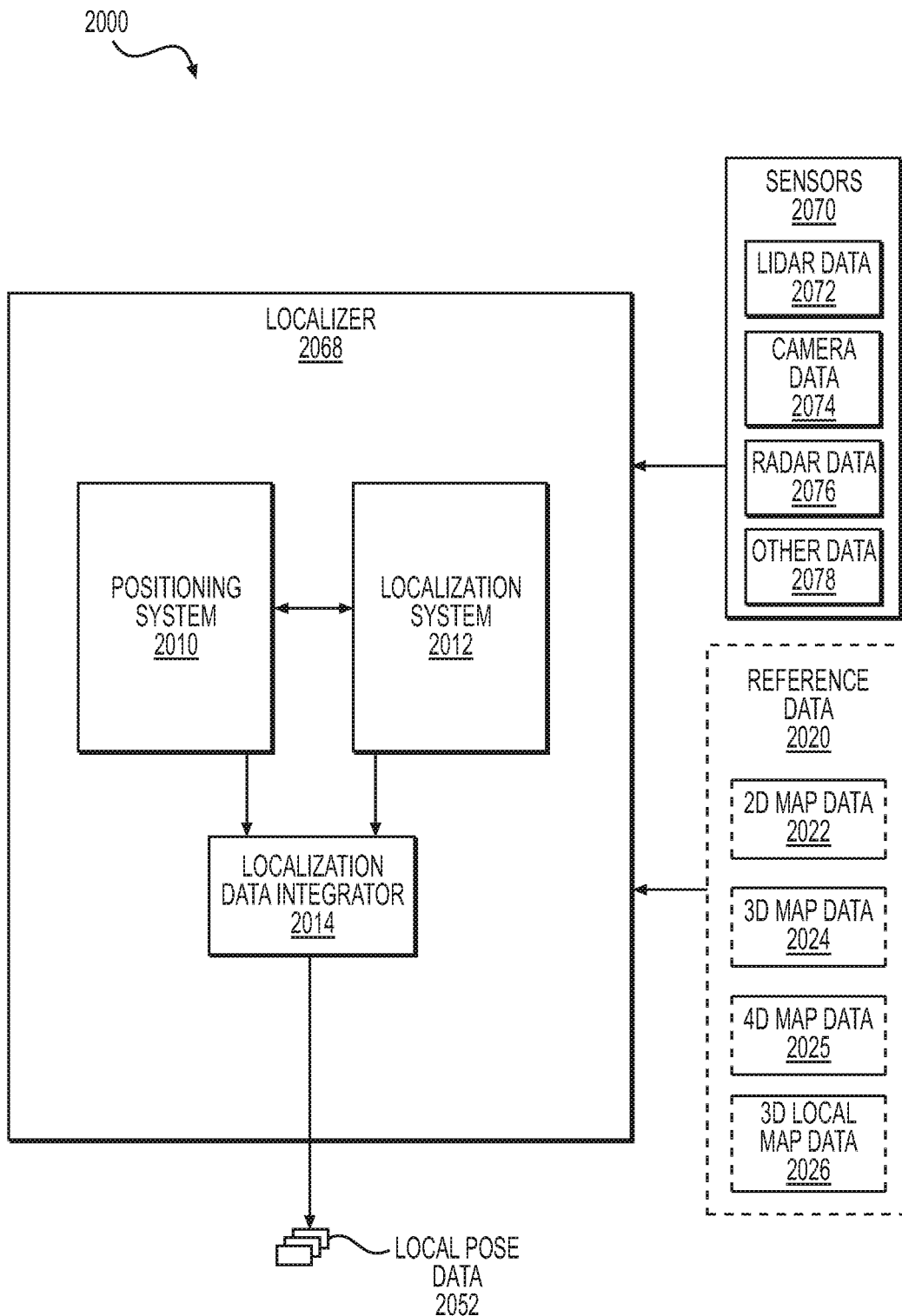
FIG. 20 is a diagram depicting an example of a localizer, according to some embodiments.

FIG. 20 is a diagram depicting an example of a localizer, according to some embodiments. Diagram 2000 includes a localizer 2068 configured to receive sensor data from sensors 2070, such as Lidar data 2072, camera data 2074, radar data 2076, and other data 2078. Further, localizer 2068 is configured to receive reference data 2020, such as 2D map data 2022, 3D map data 2024, and 3D local map data. According to some examples, other map data, such as 4D map data 2025 and semantic map data (not shown), including corresponding data structures and repositories, may also be implemented. Further to diagram 2000, localizer 2068 includes a positioning system 2010 and a localization system 2012, both of which are configured to receive sensor data from sensors 2070 as well as reference data 2020. Localization data integrator 2014 is configured to receive data from positioning system 2010 and data from localization system 2012, whereby localization data integrator 2014 is configured to integrate or fuse sensor data from multiple sensors to form local pose data 2052.

Figure 21:
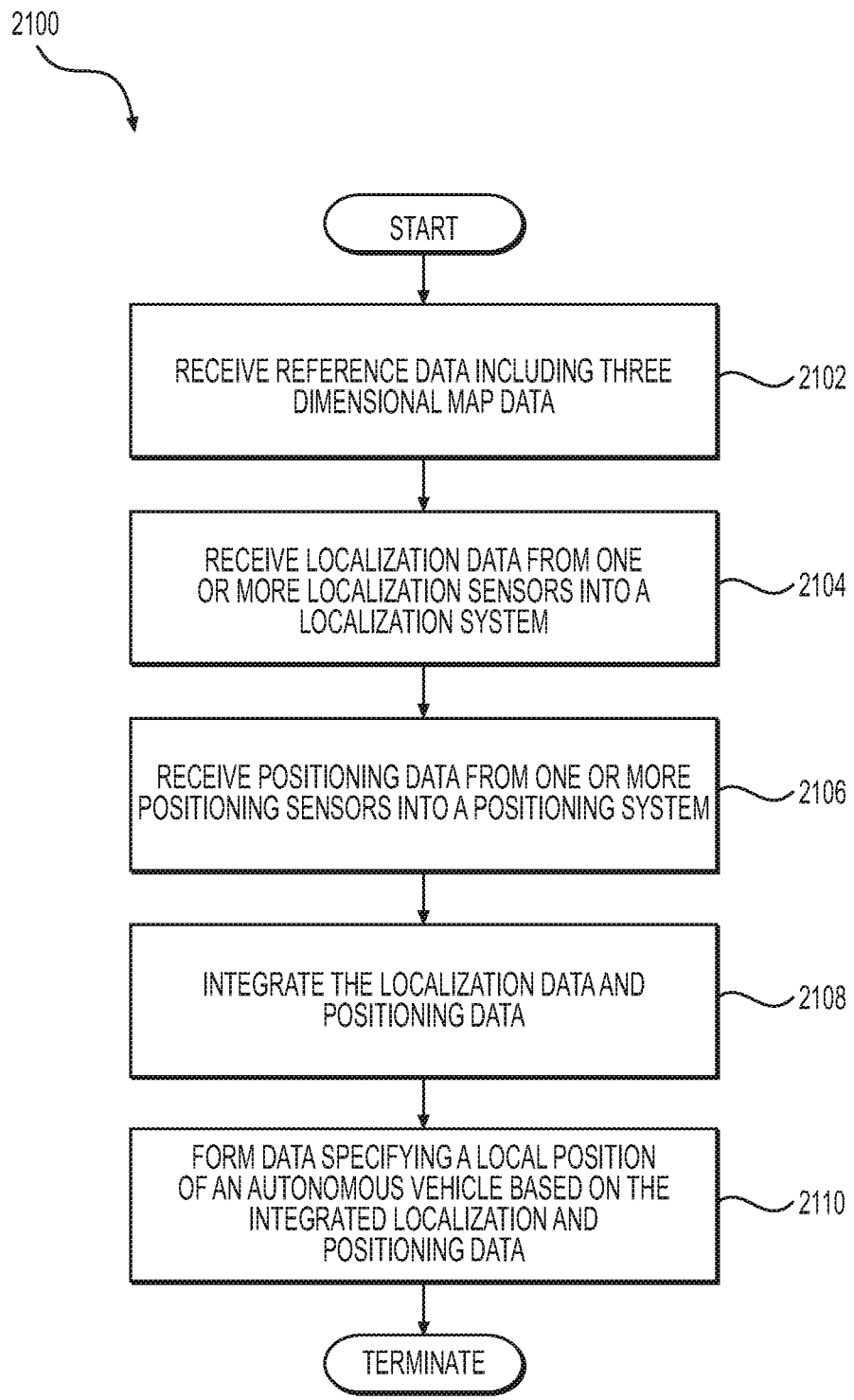
FIG. 21 is an example of a flow diagram to generate local pose data based on integrated sensor data, according to some embodiments.

FIG. 21 is an example of a flow diagram to generate local pose data based on integrated sensor data, according to some embodiments. At 2101, flow 2100 begins. At 2102, reference data is received, the reference data including three dimensional map data. In some examples, reference data, such as 3-D or 4-D map data, may be received via one or more networks. At 2104, localization data from one or more localization sensors is received and placed into a localization system. At 2106, positioning data from one or more positioning sensors is received into a positioning system. At 2108, the localization and positioning data are integrated. At 2110, the localization data and positioning data are integrated to form local position data specifying a geographic position of an autonomous vehicle.

Figure 22:
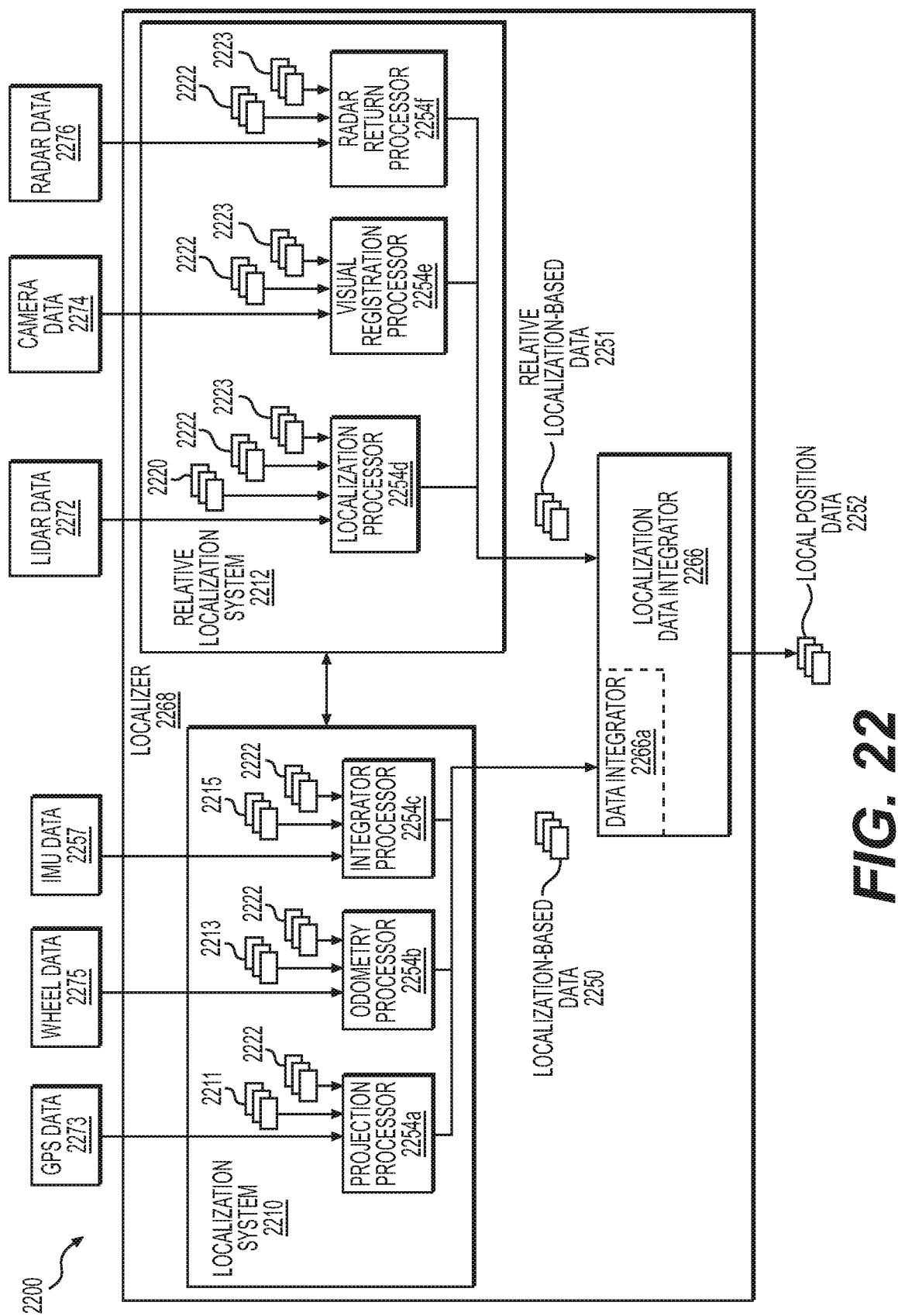
FIG. 22 is a diagram depicting another example of a localizer, according to some embodiments.

FIG. 22 is a diagram depicting another example of a localizer, according to some embodiments. Diagram 2200 includes a localizer 2268, which, in turn, includes a localization system 2210 and a relative localization system 2212 to generate positioning-based data 2250 and local location-based data 2251, respectively. Localization system 2210 includes a projection processor 2254a for processing GPS data 2273, a GPS datum 2211, and 3D Map data 2222, among other optional data (e.g., 4D map data). Localization system 2210 also includes an odometry processor 2254b to process wheel data 2275 (e.g., wheel speed), vehicle model data 2213 and 3D map data 2222, among other optional data. Further yet, localization system 2210 includes an integrator processor 2254c to process IMU data 2257, vehicle model data 2215, and 3D map data 2222, among other optional data. Similarly, relative localization system 2212 includes a Lidar localization processor 2254d for processing Lidar data 2272, 2D tile map data 2220, 3D map data 2222, and 3D local map data 2223, among other optional data. Relative localization system 2212 also includes a visual registration processor 2254e to process camera data 2274, 3D map data 2222, and 3D local map data 2223, among other optional data. Further yet, relative localization system 2212 includes a radar return processor 2254f to process radar data 2276, 3D map data 2222, and 3D local map data 2223, among other optional data. Note that in various examples, other types of sensor data and sensors or processors may be implemented, such as sonar data and the like.

Further to diagram 2200, localization-based data 2250 and relative localization-based data 2251 may be fed into data integrator 2266a and localization data integrator 2266, respectively. Data integrator 2266a and localization data integrator 2266 may be configured to fuse corresponding data, whereby localization-based data 2250 may be fused at data integrator 2266a prior to being fused with relative localization-based data 2251 at localization data integrator 2266. According to some embodiments, data integrator 2266a is formed as part of localization data integrator 2266, or is absent. Regardless, a localization-based data 2250 and relative localization-based data 2251 can be both fed into localization data integrator 2266 for purposes of fusing data to generate local position data 2252. Localization-based data 2250 may include unary-constrained data (and uncertainty values) from projection processor 2254a, as well as binary-constrained data (and uncertainty values) from odometry processor 2254b and integrator processor 2254c. Relative localization-based data 2251 may include unary-constrained data (and uncertainty values) from localization processor 2254d and visual registration processor 2254e, and optionally from radar return processor 2254f. According to some embodiments, localization data integrator 2266 may implement non-linear smoothing functionality, such as a Kalman filter (e.g., a gated Kalman filter), a relative bundle adjuster, pose-graph relaxation, particle filter, histogram filter, or the like.

Figure 23:
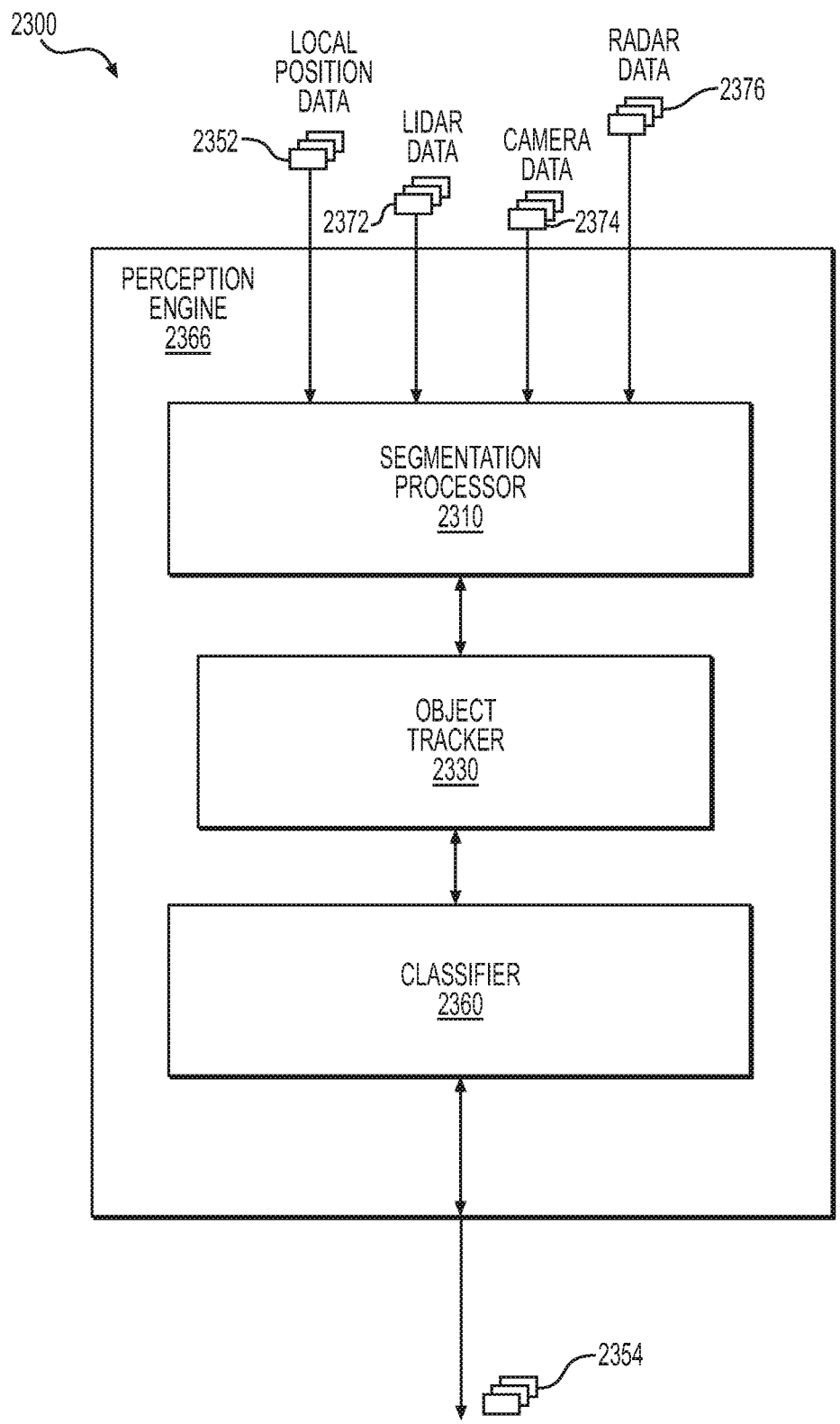
FIG. 23 is a diagram depicting an example of a perception engine, according to some embodiments.

FIG. 23 is a diagram depicting an example of a perception engine, according to some embodiments. Diagram 2300 includes a perception engine 2366, which, in turn, includes a segmentation processor 2310, an object tracker 2330, and a classifier 2360. Further, perception engine 2366 is configured to receive a local position data 2352, Lidar data 2372, camera data 2374, and radar data 2376, for example. Note that other sensor data, such as sonar data, may be accessed to provide functionalities of perception engine 2366. Segmentation processor 2310 is configured to extract ground plane data and/or to segment portions of an image to distinguish objects from each other and from static imagery (e.g., background). In some cases, 3D blobs may be segmented to distinguish each other. In some examples, a blob may refer to a set of features that identify an object in a spatially-reproduced environment and may be composed of elements (e.g., pixels of camera data, points of laser return data, etc.) having similar characteristics, such as intensity and color. In some examples, a blob may also refer to a point cloud (e.g., composed of colored laser return data) or other elements constituting an object. Object tracker 2330 is configured to perform frame-to-frame estimations of motion for blobs, or other segmented image portions. Further, data association is used to associate a blob at one location in a first frame at time, t1, to a blob in a different position in a second frame at time, t2. In some examples, object tracker 2330 is configured to perform real-time probabilistic tracking of 3-D objects, such as blobs. Classifier 2360 is configured to identify an object and to classify that object by classification type (e.g., as a pedestrian, cyclist, etc.) and by energy/activity (e.g. whether the object is dynamic or static), whereby data representing classification is described by a semantic label. According to some embodiments, probabilistic estimations of object categories may be performed, such as classifying an object as a vehicle, bicyclist, pedestrian, etc. with varying confidences per object class. Perception engine 2366 is configured to determine perception engine data 2354, which may include static object maps and/or dynamic object maps, as well as semantic information so that, for example, a planner may use this information to enhance path planning According to various examples, one or more of segmentation processor 2310, object tracker 2330, and classifier 2360 may apply machine learning techniques to generate perception engine data 2354.

Figure 24:
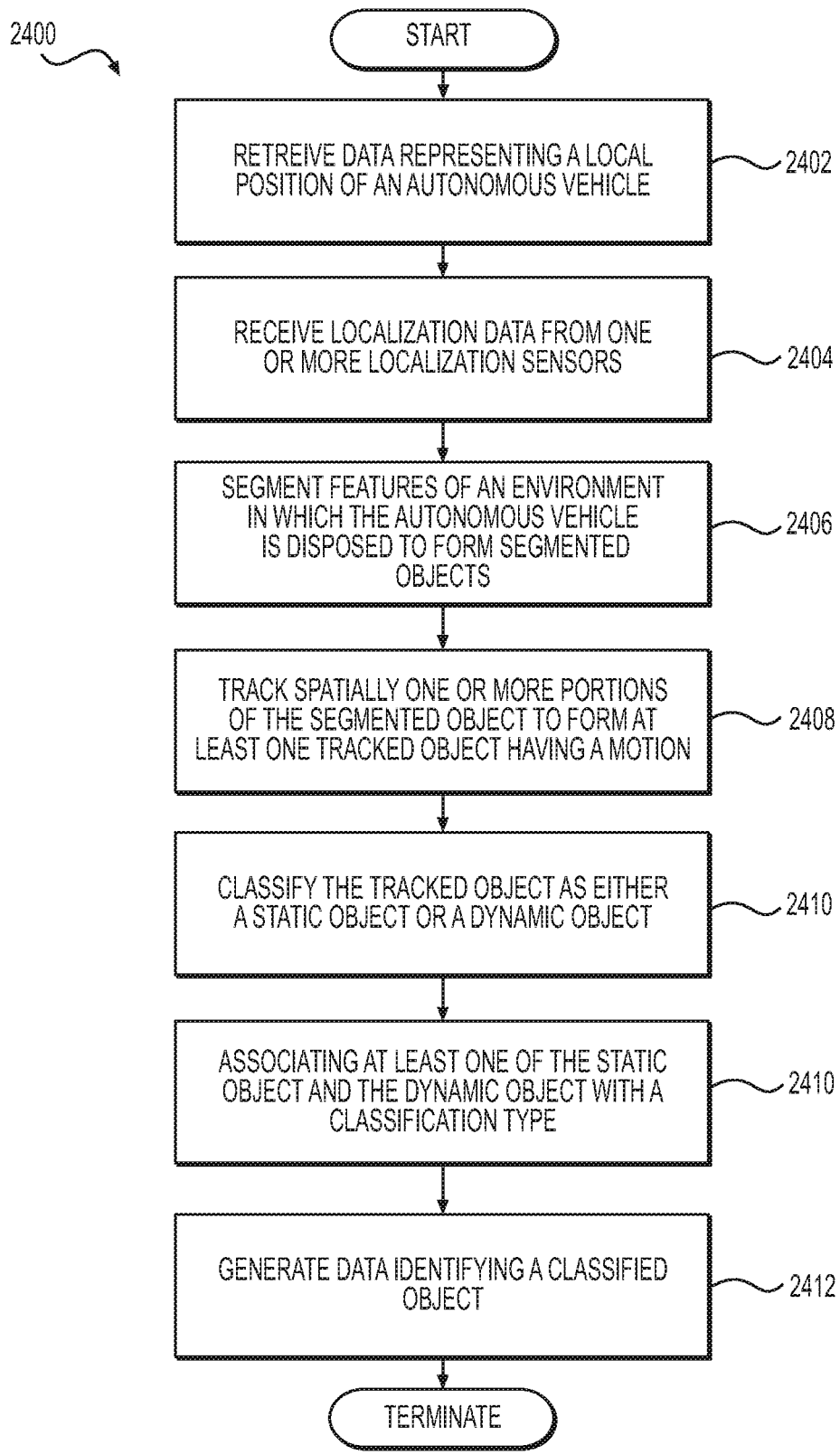
FIG. 24 is an example of a flow chart to generate perception engine data, according to some embodiments.

FIG. 24 is an example of a flow chart to generate perception engine data, according to some embodiments. Flow chart 2400 begins at 2402, at which data representing a local position of an autonomous vehicle is retrieved. At 2404, localization data from one or more localization sensors is received, and features of an environment in which the autonomous vehicle is disposed are segmented at 2406 to form segmented objects. One or more portions of the segmented object are tracked spatially at 2408 to form at least one tracked object having a motion (e.g., an estimated motion). At 2410, a tracked object is classified at least as either being a static object or a dynamic object. In some cases, a static object or a dynamic object may be associated with a classification type. At 2412, data identifying a classified object is generated. For example, the data identifying the classified object may include semantic information.

Figure 25:
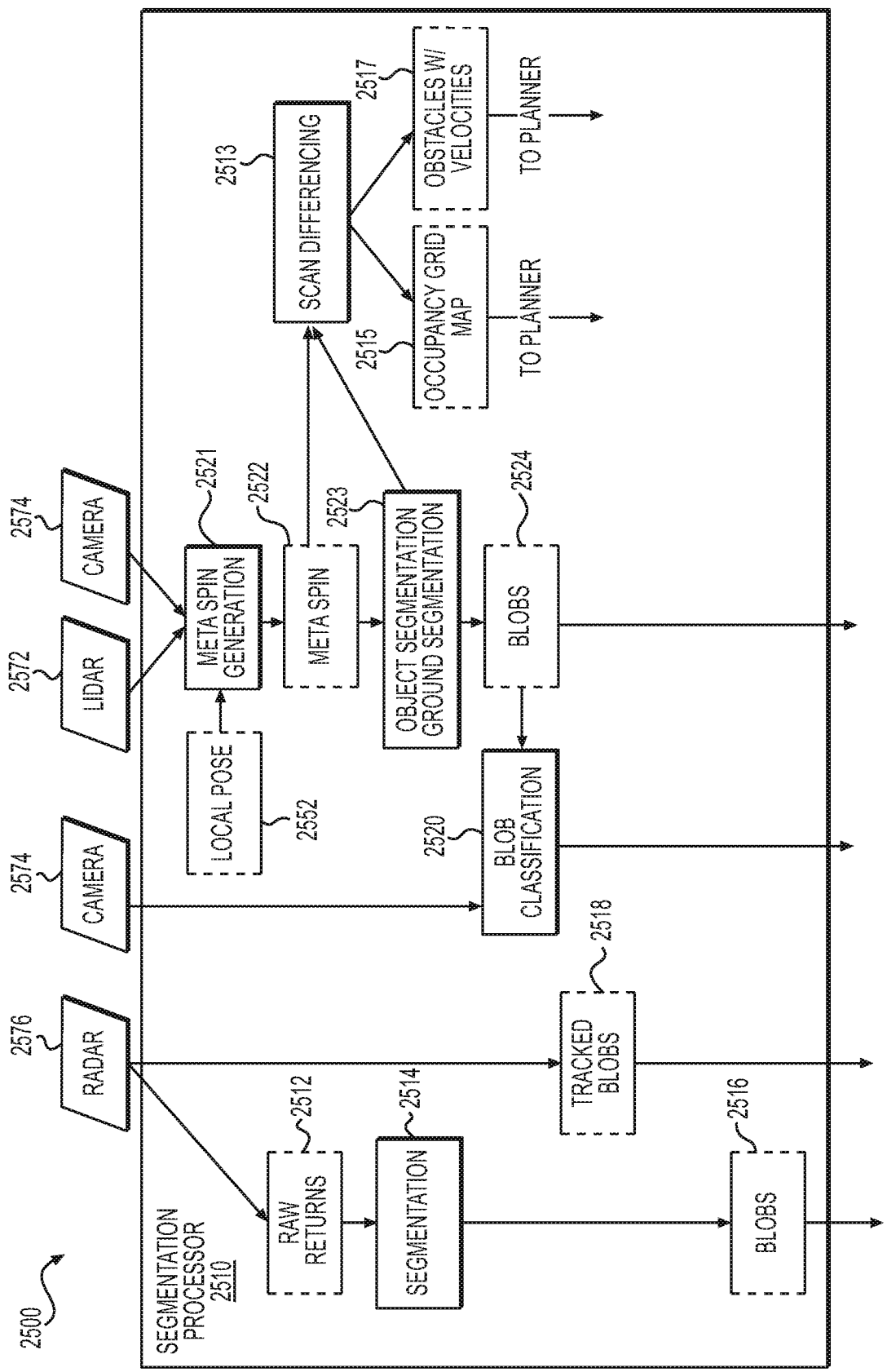
FIG. 25 is an example of a segmentation processor, according to some embodiments.

FIG. 25 is an example of a segmentation processor, according to some embodiments. Diagram 2500 depicts a segmentation processor 2510 receiving Lidar data from one or more Lidars 2572 and camera image data from one or more cameras 2574. Local pose data 2552, Lidar data, and camera image data are received into meta spin generator 2521. In some examples, meta spin generator is configured to partition an image based on various attributes (e.g., color, intensity, etc.) into distinguishable regions (e.g., clusters or groups of a point cloud), at least two or more of which may be updated at the same time or about the same time. Meta spin data 2522 is used to perform object segmentation and ground segmentation at segmentation processor 2523, whereby both meta spin data 2522 and segmentation-related data from segmentation processor 2523 are applied to a scanned differencing processor 2513. Scanned differencing processor 2513 is configured to predict motion and/or relative velocity of segmented image portions, which can be used to identify dynamic objects at 2517. Data indicating objects with detected velocity at 2517 are optionally transmitted to the planner to enhance path planning decisions.

Additionally, data from scanned differencing processor 2513 may be used to approximate locations of objects to form mapping of such objects (as well as optionally identifying a level of motion). In some examples, an occupancy grid map 2515 may be generated. Data representing an occupancy grid map 2515 may be transmitted to the planner to further enhance path planning decisions (e.g., by reducing uncertainties). Further to diagram 2500, image camera data from one or more cameras 2574 are used to classify blobs in blob classifier 2520, which also receives blob data 2524 from segmentation processor 2523. Segmentation processor 2510 also may receive raw radar returns data 2512 from one or more radars 2576 to perform segmentation at a radar segmentation processor 2514, which generates radar-related blob data 2516. Further to FIG. 25, segmentation processor 2510 may also receive and/or generate tracked blob data 2518 related to radar data. Blob data 2516, tracked blob data 2518, data from blob classifier 2520, and blob data 2524 may be used to track objects or portions thereof. According to some examples, one or more of the following may be optional: scanned differencing processor 2513, blob classification 2520, and data from radar 2576.

Figure 26A:
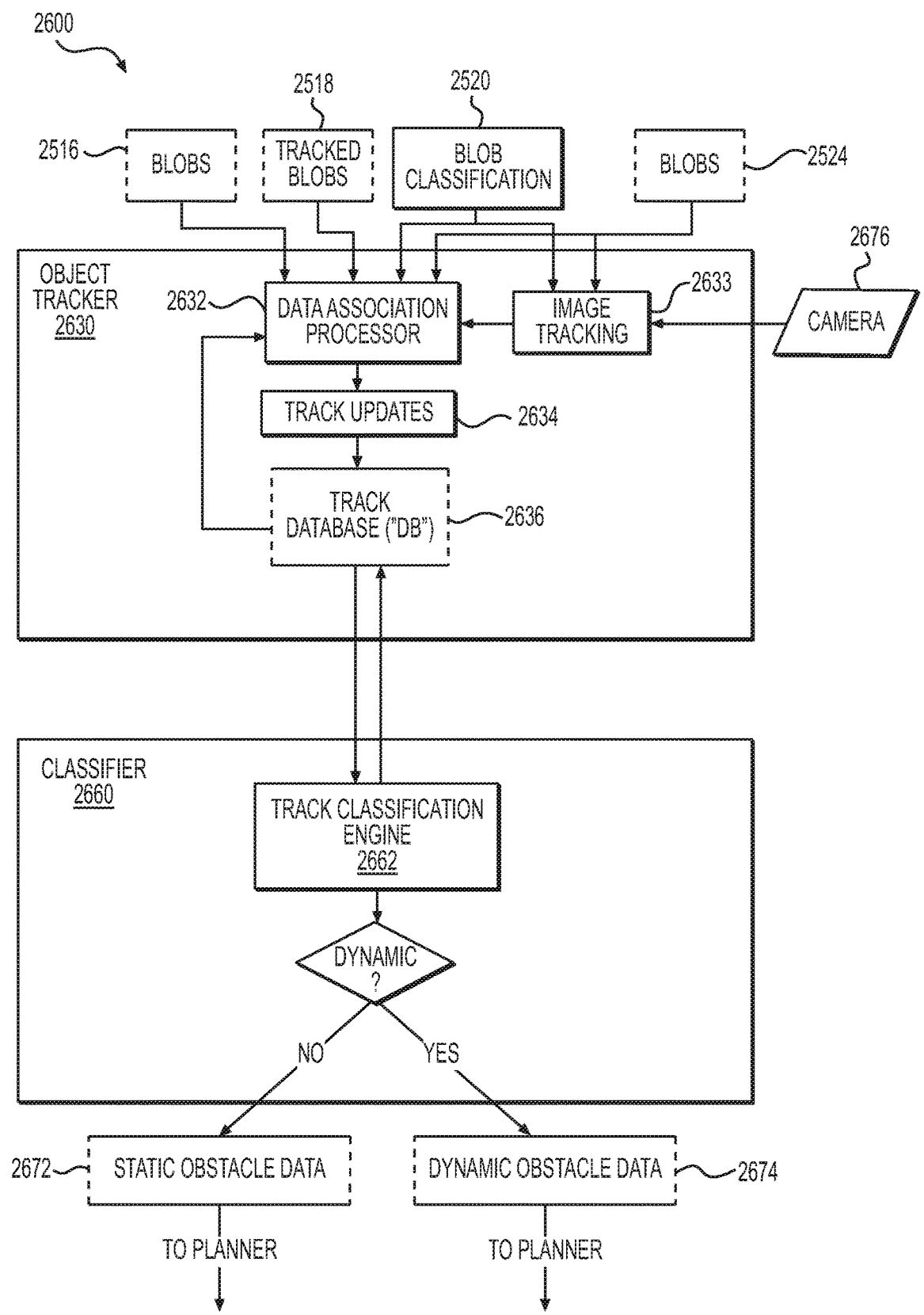
FIG. 26A is a diagram depicting examples of an object tracker and a classifier, according to various embodiments.

FIG. 26A is a diagram depicting examples of an object tracker and a classifier, according to various embodiments. Object tracker 2630 of diagram 2600 is configured to receive blob data 2516, tracked blob data 2518, data from blob classifier 2520, blob data 2524, and camera image data from one or more cameras 2676. Image tracker 2633 is configured to receive camera image data from one or more cameras 2676 to generate tracked image data, which, in turn, may be provided to data association processor 2632. As shown, data association processor 2632 is configured to receive blob data 2516, tracked blob data 2518, data from blob classifier 2520, blob data 2524, and track image data from image tracker 2633, and is further configured to identify one or more associations among the above-described types of data. Data association processor 2632 is configured to track, for example, various blob data from one frame to a next frame to, for example, estimate motion, among other things. Further, data generated by data association processor 2632 may be used by track updater 2634 to update one or more tracks, or tracked objects. In some examples, track updater 2634 may implement a Kalman Filter, or the like, to form updated data for tracked objects, which may be stored online in track database ("DB") 2636. Feedback data may be exchanged via path 2699 between data association processor 2632 and track database 2636. In some examples, image tracker 2633 may be optional and may be excluded. Object tracker 2630 may also use other sensor data, such as radar or sonar, as well as any other types of sensor data, for example.

Figure 26B:
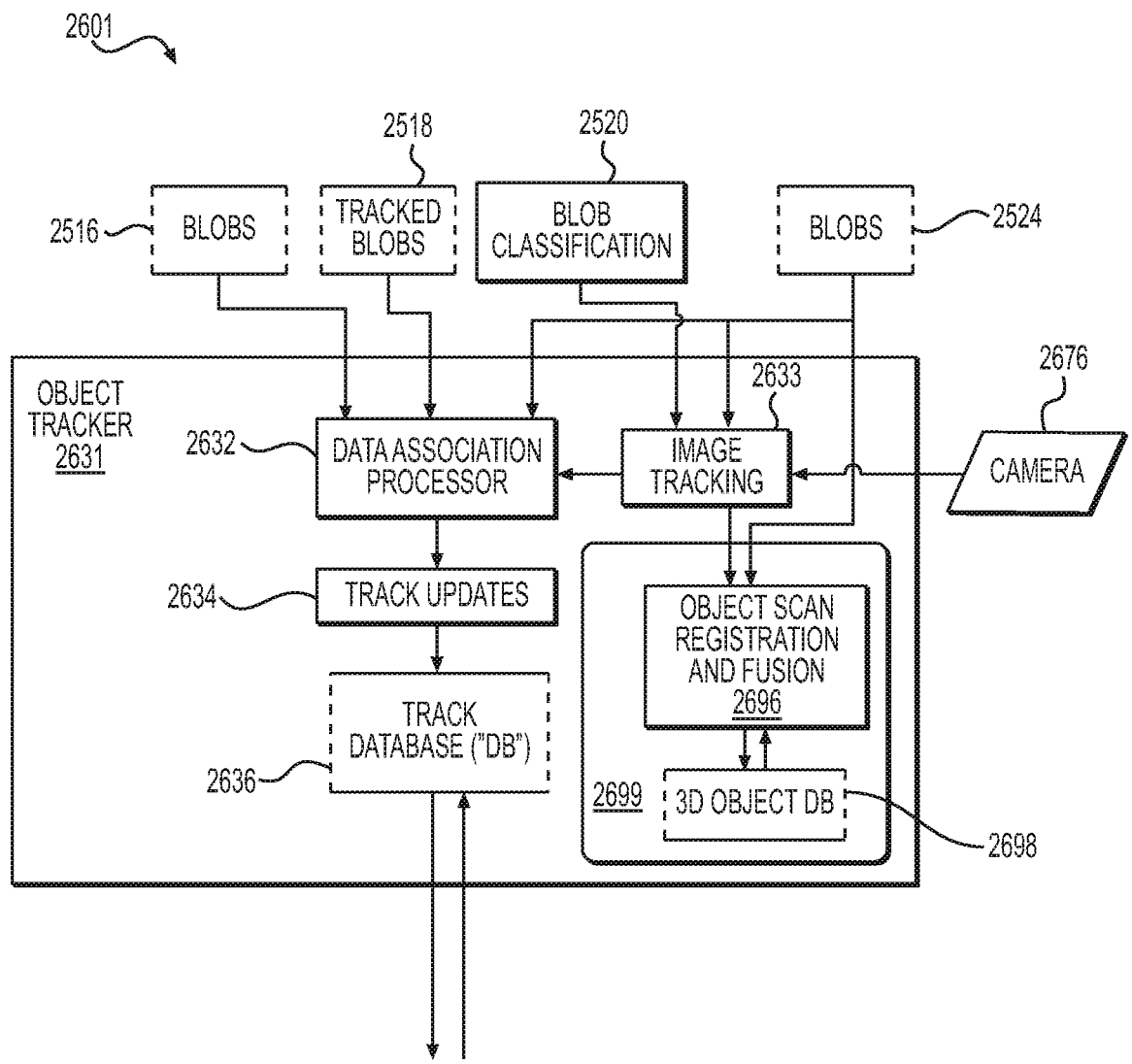
FIG. 26B is a diagram depicting another example of an object tracker according to at least some examples.

FIG. 26B is a diagram depicting another example of an object tracker according to at least some examples. Diagram 2601 includes an object tracker 2631 that may include structures and/or functions as similarly-named elements described in connection to one or more other drawings (e.g., FIG. 26A). As shown, object tracker 2631 includes an optional registration portion 2699 that includes a processor 2696 configured to perform object scan registration and data fusion. Processor 2696 is further configured to store the resultant data in 3D object database 2698.

Referring back to FIG. 26A, diagram 2600 also includes classifier 2660, which may include a track classification engine 2662 for generating static obstacle data 2672 and dynamic obstacle data 2674, both of which may be transmitted to the planner for path planning purposes. In at least one example, track classification engine 2662 is configured to determine whether an obstacle is static or dynamic, as well as another classification type for the object (e.g., whether the object is a vehicle, pedestrian, tree, cyclist, dog, cat, paper bag, etc.). Static obstacle data 2672 may be formed as part of an obstacle map (e.g., a 2D occupancy map), and dynamic obstacle data 2674 may be formed to include bounding boxes with data indicative of velocity and classification type. Dynamic obstacle data 2674, at least in some cases, includes 2D dynamic obstacle map data.

Figure 27:
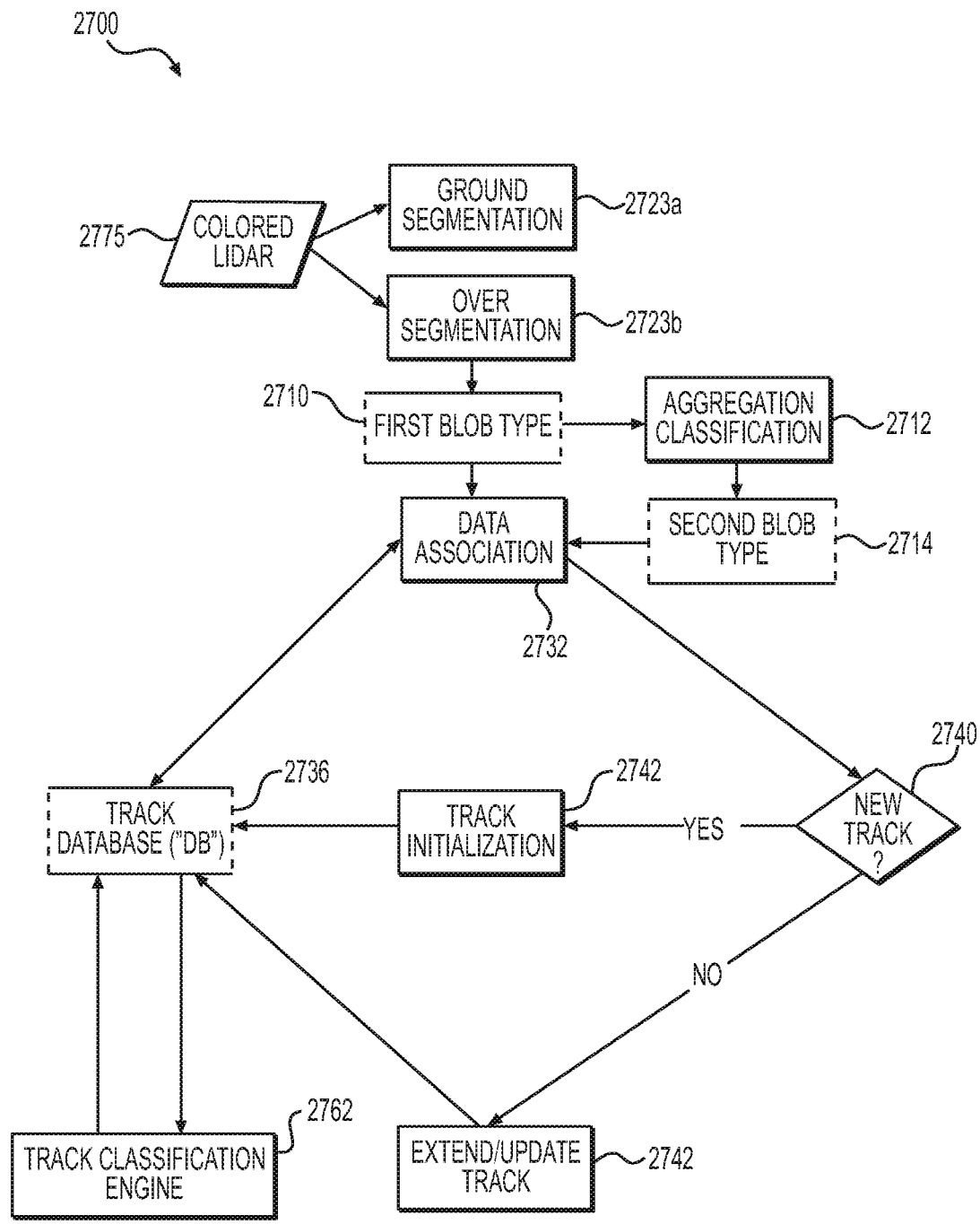
FIG. 27 is an example of front-end processor for a perception engine, according to some examples.

FIG. 27 is an example of front-end processor for a perception engine, according to some examples. Diagram 2700 includes a ground segmentation processor 2723a for performing ground segmentation, and an over segmentation processor 2723b for performing "over-segmentation," according to various examples. Processors 2723a and 2723b are configured to receive optionally colored Lidar data 2775. Over segmentation processor 2723b generates data 2710 of a first blob type (e.g., a relatively small blob), which is provided to an aggregation classification and segmentation engine 2712 that generates data 2714 of a second blob type. Data 2714 is provided to data association processor 2732, which is configured to detect whether data 2714 resides in track database 2736. A determination is made at 2740 whether data 2714 of the second blob type (e.g., a relatively large blob, which may include one or more smaller blobs) is a new track. If so, a track is initialized at 2742, otherwise, the tracked object data stored in track database 2736 and the track may be extended or updated by track updater 2742. Track classification engine 2762 is coupled to track database 2736 to identify and update/modify tracks by, for example, adding, removing or modifying track-related data.

Figure 28:
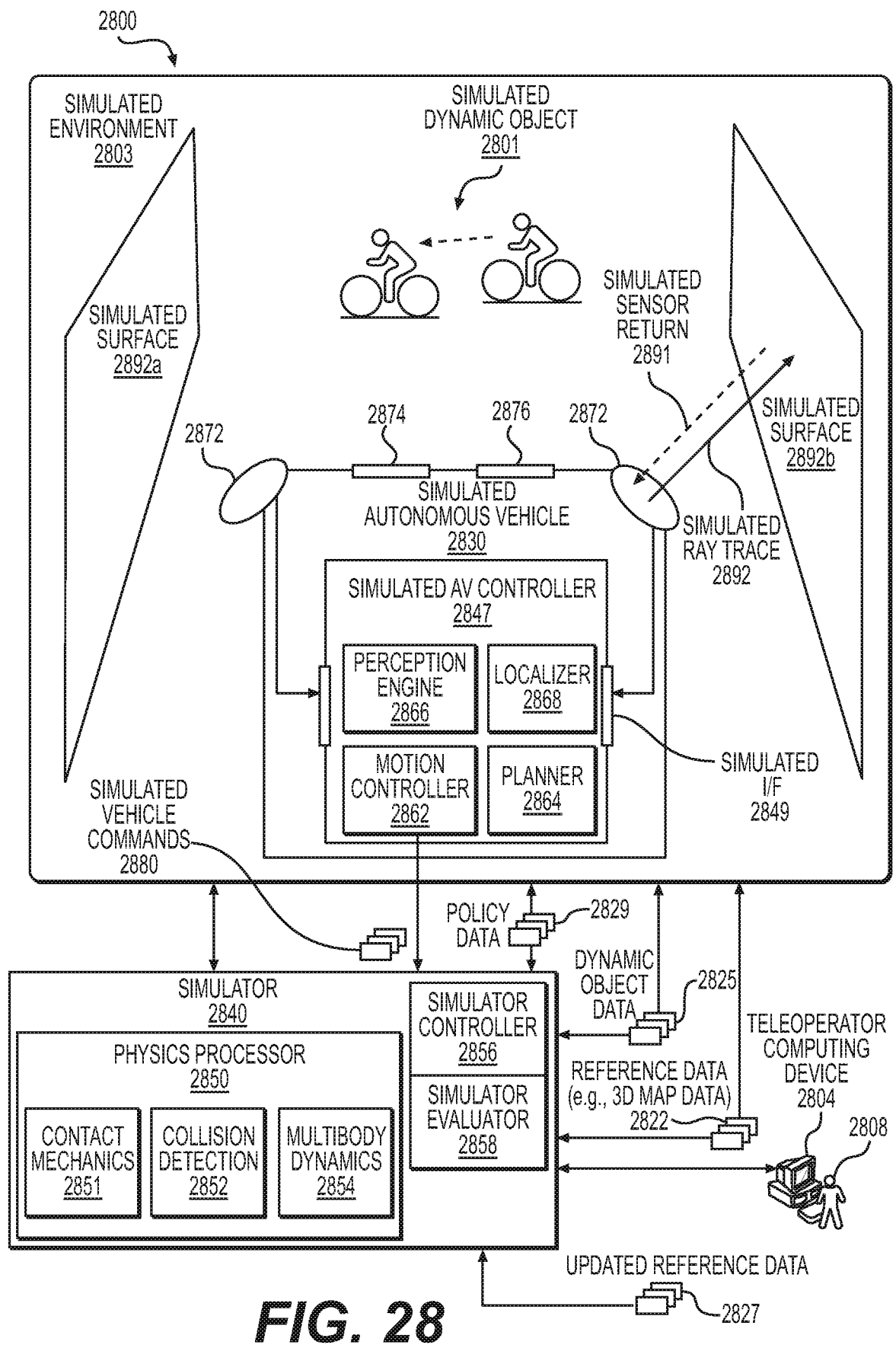
FIG. 28 is a diagram depicting a simulator configured to simulate an autonomous vehicle in a synthetic environment, according to various embodiments.

FIG. 28 is a diagram depicting a simulator configured to simulate an autonomous vehicle in a synthetic environment, according to various embodiments. Diagram 2800 includes a simulator 2840 that is configured to generate a simulated environment 2803. As shown, simulator 2840 is configured to use reference data 2822 (e.g., 3D map data and/or other map or route data including RNDF data or similar road network data) to generate simulated geometries, such as simulated surfaces 2892a and 2892b, within simulated environment 2803. Simulated surfaces 2892a and 2892b may simulate walls or front sides of buildings adjacent a roadway. Simulator 2840 may also pre-generated or procedurally generated use dynamic object data 2825 to simulate dynamic agents in a synthetic environment. An example of a dynamic agent is simulated dynamic object 2801, which is representative of a simulated cyclist having a velocity. The simulated dynamic agents may optionally respond to other static and dynamic agents in the simulated environment, including the simulated autonomous vehicle. For example, simulated object 2801 may slow down for other obstacles in simulated environment 2803 rather than follow a preset trajectory, thereby creating a more realistic simulation of actual dynamic environments that exist in the real world.

Simulator 2840 may be configured to generate a simulated autonomous vehicle controller 2847, which includes synthetic adaptations of a perception engine 2866, a localizer 2868, a motion controller 2862, and a planner 2864, each of which may have functionalities described herein within simulated environment 2803. Simulator 2840 may also generate simulated interfaces ("I/F") 2849 to simulate the data exchanges with different sensors modalities and different sensor data formats. As such, simulated interface 2849 may simulate a software interface for packetized data from, for example, a simulated Lidar sensor 2872. Further, simulator 2840 may also be configured to generate a simulated autonomous vehicle 2830 that implements simulated AV controller 2847.

Simulated autonomous vehicle 2830 includes simulated Lidar sensors 2872, simulated camera or image sensors 2874, and simulated radar sensors 2876. In the example shown, simulated Lidar sensor 2872 may be configured to generate a simulated laser consistent with ray trace 2892, which causes generation of simulated sensor return 2891. Note that simulator 2840 may simulate the addition of noise or other environmental effects on sensor data (e.g., added diffusion or reflections that affect simulated sensor return 2891, etc.). Further yet, simulator 2840 may be configured to simulate a variety of sensor defects, including sensor failure, sensor miscalibration, intermittent data outages, and the like.

Simulator 2840 includes a physics processor 2850 for simulating the mechanical, static, dynamic, and kinematic aspects of an autonomous vehicle for use in simulating behavior of simulated autonomous vehicle 2830. For example, physics processor 2850 includes a content mechanics module 2851 for simulating contact mechanics, a collision detection module 2852 for simulating the interaction between simulated bodies, and a multibody dynamics module 2854 to simulate the interaction between simulated mechanical interactions.

Simulator 2840 also includes a simulator controller 2856 configured to control the simulation to adapt the functionalities of any synthetically-generated element of simulated environment 2803 to determine cause-effect relationship, among other things. Simulator 2840 includes a simulator evaluator 2858 to evaluate the performance synthetically-generated element of simulated environment 2803. For example, simulator evaluator 2858 may analyze simulated vehicle commands 2880 (e.g., simulated steering angles and simulated velocities) to determine whether such commands are an appropriate response to the simulated activities within simulated environment 2803. Further, simulator evaluator 2858 may evaluate interactions of a teleoperator 2808 with the simulated autonomous vehicle 2830 via teleoperator computing device 2804. Simulator evaluator 2858 may evaluate the effects of updated reference data 2827, including updated map tiles and route data, which may be added to guide the responses of simulated autonomous vehicle 2830. Simulator evaluator 2858 may also evaluate the responses of simulator AV controller 2847 when policy data 2829 is updated, deleted, or added. The above-description of simulator 2840 is not intended to be limiting. As such, simulator 2840 is configured to perform a variety of different simulations of an autonomous vehicle relative to a simulated environment, which include both static and dynamic features. For example, simulator 2840 may be used to validate changes in software versions to ensure reliability. Simulator 2840 may also be used to determine vehicle dynamics properties and for calibration purposes. Further, simulator 2840 may be used to explore the space of applicable controls and resulting trajectories so as to effect learning by self-simulation.

Figure 29:
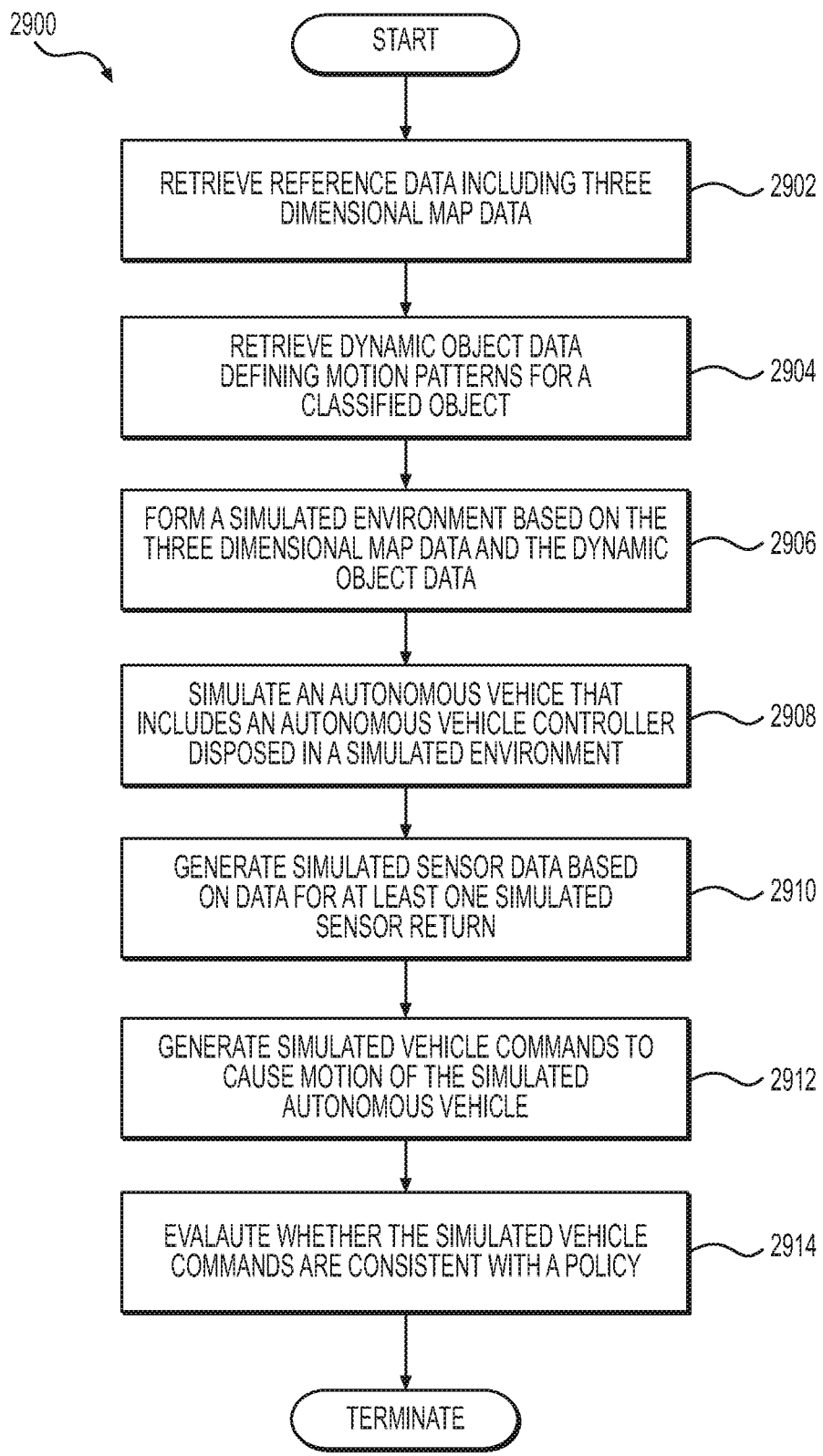
FIG. 29 is an example of a flow chart to simulate various aspects of an autonomous vehicle, according to some embodiments.

FIG. 29 is an example of a flow chart to simulate various aspects of an autonomous vehicle, according to some embodiments. Flow chart 2900 begins at 2902, at which reference data including three dimensional map data is received into a simulator. Dynamic object data defining motion patterns for a classified object may be retrieved at 2904. At 2906, a simulated environment is formed based on at least three dimensional ("3D") map data and the dynamic object data. The simulated environment may include one or more simulated surfaces. At 2908, an autonomous vehicle is simulated that includes a simulated autonomous vehicle controller that forms part of a simulated environment. The autonomous vehicle controller may include a simulated perception engine and a simulated localizer configured to receive sensor data. At 2910, simulated sensor data are generated based on data for at least one simulated sensor return, and simulated vehicle commands are generated at 2912 to cause motion (e.g., vectored propulsion) by a simulated autonomous vehicle in a synthetic environment. At 2914, simulated vehicle commands are evaluated to determine whether the simulated autonomous vehicle behaved consistent with expected behaviors (e.g., consistent with a policy).

Figure 30:
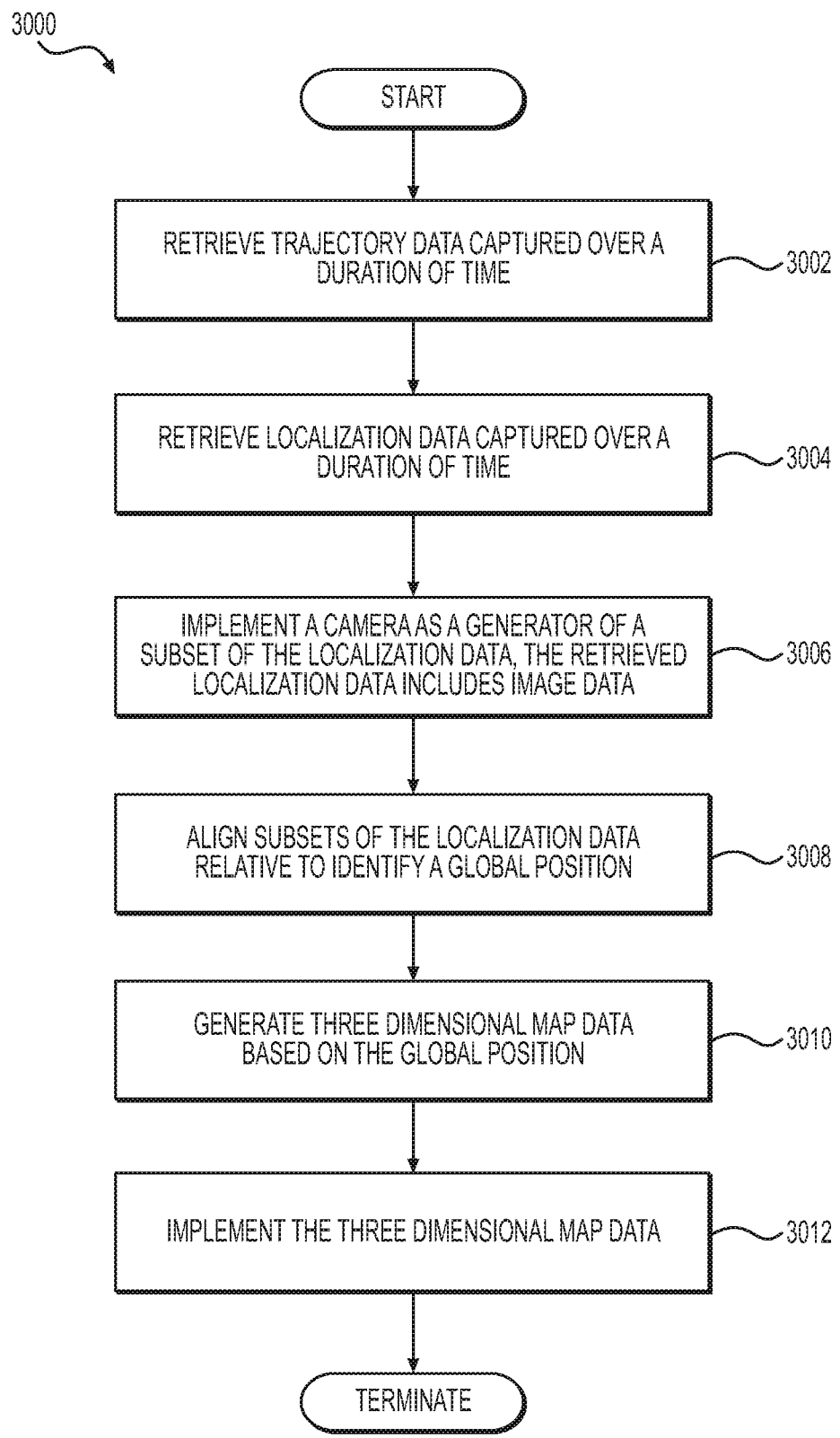
FIG. 30 is an example of a flow chart to generate map data, according to some embodiments.

FIG. 30 is an example of a flow chart to generate map data, according to some embodiments. Flow chart 3000 begins at 3002, at which trajectory data is retrieved. The trajectory data may include trajectories captured over a duration of time (e.g., as logged trajectories). At 3004, at least localization data may be received. The localization data may be captured over a duration of time (e.g., as logged localization data). At 3006, a camera or other image sensor may be implemented to generate a subset of the localization data. As such, the retrieved localization data may include image data. At 3008, subsets of localization data are aligned to identifying a global position (e.g., a global pose). At 3010, three dimensional ("3D") map data is generated based on the global position, and at 3012, the 3 dimensional map data is available for implementation by, for example, a manual route data editor (e.g., including a manual road network data editor, such as an RNDF editor), an automated route data generator (e.g., including an automatic road network generator, including an automatic RNDF generator), a fleet of autonomous vehicles, a simulator, a teleoperator computing device, and any other component of an autonomous vehicle service.

Figure 31:
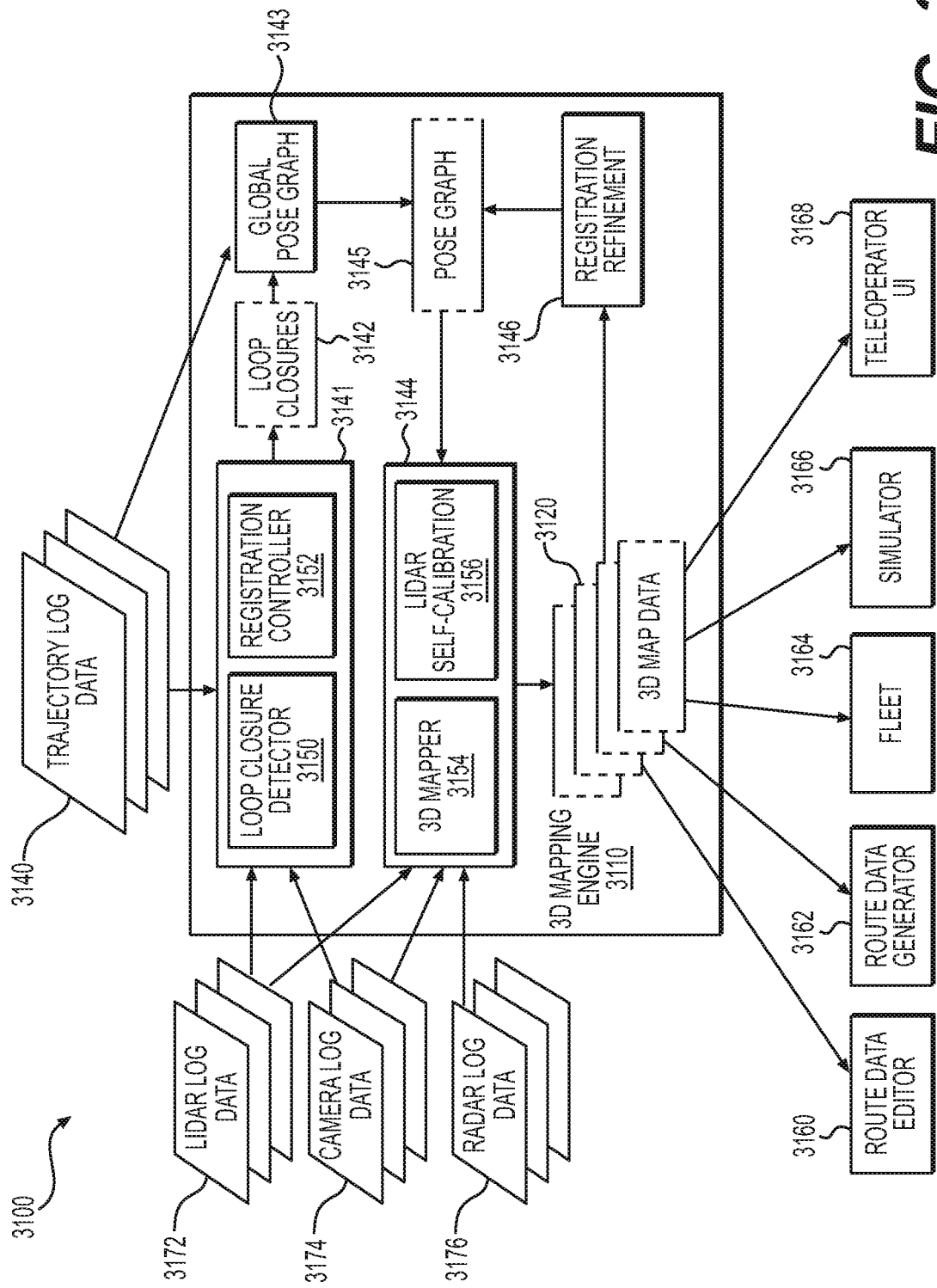
FIG. 31 is a diagram depicting an architecture of a mapping engine, according to some embodiments.

FIG. 31 is a diagram depicting an architecture of a mapping engine, according to some embodiments. Diagram 3100 includes a 3D mapping engine that is configured to receive trajectory log data 3140, Lidar log data 3172, camera log data 3174, radar log data 3176, and other optional logged sensor data (not shown). Logic 3141 includes a loop-closure detector 3150 configured to detect whether sensor data indicates a nearby point in space has been previously visited, among other things. Logic 3141 also includes a registration controller 3152 for aligning map data, including 3D map data in some cases, relative to one or more registration points. Further, logic 3141 provides data 3142 representing states of loop closures for use by a global pose graph generator 3143, which is configured to generate pose graph data 3145. In some examples, pose graph data 3145 may also be generated based on data from registration refinement module 3146. Logic 3144 includes a 3D mapper 3154 and a Lidar self-calibration unit 3156. Further, logic 3144 receives sensor data and pose graph data 3145 to generate 3D map data 3120 (or other map data, such as 4D map data). In some examples, logic 3144 may implement a truncated sign distance function ("TSDF") to fuse sensor data and/or map data to form optimal three-dimensional maps. Further, logic 3144 is configured to include texture and reflectance properties. 3D map data 3120 may be released for usage by a manual route data editor 3160 (e.g., an editor to manipulate Route data or other types of route or reference data), an automated route data generator 3162 (e.g., logic to configured to generate route data or other types of road network or reference data), a fleet of autonomous vehicles 3164, a simulator 3166, a teleoperator computing device 3168, and any other component of an autonomous vehicle service. Mapping engine 3110 may capture semantic information from manual annotation or automatically-generated annotation as well as other sensors, such as sonar or instrumented environment (e.g., smart stop-lights).

Figure 32:
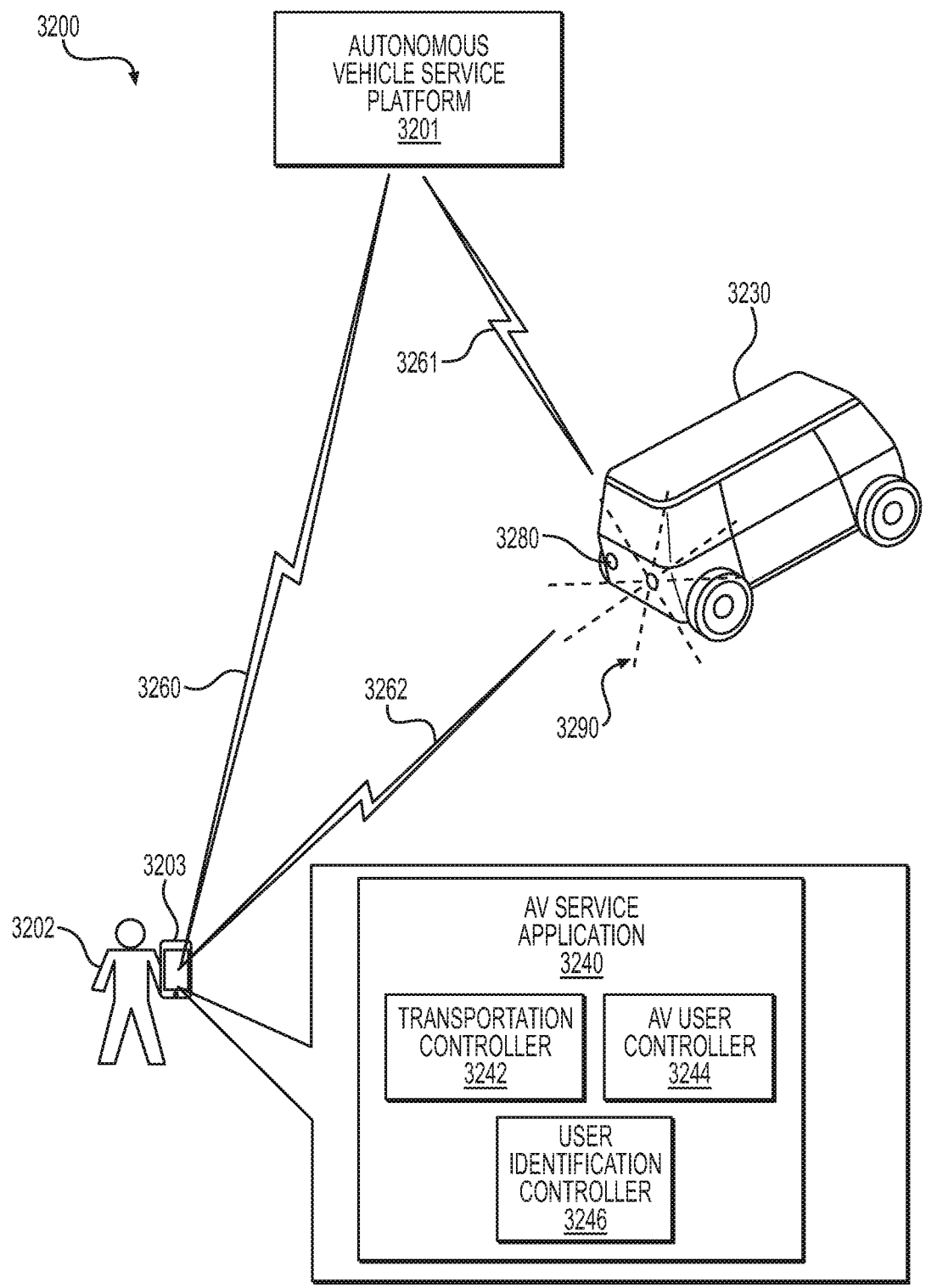
FIG. 32 is a diagram depicting an autonomous vehicle application, according to some examples.

FIG. 32 is a diagram depicting an autonomous vehicle application, according to some examples. Diagram 3200 depicts a mobile computing device 3203 including an autonomous service application 3240 that is configured to contact an autonomous vehicle service platform 3201 to arrange transportation of user 3202 via an autonomous vehicle 3230. As shown, autonomous service application 3240 may include a transportation controller 3242, which may be a software application residing on a computing device (e.g., a mobile phone 3203, etc.). Transportation controller 3242 is configured to receive, schedule, select, or perform operations related to autonomous vehicles and/or autonomous vehicle fleets for which a user 3202 may arrange transportation from the user's location to a destination. For example, user 3202 may open up an application to request vehicle 3230. The application may display a map and user 3202 may drop a pin to indicate their destination within, for example, a geo-fenced region. Alternatively, the application may display a list of nearby pre-specified pick-up locations, or provide the user with a text entry field in which to type a destination either by address or by name.

Further to the example shown, autonomous vehicle application 3240 may also include a user identification controller 3246 that may be configured to detect that user 3202 is in a geographic region, or vicinity, near autonomous vehicle 3230, as the vehicle approaches. In some situations, user 3202 may not readily perceive or identify autonomous vehicle 3230 as it approaches for use by user 3203 (e.g., due to various other vehicles, including trucks, cars, taxis, and other obstructions that are typical in city environments). In one example, autonomous vehicle 3230 may establish a wireless communication link 3262 (e.g., via a radio frequency ("RF") signal, such as WiFi or Bluetooth®, including BLE, or the like) for communicating and/or determining a spatial location of user 3202 relative to autonomous vehicle 3230 (e.g., using relative direction of RF signal and signal strength). In some cases, autonomous vehicle 3230 may detect an approximate geographic location of user 3202 using, for example, GPS data or the like. A GPS receiver (not shown) of mobile computing device 3203 may be configured to provide GPS data to autonomous vehicle service application 3240. Thus, user identification controller 3246 may provide GPS data via link 3260 to autonomous vehicle service platform 3201, which, in turn, may provide that location to autonomous vehicle 3230 via link 3261. Subsequently, autonomous vehicle 3230 may determine a relative distance and/or direction of user 3202 by comparing the user's GPS data to the vehicle's GPS-derived location.

Autonomous vehicle 3230 may also include additional logic to identify the presence of user 3202, such that logic configured to perform face detection algorithms to detect either user 3202 generally, or to specifically identify the identity (e.g., name, phone number, etc.) of user 3202 based on the user's unique facial characteristics. Further, autonomous vehicle 3230 may include logic to detect codes for identifying user 3202. Examples of such codes include specialized visual codes, such as QR codes, color codes, etc., specialized audio codes, such as voice activated or recognized codes, etc., and the like. In some cases, a code may be an encoded security key that may be transmitted digitally via link 3262 to autonomous vehicle 3230 to ensure secure ingress and/or egress. Further, one or more of the above-identified techniques for identifying user 3202 may be used as a secured means to grant ingress and egress privileges to user 3202 so as to prevent others from entering autonomous vehicle 3230 (e.g., to ensure third party persons do not enter an unoccupied autonomous vehicle prior to arriving at user 3202). According to various examples, any other means for identifying user 3202 and providing secured ingress and egress may also be implemented in one or more of autonomous vehicle service application 3240, autonomous vehicle service platform 3201, and autonomous vehicle 3230.

To assist user 3302 in identifying the arrival of its requested transportation, autonomous vehicle 3230 may be configured to notify or otherwise alert user 3202 to the presence of autonomous vehicle 3230 as it approaches user 3202. For example, autonomous vehicle 3230 may activate one or more light-emitting devices 3280 (e.g., LEDs) in accordance with specific light patterns. In particular, certain light patterns are created so that user 3202 may readily perceive that autonomous vehicle 3230 is reserved to service the transportation needs of user 3202. As an example, autonomous vehicle 3230 may generate light patterns 3290 that may be perceived by user 3202 as a "wink," or other animation of its exterior and interior lights in such a visual and temporal way. The patterns of light 3290 may be generated with or without patterns of sound to identify to user 3202 that this vehicle is the one that they booked.

According to some embodiments, autonomous vehicle user controller 3244 may implement a software application that is configured to control various functions of an autonomous vehicle. Further, an application may be configured to redirect or reroute the autonomous vehicle during transit to its initial destination. Further, autonomous vehicle user controller 3244 may be configured to cause on-board logic to modify interior lighting of autonomous vehicle 3230 to effect, for example, mood lighting. Controller 3244 may also control a source of audio (e.g., an external source such as Spotify, or audio stored locally on the mobile computing device 3203), select a type of ride (e.g., modify desired acceleration and braking aggressiveness, modify active suspension parameters to select a set of "road-handling" characteristics to implement aggressive driving characteristics, including vibrations, or to select "soft-ride" qualities with vibrations dampened for comfort), and the like. For example, mobile computing device 3203 may be configured to control HVAC functions as well, like ventilation and temperature.

Figure 33:
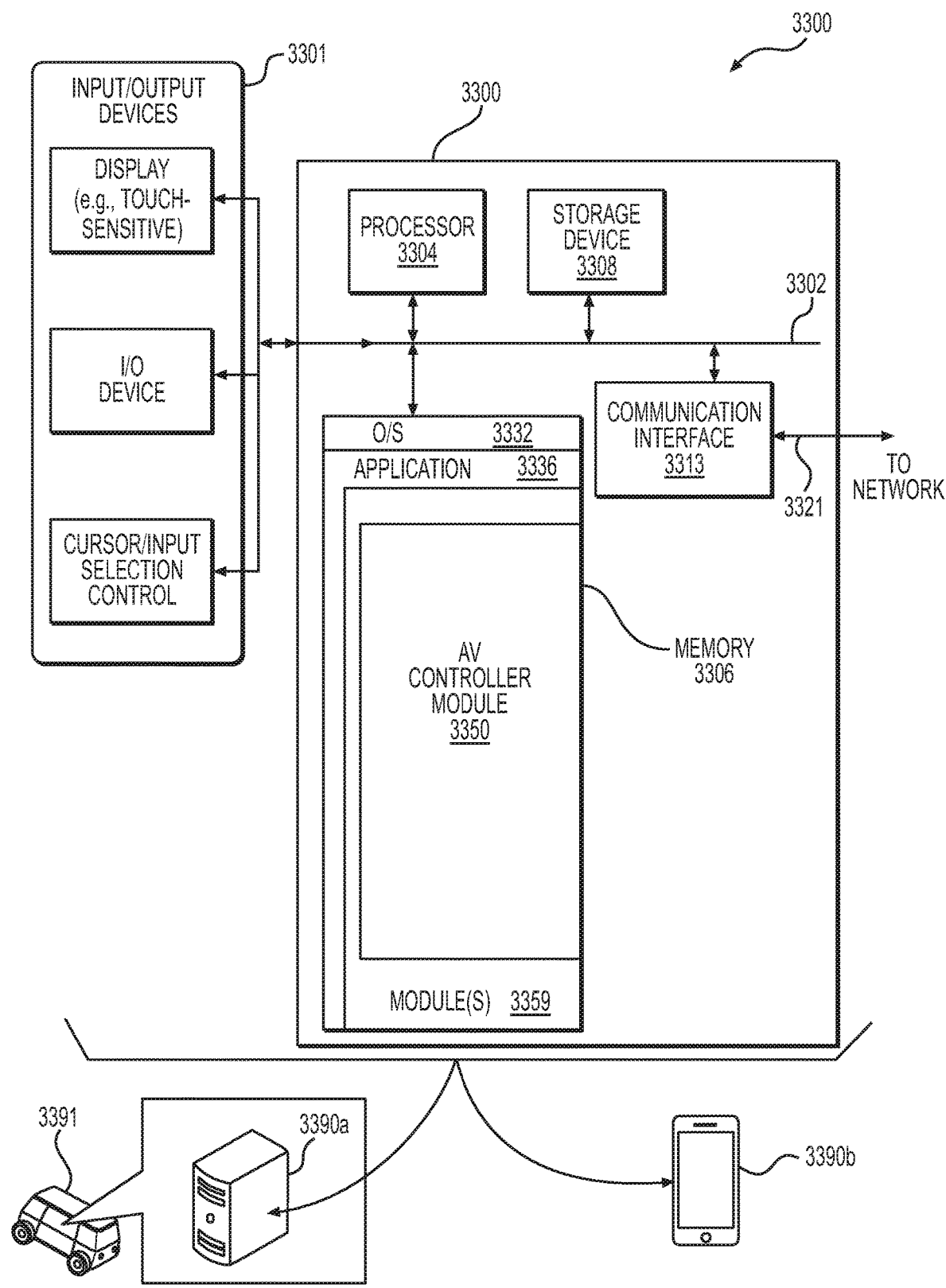
FIGS. 33 to 35 illustrate examples of various computing platforms configured to provide various functionalities to components of an autonomous vehicle service, according to various embodiments.
Figure 34:
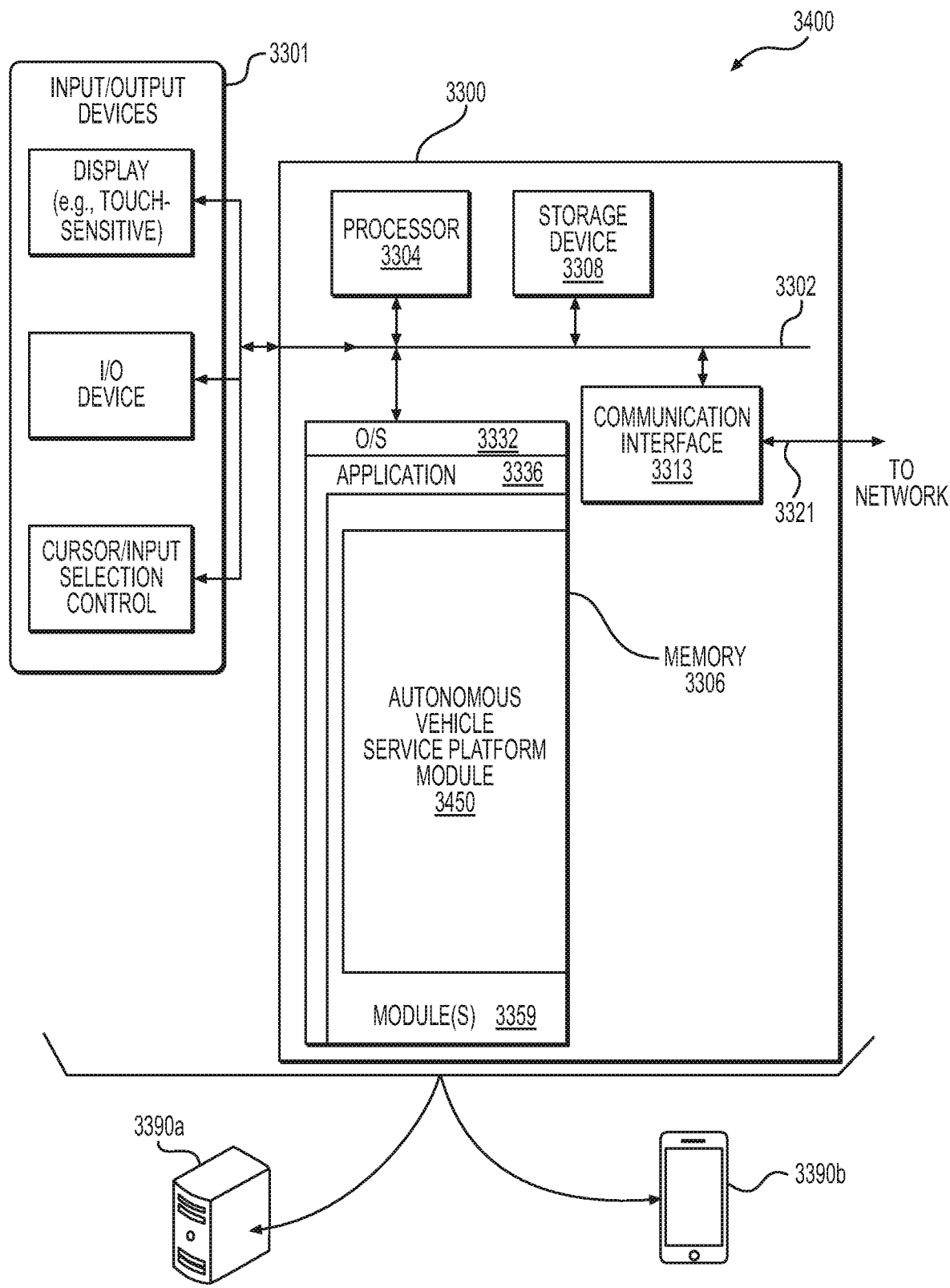
Figure 35:
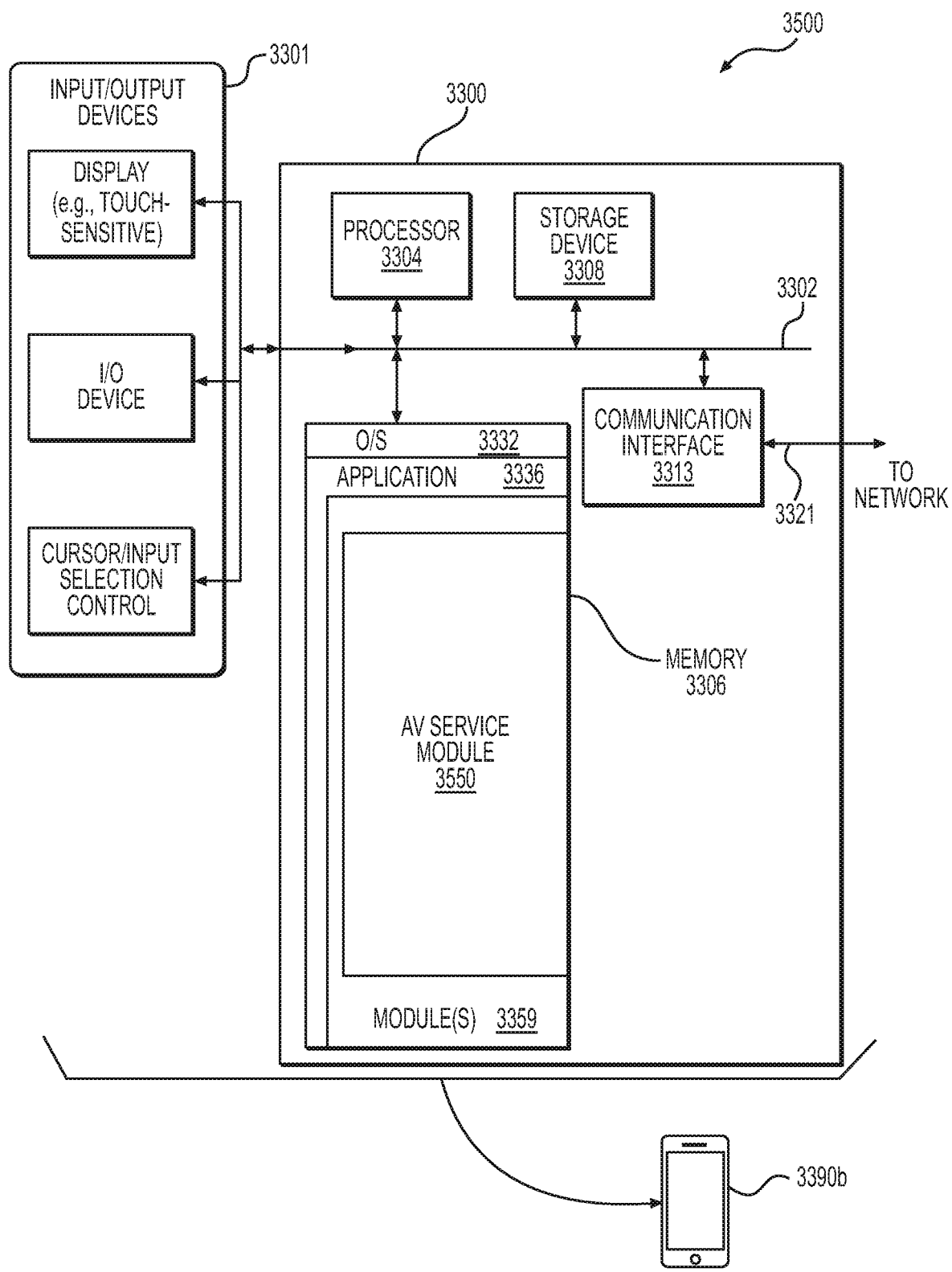

FIGS. 33 to 35 illustrate examples of various computing platforms configured to provide various functionalities to components of an autonomous vehicle service, according to various embodiments. In some examples, computing platform 3300 may be used to implement computer programs, applications, methods, processes, algorithms, or other software to perform the above-described techniques.

Note that various structures and/or functionalities of FIG. 33 are applicable to FIGS. 34 and 35, and, as such, some elements in those figures may be discussed in the context of FIG. 33.

In some cases, computing platform 3300 can be disposed in any device, such as a computing device 3390a, which may be disposed in an autonomous vehicle 3391, and/or mobile computing device 3390b.

Computing platform 3300 includes a bus 3302 or other communication mechanism for communicating information, which interconnects subsystems and devices, such as processor 3304, system memory 3306 (e.g., RAM, etc.), storage device 3308 (e.g., ROM, etc.), an in-memory cache (which may be implemented in RAM 3306 or other portions of computing platform 3300), a communication interface 3313 (e.g., an Ethernet or wireless controller, a Bluetooth controller, NFC logic, etc.) to facilitate communications via a port on communication link 3321 to communicate, for example, with a computing device, including mobile computing and/or communication devices with processors. Processor 3304 can be implemented with one or more graphics processing units ("GPUs"), with one or more central processing units ("CPUs"), such as those manufactured by Intel® Corporation, or one or more virtual processors, as well as any combination of CPUs and virtual processors. Computing platform 3300 exchanges data representing inputs and outputs via input-and-output devices 3301, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 3300 performs specific operations by processor 3304 executing one or more sequences of one or more instructions stored in system memory 3306, and computing platform 3300 can be implemented in a client-server arrangement, peer-to-peer arrangement, or as any mobile computing device, including smart phones and the like. Such instructions or data may be read into system memory 3306 from another computer readable medium, such as storage device 3308. In some examples, hard-wired circuitry may be used in place of or in combination with software instructions for implementation. Instructions may be embedded in software or firmware. The term "computer readable medium" refers to any tangible medium that participates in providing instructions to processor 3304 for execution. Such a medium may take many forms, including but not limited to, non-volatile media and volatile media. Non-volatile media includes, for example, optical or magnetic disks and the like. Volatile media includes dynamic memory, such as system memory 3306.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 3302 for transmitting a computer data signal.

In some examples, execution of the sequences of instructions may be performed by computing platform 3300. According to some examples, computing platform 3300 can be coupled by communication link 3321 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 3300 may transmit and receive messages, data, and instructions, including program code (e.g., application code) through communication link 3321 and communication interface 3313. Received program code may be executed by processor 3304 as it is received, and/or stored in memory 3306 or other non-volatile storage for later execution.

In the example shown, system memory 3306 can include various modules that include executable instructions to implement functionalities described herein. System memory 3306 may include an operating system ("O/S") 3332, as well as an application 3336 and/or logic module(s) 3359. In the example shown in FIG. 33, system memory 3306 includes an autonomous vehicle ("AV") controller module 3350 and/or its components (e.g., a perception engine module, a localization module, a planner module, and/or a motion controller module), any of which, or one or more portions of which, can be configured to facilitate an autonomous vehicle service by implementing one or more functions described herein.

Referring to the example shown in FIG. 34, system memory 3306 includes an autonomous vehicle service platform module 3450 and/or its components (e.g., a teleoperator manager, a simulator, etc.), any of which, or one or more portions of which, can be configured to facilitate managing an autonomous vehicle service by implementing one or more functions described herein.

Referring to the example shown in FIG. 35, system memory 3306 includes an autonomous vehicle ("AV") module and/or its components for use, for example, in a mobile computing device. One or more portions of module 3550 can be configured to facilitate delivery of an autonomous vehicle service by implementing one or more functions described herein.

Referring back to FIG. 33, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, module 3350 of FIG. 33, module 3450 of FIG. 34, and module 3550 of FIG. 35, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 3359 (module 3350 of FIG. 33, module 3450 of FIG. 34, and module 3550 of FIG. 35) or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements.

Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, module 3350 of FIG. 33, module 3450 of FIG. 34, and module 3550 of FIG. 35, or one or more of its components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, module 3350 of FIG. 33, module 3450 of FIG. 34, and module 3550 of FIG. 35, or one or more of its components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Figure 36A:
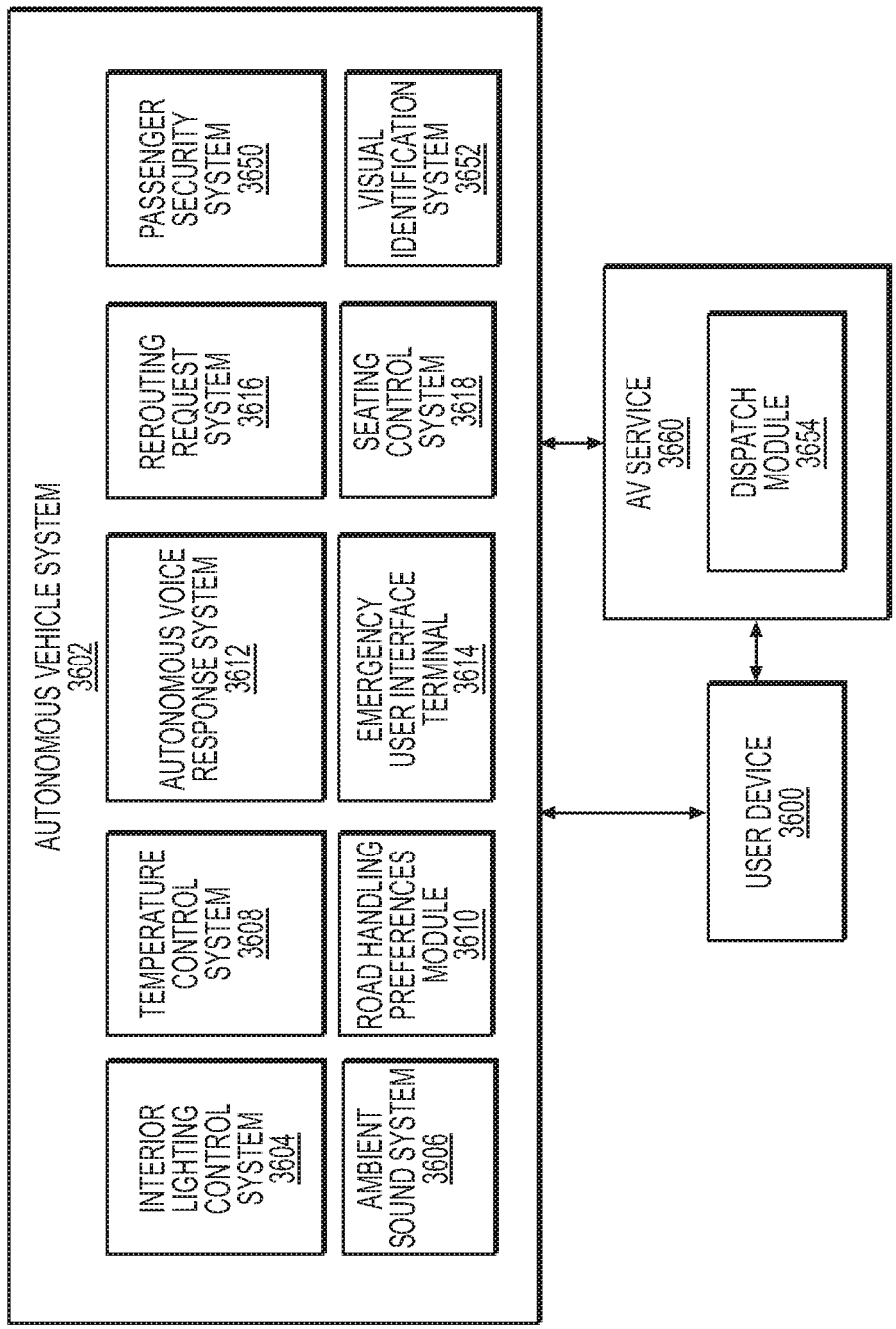
FIGS. 36A to 36B illustrate high-level block diagrams depicting an autonomous vehicle system having various sub-systems interacting with a user device, according to various embodiments.
Figure 36B:
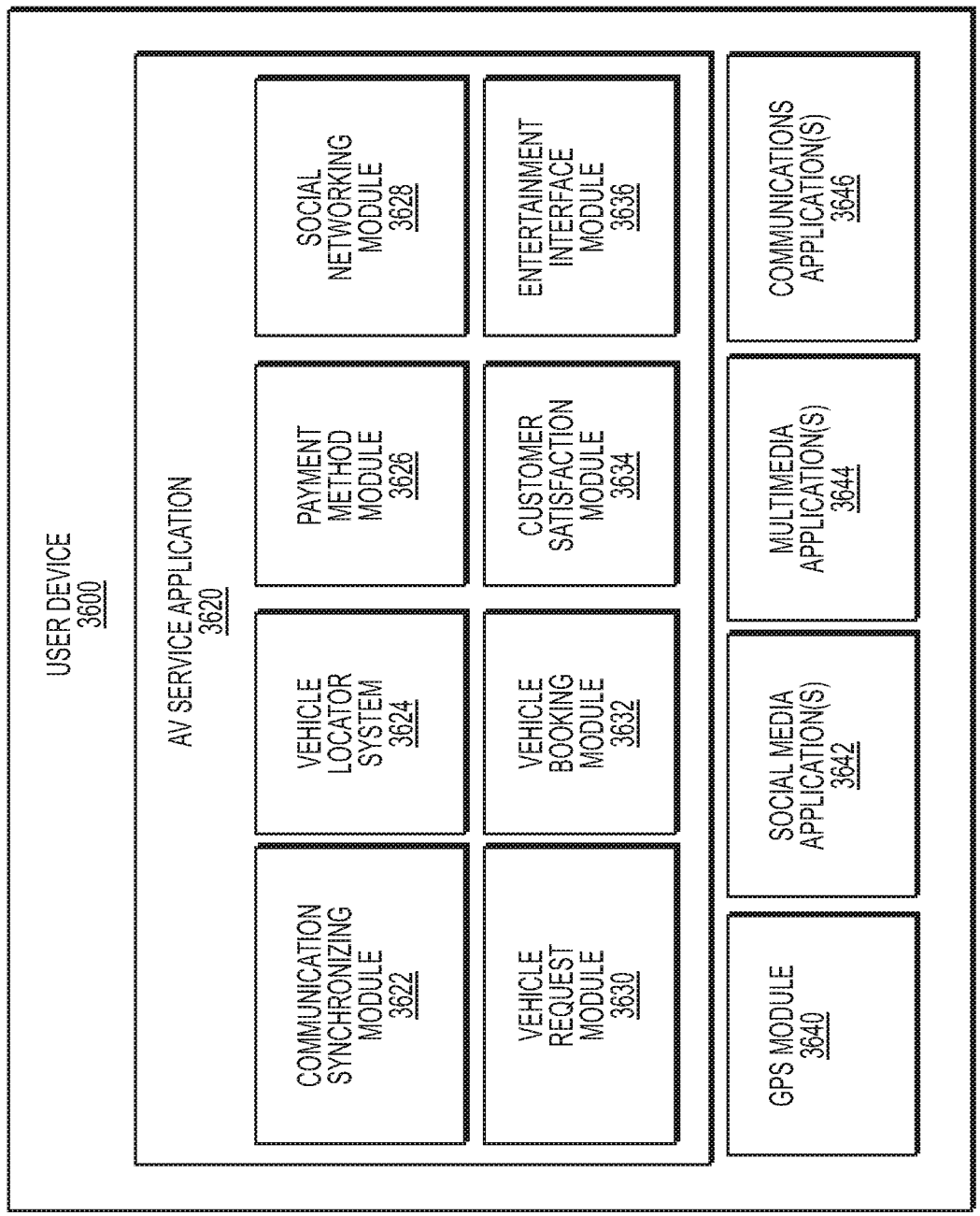

FIGS. 36A to 36B illustrate high-level block diagrams depicting an autonomous vehicle system having various sub-systems interacting with a user device, according to various embodiments. Many sub-systems may be directly controlled by a user through a user device such that the user may specify various preferences, including interior lighting, sound, temperature, and road handling of an autonomous vehicle system. As illustrated in FIG. 36A, an autonomous vehicle system 3602 may be requested by a user device 3600 through an autonomous vehicle service 3660 that includes a dispatch module 3654.

A dispatch module 3654 may direct an autonomous vehicle system 3602 to execute a ride request from a user device 3600 based on demand, location of a fleet of autonomous vehicle systems in proximity to the user, and maintenance levels of autonomous vehicle systems, including battery charge, sensor calibrations, and the data storage capacity. In one embodiment, the dispatch module 3654 may generate an operational efficiency metric based on the AV systems 3602 that have been deployed as part of the AV service 3660. The operational efficiency metric may be computed based on a number of factors, including the proximity of an AV system to the user, battery levels of a vehicle, how well the sensors are calibrated, and the remaining data storage capacity of the vehicle. Based on this operational efficiency metric, the dispatch module 3654 may send an AV system 3602 to the user responsive to a request. As illustrated in FIG. 36B, a user device 3600 may include an AV service application 3620 that includes a vehicle request module 3630. Through the AV service application 3620, a user may request a ride from an origin location to a destination location and include other information about the ride, such as the number of passengers, luggage requirements, number of stops, and time and date of the ride. Receiving this information, the dispatch module 3654 may select an autonomous vehicle system 3602 that meets the criteria of the ride request. For example, a user may be open to sharing a ride with other users of the AV service, such that an autonomous vehicle system 3602 is available to pick up the user if it is executing a trajectory that is near the location of the user, as captured through GPS of the user device 3600.

After a dispatch module 3654 provides an instruction to an autonomous vehicle system 3602 to execute a ride request of a user device 3600, the autonomous vehicle system 3602 plans a trajectory to transit to the location of the user. In one embodiment, a user may provide his or her location through a GPS module 3640 operating on the user device 3600, as illustrated in FIG. 36B. As a result, the autonomous vehicle system 3602 is able to identify a map tile corresponding to the GPS location of the user device 3600 and may update the map tile in real time if the user decides to move to a different location before being picked up.

Through the AV service application 3620, a user may request a ride through various methods. For example, a user may be provided an interactive map on the AV service application 3620 through which the user may "drop" a pin, or selectively interact with a user interface to point to a location on the map where the user would like to be transported. In one embodiment, the interactive map may be a 2D map on a Cartesian plane. In an embodiment, a user may also input a destination address through a user interface. In a further embodiment, the interactive map may include a 3D map that uses fused sensor data, such as LIDAR sensor data, map data, and GPS data, to provide the user with another interface with which to specify a destination. For example, the user may desire to be dropped off in front of a coffee shop located near a movie theatre, but may not know the exact address of the coffee shop. By providing a 3D map to a user device 3600, the user may simple point to and select the coffee shop, or the exact location where he or she wishes to be dropped off.

The autonomous vehicle system 3602 may arrive at the location provided by the user device 3600 for initiating the ride request. As the autonomous vehicle system 3602 arrives at the location, a visual identification system 3652, illustrated in FIG. 36A, may actively scan the surrounding locale to locate and identify the user, in one embodiment. For example, using the perception system of the AV system 3602, the visual identification system 3652 may identify various persons located at the location provided in the ride request. In another embodiment, the visual identification system 3652 may use various sensors, including cameras mounted on the exterior of the AV system 3602. A user may be required to present a visual identifier, bar code, quick response (QR) code, or other visual code to the AV system 3602 such that the visual identification system 3652 may identify that the user is authorized to enter the AV system 3602.

A passenger security system 3650 may secure the AV system 3602 by locking the doors until the user requesting the AV system 3602 is verified and authenticated by the visual identification system 3652, in one embodiment. The passenger security system 3650 may use other methods of user identification, including providing a randomized security code to the user device 3600 to enter into the AV service application 3620 for verification, facial recognition of the user as stored in a profile associated with the user device 3600, voice recognition of the user as stored in a profile associated with the user device 3600, and other biometric authentication systems, such as fingerprint and/or retinal scans. After the user is verified, the passenger security system 3650 may enable the user to enter the AV system 3602 by unlocking the door and/or opening the doors. In one embodiment, after a user is verified, one or more stored configurations of parameters for features of the AV system 3602 may be automatically changed.

Once inside the AV system 3602, a user may control various features of the AV system 3602 from the user device 3600, including an interior lighting control system 3604, an ambient sound system 3606, a temperature control system 3608, a road handling preferences module 3610, a rerouting request system 3616, and a seating control system 3618. These preferences and/or configurations may be stored in association with the user and/or the user device 3600, in one embodiment. Various lighting modes may be initiated through the user device 3600, such as a normal mode, party mode, romantic mode, and sleep mode. These lighting modes may be preprogrammed, in an embodiment. Lighting choices, such as color, brightness, flashing lights, and lighting sequences may be individually altered through a lighting panel accessible through the user device 3600. Upon making a change to a lighting parameter, the interior lighting control system 3604 included in the AV system 3602 makes the adjustment accordingly.

Similarly, an ambient sound system 3606 includes an ability for the user to control what sounds may be heard in the AV system 3602. For example, a silent mode may be used to cancel noise. The user may be enabled to stream music through the ambient sound system 3606 in an embodiment, such as SPOTIFY, ITUNES, or another multimedia resource, including media stored on the user device 3600 by directly synchronizing communications between the user device 3600 and the AV system 3602. In another embodiment, the user may be allowed to perform hands-free calling through the ambient sound system 3606 through a similar communication link. Individual sound parameters of the ambient sound system 3606 may be controlled through the user device 3600, such as volume control and equalizer levels, in an embodiment.

A temperature control system 3608 may control an interior temperature of the AV system 3602 through heating and cooling elements, such as a heater and an air conditioning unit, of the AV system 3602. In one embodiment, the user may set a desired temperature for the AV system 3602 through the user device 3600. In another embodiment, the user may adjust individual parameters, such as fans, vents, cooling, heating, outside air, recycled air, and air fresheners.

A road handling preferences module 3610 may provide the user with the ability to specify a mode of travel, including a smooth ride, a sporty ride, and a normal setting, in one embodiment. A smooth ride may adjust the suspension of the AV system 3602 such that less bumps and turbulence is felt during the ride. The smooth ride mode may also specify that the user desires less aggressive maneuvering, such as not changing directionality of the vehicle unless needed for the safe operation of the AV system 3602. A sporty ride, on the other hand, may be selected by the user, through the user device 3600, to configure the AV system 3602 with a tighter suspension and setting a preference for more aggressive steering and maneuvering, such as taking tighter corners on turns. In one embodiment, the sporty ride mode may be enhanced by measuring the gravity forces (G-forces) experienced by passengers riding in the AV system 3602 through IMU units and/or accelerometers housed in the AV system 3602. A normal setting may be a default setting, in one embodiment.

A rerouting request system 3616 may handle requests from a user to change various features of current ride request being executed by the AV system 3602. For example, the user may change a destination of the AV system 3602 to a different destination. As another example, the user may request to add additional passengers and reroute the current ride to pick up the one or more additional passengers at additional stops. In another embodiment, the user may request multiple stops to be added to the current ride, specifying the locations of the different stops through the user device 3600. In one embodiment, a user may request to avoid traffic, avoid highways, and/or avoid construction through the user device 3600. In yet another embodiment, the user may request that the route be changed to a more scenic route that includes one or more various landmarks that may be of interest to the user and/or other passengers in the AV system 3602. The request to change the route may be sent to a planner of the AV system 3602 and may require approval before being confirmed. For example, the battery of the AV system 3602 may need recharging before the new route could be completed. The planner may generate new trajectories and decide whether the new destination or changes to the route may be completed while operating within safe parameters. In one embodiment, teleoperator assistance may be requested by the AV system 3602 to confirm the route changes. In a further embodiment, the route change may affect the demand of other AV systems such that the dispatch module 3654 is notified of the route change. In other embodiments, rerouting requests are reported and recorded by the AV service 3660.

A seating control system 3618 may enable a user to adjust a seat configuration of the AV system 3602. For example, seats may be folded down to provide more room for luggage or other large items. A car seat may be needed, in one embodiment, to transport a baby, in an embodiment. The car seat may require a certain seating configuration, as controlled by the seating control system 3618. Other parameters of the seating may also be controlled through the user device 3600, such as lumbar support, seat heating and/or cooling elements, and/or vibration elements. In one embodiment, the seating may be arranged to create a bed-like configuration for the user to sleep. The user may select these various configurations from the user device 3600 such that the configurations are transmitted to the AV system 3602 for the seating control system 3618 to actuate the changes in the seating parameters within the AV system 3602. In one embodiment, the seats are electronically controlled by the seating control system 3618 through various motors and/or mechanisms.

The user and/or other passengers in the AV system 3602 may also directly interact with the autonomous vehicle system 3602 through an autonomous voice response system ("AVRS") 3612 and an emergency user interface terminal 3614. An emergency user interface terminal 3614 may include physical buttons that may be actuated and/or depressed by a user or other passengers within the AV system 3602. One button may be provided on the emergency user interface terminal 3614 to signal to the AV system 3602 that the user wants to stop and exit the vehicle immediately. While the emergency stop button may not physically stop the car, it sends a signal to on-board logic, such as a planner, that the user wants to stop immediately. In one embodiment, the planner will determine whether the surrounding environment and/or driving context is safe for a stop, such as whether the AV system 3602 is traveling along a highway in traffic, and so forth. An exit strategy may be determined and formulated by the planner in response to the emergency stop button being pressed by the user such that the AV system 3602 comes to a stop in a safe manner. Upon stop, the AV system 3602 may unlock and open the doors and notify the AV service 3660. Another button on the emergency user interface terminal 3614 may be reserved for the user to communicate with a teleoperator and/or customer service representative to report a problem or issue with the AV system 3602. The user may then communicate with the teleoperator and/or customer service representative through a microphone and speakers installed in the AV system 3602. The communications may be transmitted to the teleoperator and/or customer service representative through the AV service 3660. The teleoperator and/or customer service representative may then be able to address the issues presented by the user and/or other passengers in the AV system 3602.

An autonomous voice response system ("AVRS") 3612 may be provided by the AV system 3602 to enable an artificially intelligent vehicle assistant to enhance the user experience of the AV system 3602. In one embodiment, the AVRS 3612 responds to a name, such as "ZOTO," to initiate the voice response system. For example, a user of the AV system 3602 may inquire "ZOTO, when will we arrive?" This statement may be processed by the AVRS 3612 through various modules, such as a natural language processor, to identify the content of the question and/or command. In this case, the user desires to know the expected time of arrival (ETA). An ETA may be determined based on information provided to a planner of the AV system 3602, including traffic conditions, known route distance and expected travel velocity, in one embodiment. In another embodiment, an ETA may be determined by an AV service 3660 based on previous completed routes similar to the route being executed by the AV system 3602. This ETA metric may be provided by the AVRS 3612 through the ambient sound system 3606 and/or speakers installed in the AV system 3602, in one embodiment. In another embodiment, the ETA may be provided through the user device 3600. In other embodiments, a different call to action or tag may be used, such as "HEY ZOTO" and/or a user specified name.

Other information useful to the user may be provided through the AVRS 3612, such as current speed, location, points of interest nearby, and so forth. The user may also interact with the AVRS 3612 instead of through the user device 3600 to control one of the various sub-systems described above, such as the interior lighting control system 3604, the ambient sound system 3606, the temperature control system 3608, the road handling preferences module 3610, the emergency user interface terminal 3614, the rerouting request system 3616, the seating control system 3618, the passenger security system 3650, and/or the visual identification system 3652. For example, the user may wish to lower the lighting, stream a playlist from his or her user device 3600, and have a smooth ride by simply requesting these changes through voice commands. In one embodiment, commands and/or questions posed to the AVRS 3612 may be transmitted to a teleoperator and/or customer service representative for deciphering a response. The response may be inputted as text and spoken through the AVRS 3612 such that the user may not be aware that the response was generated by a teleoperator and/or customer service representative. In another embodiment, the AVRS 3612 includes artificial intelligence (AI) systems and processes that enable a response to be generated on the fly from within the AV system 3602.

Similarly, the AVRS 3612 may provide an interface for the user to redirect and/or reroute the AV system 3602. For example, the user may present various commands, such as adding a stop, changing the destination of the ride, picking up new passengers, dropping off passengers, and so forth. The rerouting request system 3616 may interpret the commands, passed along by the AVRS 3612 and request confirmation of the changes to the ride. Confirmation may appear on the user device 3600, in one embodiment. In another embodiment, confirmation may be requested through the AVRS 3612 through the microphone(s) and speakers installed in the AV system 3602.

The rerouting request system 3616 may receive requests to change the route or otherwise alter various parameters of the ride, such as passengers, stops, and so forth, through the user device 3600 further illustrated in FIG. 36B. User device 3600 may include an AV service application 3620 which may include a communication synchronizing module 3622, a vehicle locator system 3624, a payment method module 3626, a social networking module 3628, a vehicle request module 3630, a vehicle booking module 3632, a customer satisfaction module 3634, and an entertainment interface module 3636. The user device 3600 may also include other applications and modules, such as a GPS module 3640, one or more social media application(s) 3642, multimedia application(s) 3644, and communication application(s) 3646.

The rerouting request system 3616 may receive text input or a selection through a user interface provided by the AV service application 3620. For example, a change to the route may be requested through adding a new destination address, inputted into the user interface provided by the AV service application 3620. In another embodiment, a map may be provided in a user interface provided by the AV service application 3620, where the user may simply point to a new destination on the map. In a further embodiment, a user may select various attractions or other points of interest on the map, such as a coffee shop, to indicate to the AV system 3602 that a change of destination is requested. A user interface may also be provided by the AV service application 3620 to enable the user to add passengers, such as friends on a social media application 3642, add stops, and/or avoid traffic.

The user interface provided by the AV service application 3620 may also enable a user to access various features of the application, such as a communication synchronizing module 3622, a vehicle locator system 3624, a payment method module 3626, a social networking module 3628, a vehicle request module 3630, a vehicle booking module 3632, a customer satisfaction module 3634, and an entertainment interface module 3636. A communication synchronizing module 3622 may be used to form a direct communication link between the AV system 3602 and the user device 3600 through one or more various communication protocols, such as BLUETOOTH and/or WIFI. The communication synchronizing module 3622 may enable the user to stream media, such as music and video, through the AV system 3602 as well as place and conduct hands-free calling. The communication synchronizing module 3622 may connect the AV system 3602 with other applications and/or modules on the user device 3600, such as the GPS module 3640, social media application(s) 3642, multimedia application(s) 3644, and/or communications application(s) 3646. For example, a user may stream a video conference call through speakers and microphone(s) of the AV system 3602. In one embodiment, the AV system 3602 may also include video screens available for connection through the communication synchronizing module 3622.

A vehicle locator system 3624 may provide a location of the AV system 3602 through a map provided on a user interface on the AV service application 3620. The vehicle locator system 3624 may use GPS location information obtained from the GPS module 3640 of the user device 3600, in one embodiment, to provide the location of the AV system 3602 in relation to the user. The location of the AV system 3602 may be provided to the user device 3600 based on continuously captured data from the sensors of the AV system 3602, such as GPS, LIDAR sensors, map tile data, IMUs and so forth. In one embodiment, the sensor data is fused into a data stream that provides data indicating the location of the AV system 3602 that is provided to the user device 3600 through the vehicle locator system 3624. In one embodiment, the vehicle locator system 3624 may provide locations of various AV systems 3602 that are located near the user based on the GPS information obtained from the GPS module 3640 of the user device 3600 and information provided by the dispatch module 3654. In this way, the near real-time location of AV systems 3602 may be provided to the user device 3600. This information may be presented on a map as the user attempts to reserve and/or request a ride through the AV service 3660.

A payment method module 3626 may enable a user to enter and/or modify payment information for the AV service application 3620, such as credit card information. A user may enable the AV service application 3620 to connect with other applications that manage payments, such as PAYPAL, VENMO, and the like, in one embodiment. Other payment methods, such as BITCOIN, may be accepted through the payment method module 3626, in an embodiment.

A social networking module 3628 may enable users of the AV service application 3620 to capture text, images, and content for sharing as posts on various social media applications 3642. In one embodiment, the user may be provided with camera data that was captured by the AV system 3602, such as a view of the Golden Gate Bridge. This photo may be presented through the AV service application 3620 through an entertainment interface module 3636, for example, and shared among various social networking channels, such as FACEBOOK, TWITTER, EMAIL, and the like, through the social networking module 3628 and/or communication applications 3646, such as text or messaging applications. Other information about the ride may be shared, such as the route, LIDAR data captured by the AV system 3602, other data captured from sensors, and so forth. In one embodiment, a vehicle may have a social networking presence such that the vehicle may be "added" as a friend on a social networking application 3642. In another embodiment, a ride may be shared with other passengers who are users of the AV service 3660 but may not be friends or acquaintances. Through the social networking module 3628, contact information and/or social networking information may be shared among the riders in the AV system 3602, in an embodiment.

A vehicle request module 3630 may provide functionality for the user to request a ride, enabling the user to enter various information items about the requested ride, such as number of passengers, number of stops, and destination(s). In one embodiment, the current location of the user is used as the origin location where the user will be picked up. In another embodiment, the user may input an origin location that is different from the current location of the user as determined by the GPS module 3640 and/or other location awareness devices. Through the vehicle request module 3630, a request for a ride may be sent to a dispatch module 3654 of the AV service 3660.

A vehicle booking module 3632 may be used to set an appointment or reserve an AV system 3602 at a future date and origin location. For example, the vehicle booking module 3632 may reserve a ride to the San Francisco Airport from a user's home at 5 AM, even though the user is not located at home at the time of the booking. In one embodiment, a vehicle booking module 3632 may store repeated rides, such as a ride to work from home at a certain time, a ride home from work, and so forth. A customer satisfaction module 3634 may enable a user to provide feedback about the AV system 3602 and/or the AV service 3660 through the AV service application 3620. This may include ratings, comments, and so forth.

An entertainment interface module 3636 may provide games, music, and/or other media to interface with the AV system 3602. For example, music may be streamed through the user device 3600 to the AV system 3602 through a direct link established through the communication synchronizing module 3622. In an embodiment, the music may be directly controlled through the AV service application 3620. In another embodiment, data from the AV system 3602 may be used in a game provided through the entertainment interface module 3636, such as a game to identify nearby landmarks, trivia games about local history, and so forth. In one embodiment, the entertainment interface module 3636 may include a tour guide style interface for the user to interact with through the AV service application 3620. In another embodiment, this tourist information may be overlaid on 3D point cloud data and/or camera data captured by the AV system 3602 and presented on a user interface on the AV service application 3620. The overlaid information may be presented as the AV system 3602 is travelling through the environment, in an embodiment. In a further embodiment, this information may be presented on one or more screens installed in the AV system 3602 or projected onto a surface on the AV system 3602.

In another embodiment, the entertainment interface module 3636 may interact with other sub-systems, such as the interior lighting control system 3604, to provide entertainment and/or other effects. For example, an external application on the user device 3600, such as a multimedia application 3644, may be programmed to control the interior lighting control system 3604 of the AV system 3602 through the entertainment interface module 3636 such that a light sequence may be timed according to music being played through the multimedia application 3644. As another example, a temperature control system 3608 and an ambient sound system 3606 may be controlled by an entertainment interface module 3636 to provide sound effects and/or ambiance for a scary story being presented through a video, streamed through the AV system 3602.

Figure 37:
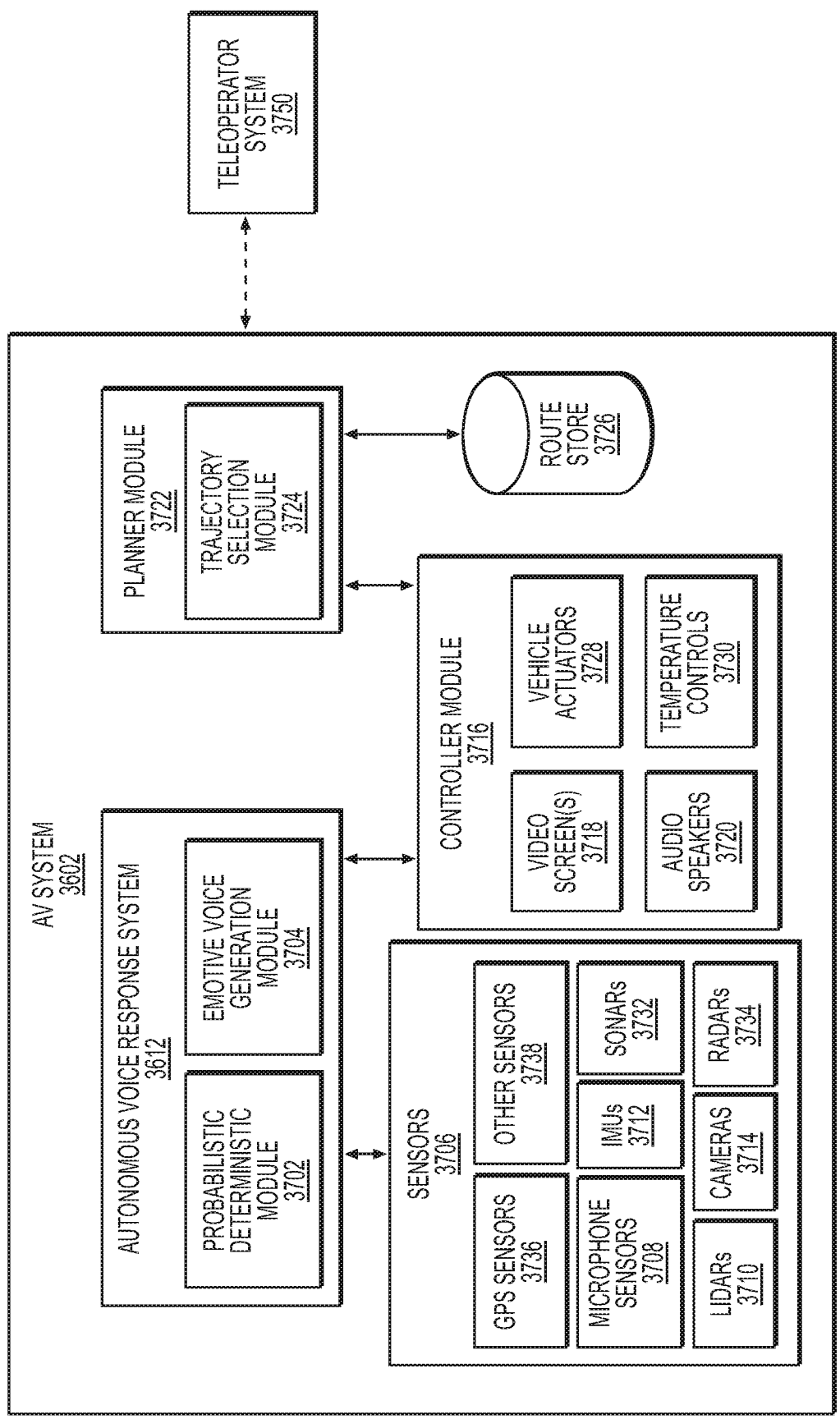
FIG. 37 illustrates a high-level block diagram of requesting control of various features of an autonomous vehicle system, according to various embodiments.

FIG. 37 illustrates a high-level block diagram of requesting control of various features of an autonomous vehicle system, according to various embodiments. In one embodiment, the autonomous vehicle system 3602 ("AV system") may include an autonomous voice response system 3612 that includes a probabilistic deterministic module 3702 and an emotive voice generation module 3704. The AV system 3602 may also include a planner module 3722 that includes a trajectory selection module 3724. The AV system 3602 may also include a controller module 3716 that controls various physical aspects of the AV system 3602, such as video screen(s) 3718, vehicle actuators 3728, audio speakers 3720, and temperature controls 3730.

Sensors 3706 in the AV system 3602 may include microphone sensors 3708, LIDAR sensors 3710, RADAR sensors 3734, IMUs 3712, cameras 3714, GPS 3736, SONAR sensors 3732, and other sensors 3738. The AV system 3602 may rely on the sensors 3706 and "fuse" the data generated by the heterogeneous types of sensors, such as data from LIDAR sensors 3604 and motion data from IMUs 3712, in one embodiment. A localizer, not pictured, may generate a probabilistic map of the current environment, assigning probability scores to labeled objects in the field of perception. Sensor data may be used by the AVRS 3612 in making decisions on how to respond to various questions and/or commands.

An autonomous voice response system 3612 may include a probabilistic deterministic module 3702 that generates one or more probabilistic models for interpreting and responding to questions and/or commands. The AVRS 3612 may include a natural language processing system (not pictured) that may be used to recognize speech. In other embodiments, voice recognition systems may be used in conjunction with the probabilistic deterministic module 3702 to assign probabilities to different words spoken and/or extracted from speech directed at the AV system 3602. Once a question and/or command is deciphered through various probabilistic methods, a response may be similarly generated by the probabilistic deterministic module 3702.

A typical method for determining a response to a question or command involves an initial guess that converges towards an optimal response through a series of step-wise increments, using generative probabilistic models. Because a search is computationally expensive, a heuristic rule may be used to arrive at a response that is acceptable.

In another embodiment, the probabilistic deterministic module 3702 may send a request to a teleoperator system 3750 requesting assistance in responding to the question or command. A teleoperator system 3750 may be contacted by an AV system 3602, optionally, in relation to any user experience issue, including a request inputted via a user device 3600, a voice command intercepted through the AVRS 3612, and/or a button actuated at a terminal inside the AV system 3602. For example, a voice command for "HELP" may be detected by the AVRS 3612. The AVRS 3612 may engage in a dialogue with the user to identify what kind of help is needed. In another embodiment, the AV system 3602 directly connects to a teleoperator system 3750 with the data received to establish a voice conference. The teleoperator system 3750 may be presented with the current trajectory and/or route of the AV system 3602 as well as other operational parameters, such as current battery level, computational processing efficiency, and/or storage capacity, for example. Through an interface provided on the teleoperator system 3750, a teleoperator may identify what help is needed or whether the command was issued by mistake by engaging in conversation with the user through the speakers 3720 and microphone sensors 3708, in one embodiment.

An emotive voice generation module 3704 may generate one or more different types of voices for the AVRS 3612. In one embodiment, a voice may be generated based on an algorithm that specifies various sounds to map to various emotions, such as excited, happy, sad, confused, angry, and so on. In another embodiment, the emotive voice generation module 3704 may use a predetermined set of sound effects that are mapped to these emotions. In a further embodiment, the emotive voice generation module 3704 may map positive emotions to higher frequency sounds and/or voices of the AVRS 3612, while negative emotions may be mapped to lower frequency sounds and/or voices.

A planner module 3722 may include a trajectory selection module 3724 that may select among various routes stored in a route store 3726, in one embodiment. In one embodiment, trajectories may be generated to include an expected time of arrival (ETA). Trajectories may be optimized to reduce the transit time such that an optimal expected time of arrival, based on current traffic conditions, known construction areas, and regulated speed limits for portions of the route. The ETA may be stored in association with a generated trajectory in one embodiment. For example, a user may request transit between work and home locations such that the route is stored in a route store 3726 for the user. Once the user requests the same route, a trajectory may automatically be selected by the trajectory selection module 3724. In another embodiment, an AV system 3602 may be requested to change a route by either adding stops, picking up or dropping off passengers at various locations, and so forth. An optimized route may be determined by a planner module 3722 based on current traffic conditions, such that the optimized route may be stored in the route store 3726. In one embodiment, routes stored locally at the AV system 3602 may be shared with other AV systems 3602 and/or the AV service 3660.

Figure 38:
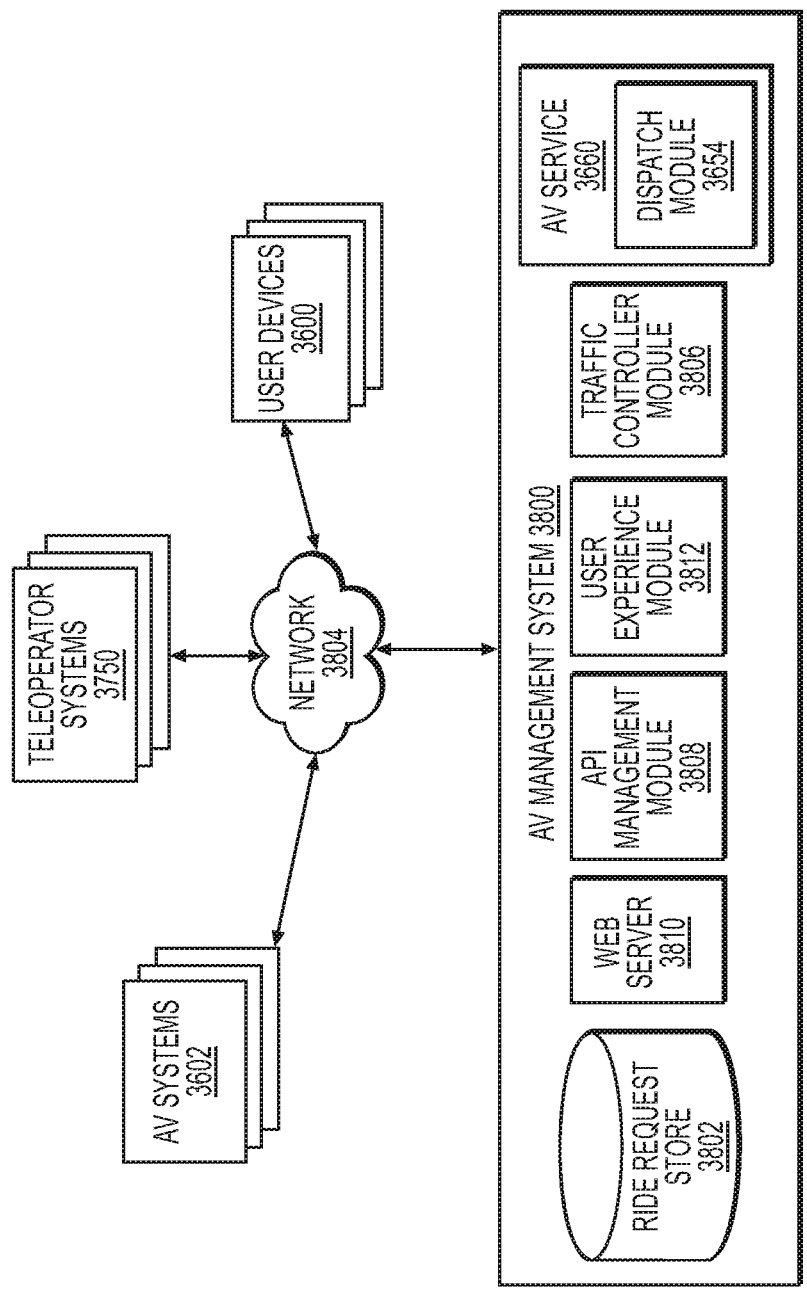
FIG. 38 is a network diagram of a system for requesting and controlling an autonomous vehicle system through an autonomous vehicle service, showing a block diagram of an autonomous vehicle management system, according to an embodiment.

FIG. 38 is a network diagram of a system for requesting and controlling an autonomous vehicle system through an autonomous vehicle service, showing a block diagram of an autonomous vehicle management system, according to an embodiment. The system environment includes one or more AV systems 3602, teleoperator systems 3750, user devices 3600, an autonomous vehicle ("AV") management system 3800, and a network 3804. In alternative configurations, different and/or additional modules can be included in the system.

The user devices 3600 may include one or more computing devices that can receive user input and can transmit and receive data via the network 3804. In one embodiment, the user device 3600 is a conventional computer system executing, for example, a Microsoft Windows-compatible operating system (OS), Apple OS X, and/or a Linux distribution. In another embodiment, the user device 3600 can be a device having computer functionality, such as a personal digital assistant (PDA), mobile telephone, smart-phone, wearable device, etc. The user device 3600 is configured to communicate via network 3804. The user device 3600 can execute an application, for example, a browser application that allows a user of the user device 3600 to interact with the AV management system 3800. In another embodiment, the user device 3600 interacts with the AV management system 3800 through an application programming interface (API) that runs on the native operating system of the user device 3600, such as iOS and ANDROID.

In one embodiment, the network 3804 uses standard communications technologies and/or protocols. Thus, the network 3804 can include links using technologies such as Ethernet, 802.11, worldwide interoperability for microwave access (WiMAX), 3G, 4G, CDMA, digital subscriber line (DSL), etc. Similarly, the networking protocols used on the network 3804 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 38 contains a block diagram of the AV management system 3800. The AV management system 3800 includes a ride request store 3802, a web server 3810, an API management module 3808, a user experience module 3812, a traffic controller module 3806, and an AV service 3660 including a dispatch module 3654. In other embodiments, the AV management system 3800 may include additional, fewer, or different modules for various applications. Conventional components such as network interfaces, security functions, load balancers, failover servers, management and network operations consoles, and the like are not shown so as to not obscure the details of the system.

The web server 3810 links the AV management system 3800 via the network 3804 to one or more user devices 3600; the web server 3810 serves web pages, as well as other web-related content, such as Java, Flash, XML, and so forth. The web server 3810 may provide the functionality of receiving and routing messages between the AV management system 3800 and the user devices 3600, for example, instant messages, queued messages (e.g., email), text and SMS (short message service) messages, or messages sent using any other suitable messaging technique. The user can send a request to the web server 3810 to provide information, for example, images or videos that are stored in the AV management system 3800 for viewing by the user device(s) 3600. Additionally, the web server 3810 may provide API functionality to send data directly to native user device operating systems, such as iOS, ANDROID, webOS, and RIM.

An API management module 3808 may manage one or more adapters needed for the AV management system 3800 to communicate with various systems, such as teleoperator systems 3750 and user devices 3600. Application programming interfaces (APIs), or adapters, may be used to push data to external tools, websites, and user devices 3600. Adapters may also be used to receive data from the external systems. In one embodiment, the API management module 3808 manages the amount of connections to the external systems needed to operate efficiently.

A user experience module 3812 may manage user experiences in requesting and controlling AV systems 3602 through an AV service 3660. For example, the user experience module 3812 may direct unintelligible commands received by an AV system 3602 through an AVRS 3612 to one or more teleoperator systems 3750 seamlessly such that responses may be formulated in real time, in one embodiment. In another embodiment, the user experience module 3812 may aggregate various complaints and/or feedback captured from user devices 3600 to identify process improvements that may be implemented across the AV systems 3602.

A traffic controller module 3806 may analyze routes requested by users and determine where to dispatch AV systems 3602 based on demand and/or anticipated demand. For example, based on an analysis of rides stored in a ride request store 3802, a traffic controller module 3806 may generate one or more probabilistic models to identify surges in ride requests, origin and destination locations generating ride requests, and number of AV systems 3602 needed to cover demand. Based on this information, an optimal number of AV systems 3602 may be dispatched by a dispatch module 3654 of an AV service 3660 to the various locations, further optimizing the user experiences of users of the AV service 3660.

Figure 39:
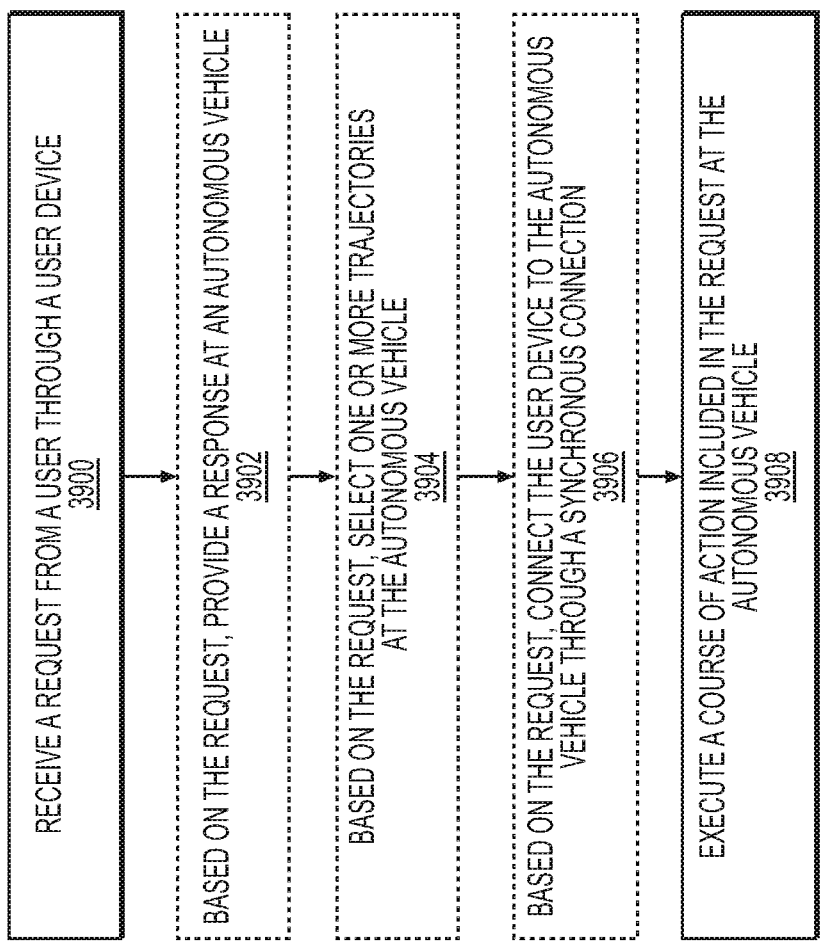
FIG. 39 is a high-level flow diagram illustrating a process for request and control of an autonomous vehicle service, according to some examples.

FIG. 39 is a high-level flow diagram illustrating a process for request and control of an autonomous vehicle service, according to some examples. A request from a user through a user device may be received 3900. The request may be for an autonomous vehicle to pick up the user, for example. The request may be, in another example, a request to change some configurable feature of the autonomous vehicle system, such as the lighting, temperature, road handling, seat configuration, and/or ambient sound system. In another embodiment, the request may be to reroute an existing ride to a different location, to pick up or drop off passengers, to add or remove stops from the ride, or otherwise modify a trajectory of the ride.

Optionally, a response may be provided 3902 at an autonomous vehicle based on the request. If the request is a request to modify or change a parameter of a feature of the vehicle, such as lighting, temperature, road handling, seat configuration, and/or sound system, the response that may be provided 3902 may be a confirmation of the request at the autonomous vehicle, such as a voice response confirming the change. If the request is a request to change a parameter affecting the trajectory or route of the AV system, a response that may be provided 3902 may include a confirmation of the request.

Optionally, based on the request, one or more trajectories may be selected 3904 at the autonomous vehicle. This selection of a trajectory may follow a request to reroute the AV system, for example. The one or more trajectories that may be selected 3904 may be formulated by a planner of the AV system and/or a teleoperator system in communication with the AV system.

Also optionally, based on the request, the user device may be connected 3906 to the autonomous vehicle through a synchronous connection. For example, the request received 3900 from the user may be a request to stream music from the user device to the AV system. In that case, a synchronous connection may be required such that user device is connected 3906 directly to the autonomous vehicle. As described above, such a connection may be through BLU- ETOOTH or another communication protocol. Additionally, the user device may be connected 3906 to the autonomous vehicle for other reasons, such as the user requesting to make a phone call through the autonomous vehicle or streaming other content through the vehicle, such as photo or video content.

A course of action included in the request may then be executed 3908 at the autonomous vehicle. As mentioned above, the request may include a voice command to play a playlist by BRITNEY SPEARS, for example. Once the command is deciphered, the course of action may be to stream the playlist through the speakers in the AV system.

Figure 40:
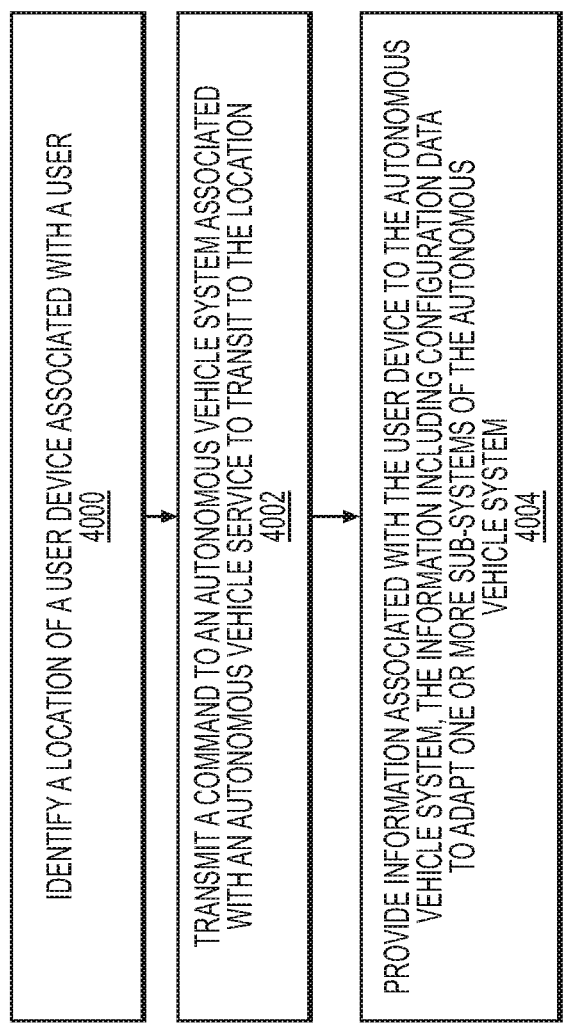
FIG. 40 is a high-level flow diagram illustrating a process for providing an autonomous vehicle service, according to some examples.

FIG. 40 is a high-level flow diagram illustrating a process for providing an autonomous vehicle service, according to some examples. A location of a user device associated with a user may be identified 4000. The location of the user device may be identified 4000 based on a GPS location detected from the user device. A command may be transmitted 4002 to an autonomous vehicle system associated with an autonomous vehicle service to transit to the location. This command may be a dispatch command, for example, that instructs the AV system to travel to the identified location. Information associated with the user device may then be provided 4004 to the autonomous vehicle system, where the information includes configuration data to adapt one or more sub-systems of the autonomous vehicle system. Such information may include the user's preferences for road handling, lighting controls, temperature controls, ambient sound system, seating configurations, and so forth.

Figure 41:
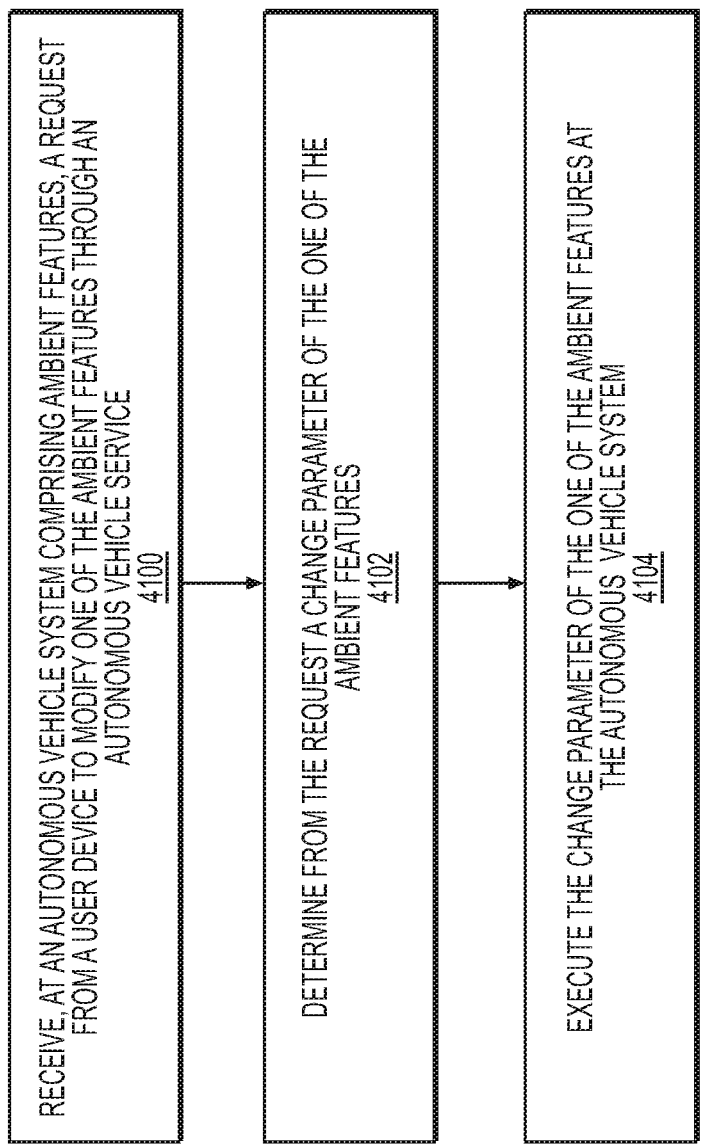
FIGS. 41 to 42 are high-level flow diagrams illustrating processes for request and control of features of an autonomous vehicle service, according to some examples.
Figure 42:
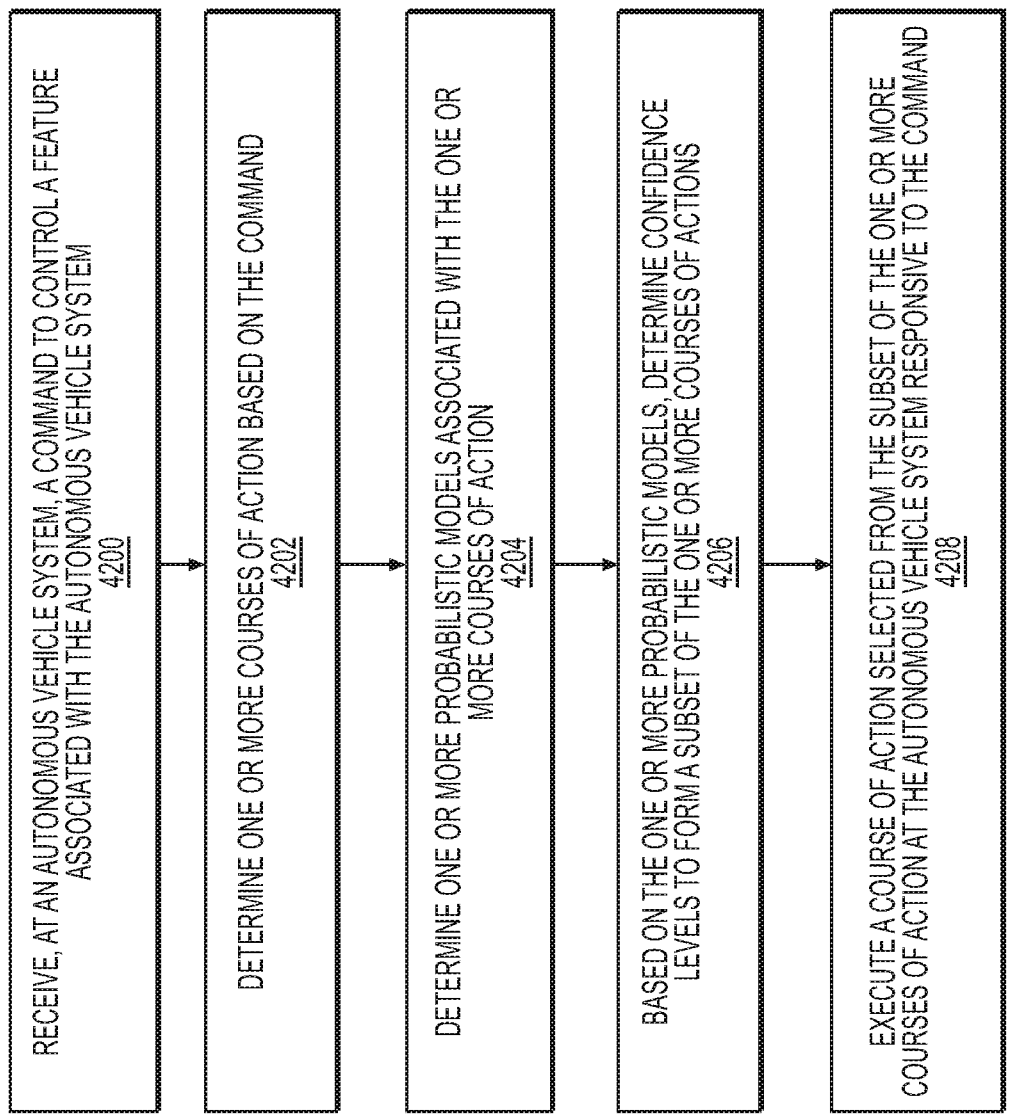

FIGS. 41 to 42 are high-level flow diagrams illustrating processes for request and control of features of an autonomous vehicle service, according to some examples. An autonomous vehicle system comprising ambient features may receive 4100 a request from a user device to modify one of the ambient features through an autonomous vehicle service. For example, the request may be received 4100 at the autonomous vehicle system through the autonomous vehicle service over one or more networks and/or communication channels. A change parameter of the one of the ambient features may be determined 4102 from the request. The change parameter may be determined 4102 through a format of the request, such as the request being captured from the user device operating an application that communicates the request to the autonomous vehicle service. A change parameter may include a selection of a preconfigured mode for a sub-system, in one embodiment. In another embodiment, a change parameter may include a value of an adjustment to the ambient feature of the AV system. The change parameter of the one of the ambient features may then be executed 4104 at the autonomous vehicle system. For example, the temperature may be changed by the temperature control system of the autonomous vehicle responsive to a request to change the temperature to a certain level.

At an autonomous vehicle system, a command may be received 4200 to control a feature associated with the autonomous vehicle system. For example, the command may be received 4200 through an automated voice response system using a microphone installed at the autonomous vehicle system. The command may also be received 4200 from an AV management system through a communication channel. One or more courses of action may be determined 4202 based on the command. For example, if the command may result in an unsafe maneuver or action, a course of action may be to reply that the command is unsafe and will be ignored. As another example, various other courses of action may be determined 4202, such as transiting to a safe location to stop, determining 4202 one or more paths to execute the command, and requesting assistance from a teleoperator. One or more probabilistic models associated the one or more courses of action may be determined 4204. For example, a probabilistic model may be generated for each course of action to determine a likelihood of success in completing the course of action. In another embodiment, various methods may be used to generate probabilistic models for the courses of action, such as Bayesian inference methods, machine learning techniques, heuristics, and random walk analyses.

Based on the one or more probabilistic models, confidence levels may be determined 4206 to form a subset of the one or more courses of action. For example, confidence levels may be determined 4206 based on given data available to the AV system from sensors, log data, as well as other information provided by an AV management system. A course of action selected from the subset of the one or more courses of action may then be executed 4208 at the autonomous vehicle system responsive to the command. In one embodiment, the course of action having a confidence level higher than a predetermined threshold may be executed 4208. In another embodiment, a random selection from the subset may be executed 4208, where the subset of the one or more courses of action have confidence levels higher than a predetermined threshold.

Figure 43:
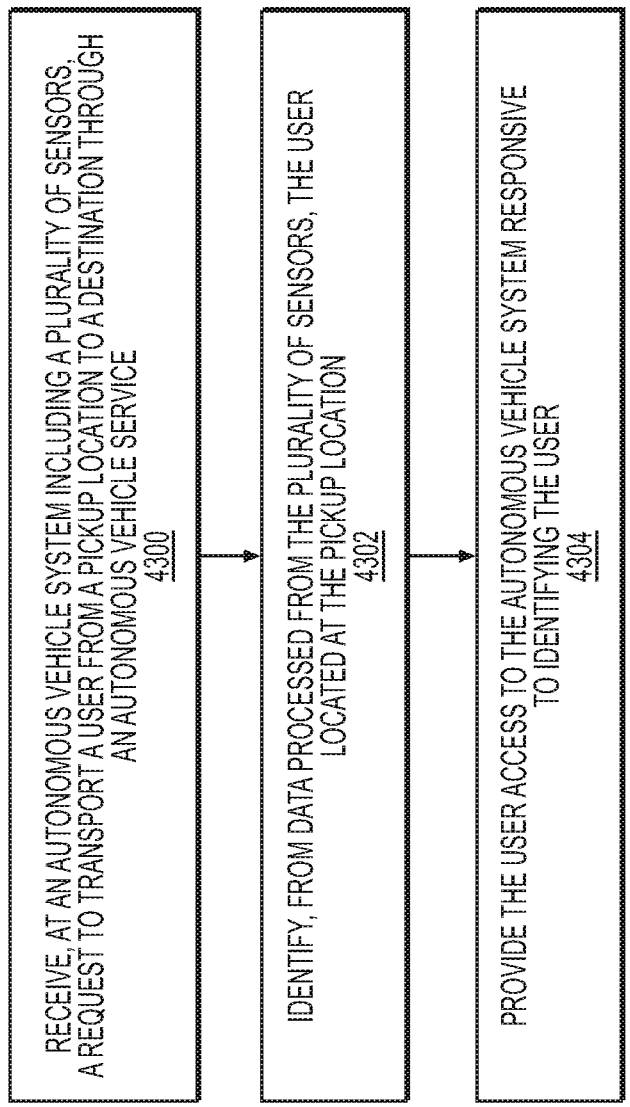
FIG. 43 is a high-level flow diagram illustrating a process for enabling access to an autonomous vehicle service, according to some examples.

FIG. 43 is a high-level flow diagram illustrating a process for enabling access to an autonomous vehicle service, according to some examples. At an autonomous vehicle system including a plurality of sensors, a request to transport a user from a pickup location to a destination may be received 4300 through an autonomous vehicle service. The user located at the pickup location may then be identified 4302 from data processed from the plurality of sensors. The identification process may include facial recognition, visual identification, biometric identification, and/or another authentication process. The user may be provided 4304 access to the autonomous vehicle system responsive to identifying the user. Access may be provided 4304 by opening the doors of the vehicle.

Figure 44:
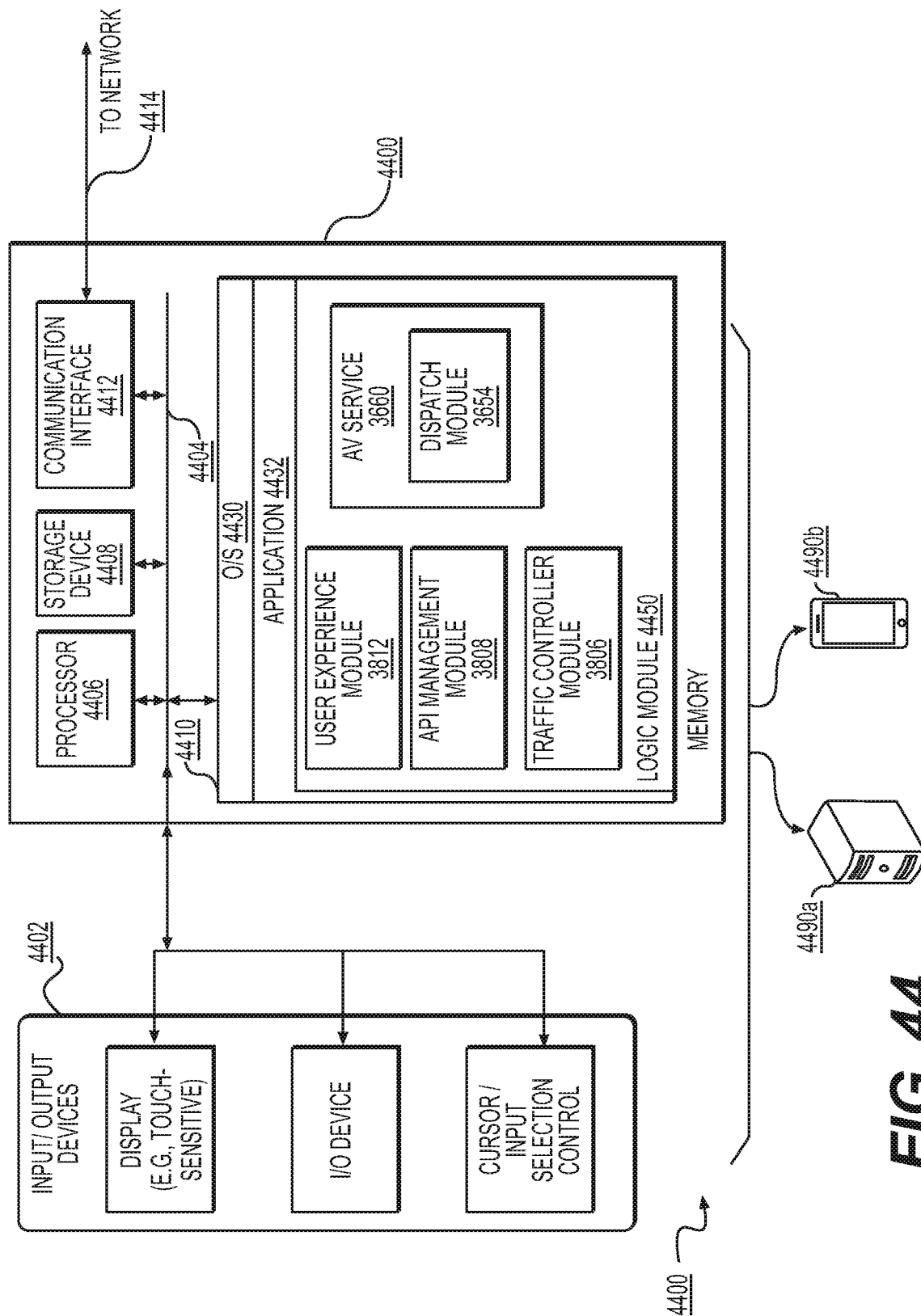
FIGS. 44 to 46 illustrate exemplary computing platforms disposed in devices configured to request and control an autonomous vehicle service in accordance with various embodiments.
Figure 45:
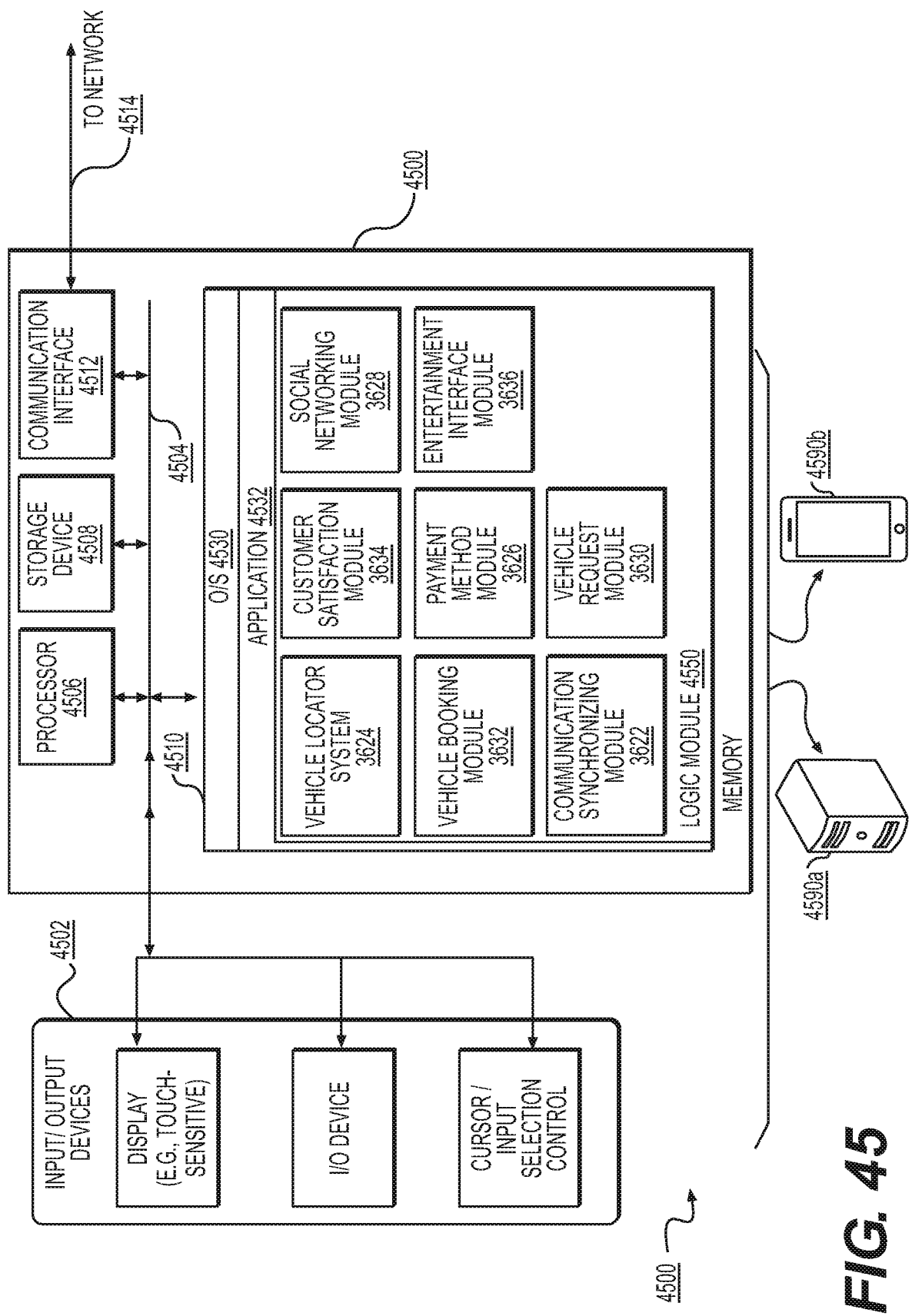
Figure 46:
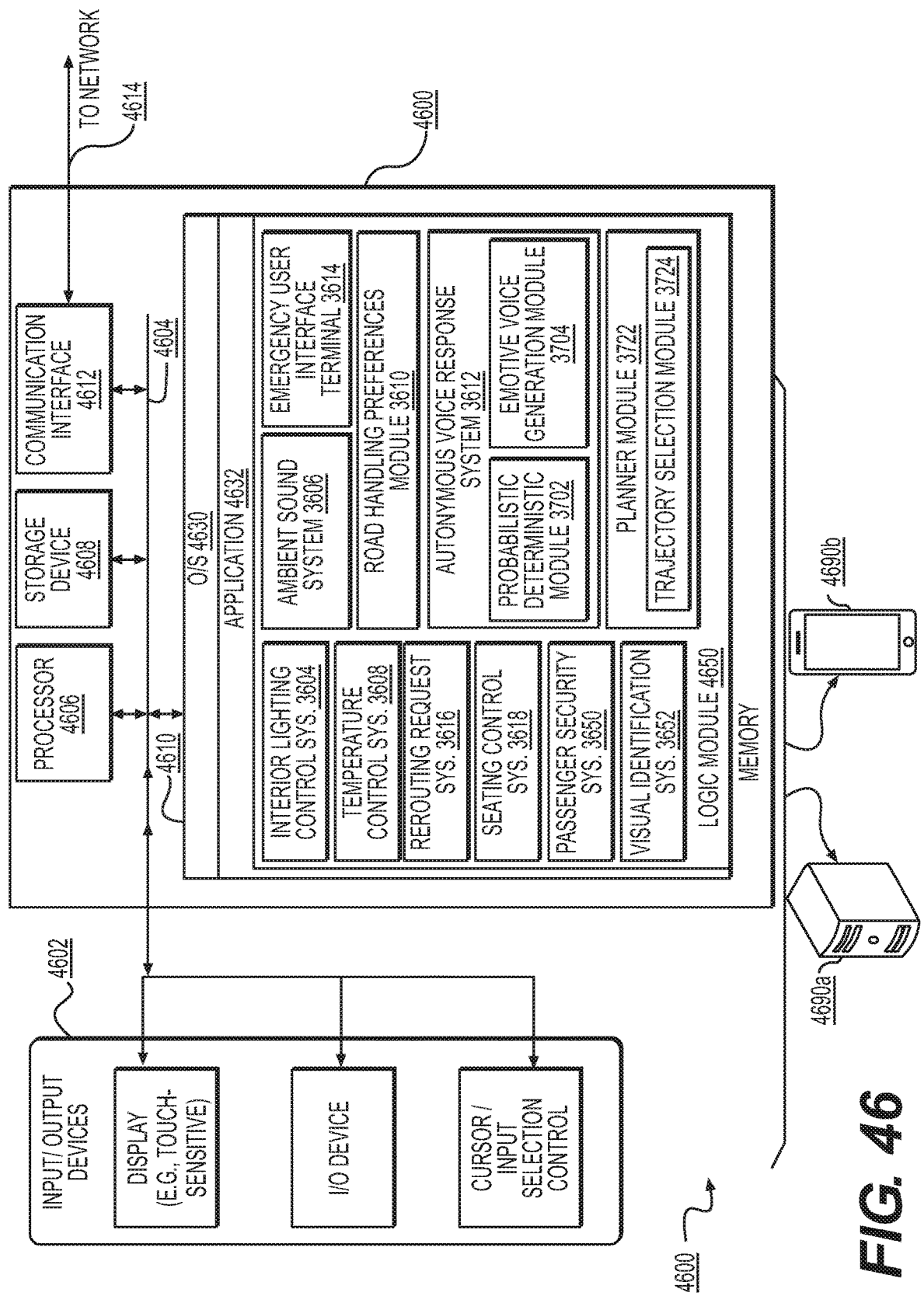

FIGS. 44 to 46 illustrate exemplary computing platforms disposed in devices configured to request and control an autonomous vehicle service in accordance with various embodiments. In some examples, computing platforms 4400, 4500 and 4600 may be used to implement computer programs, applications, methods, processes, algorithms, or other software to perform the above-described techniques.

In some cases, computing platform can be disposed in wearable device or implement, a mobile computing device 4490b, 4590b or 4690b, or any other device, such as a computing device 4490a, 4590a or 4690a.

Computing platform 4400, 4500, or 4600 includes a bus 4404, 4504 or 4604 or other communication mechanism for communicating information, which interconnects subsystems and devices, such as processor 4406, 4506 or 4606, system memory 4410, 4510 or 4610 (e.g., RAM, etc.), storage device 4408, 4508 or 4608 (e.g., ROM, etc.), a communication interface 4412, 4512 or 4612 (e.g., an Ethernet or wireless controller, a Bluetooth controller, etc.) to facilitate communications via a port on communication link 4414, 4514 or 4614 to communicate, for example, with a computing device, including mobile computing and/or communication devices with processors. Processor 4406, 4506 or 4606 can be implemented with one or more central processing units ("CPUs"), such as those manufactured by Intel® Corporation, or one or more virtual processors, as well as any combination of CPUs and virtual processors.

Computing platform 4400, 4500, or 4600 exchanges data representing inputs and outputs via input-and-output devices 4402, 4502 or 4602, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 4400, 4500, or 4600 performs specific operations by processor 4406, 4506 or 4606 executing one or more sequences of one or more instructions stored in system memory 4410, 4510 or 4610, and computing platform 4400, 4500, or 4600 can be implemented in a client-server arrangement, peer-to-peer arrangement, or as any mobile computing device, including smart phones and the like. Such instructions or data may be read into system memory 4410, 4510 or 4610 from another computer readable medium, such as storage device 4408, 4508 or 4608. In some examples, hard-wired circuitry may be used in place of or in combination with software instructions for implementation. Instructions may be embedded in software or firmware. The term "computer readable medium" refers to any tangible medium that participates in providing instructions to processor 4406, 4506 or 4606 for execution. Such a medium may take many forms, including but not limited to, non-volatile media and volatile media. Non-volatile media includes, for example, optical or magnetic disks and the like. Volatile media includes dynamic memory, such as system memory 4410, 4510 or 4610.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 4404, 4504 or 4604 for transmitting a computer data signal.

In some examples, execution of the sequences of instructions may be performed by computing platform 4400, 4500, or 4600. According to some examples, computing platform 4400, 4500, or 4600 can be coupled by communication link 4414, 4514 or 4614 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 4400, 4500, or 4600 may transmit and receive messages, data, and instructions, including program code (e.g., application code) through communication link 4414, 4514 or 4614 and communication interface 4412, 4512 or 4612. Received program code may be executed by processor 4406, 4506 or 4606 as it is received, and/or stored in memory 4410, 4510 or 4610 or other non-volatile storage for later execution.

In the example shown, system memory 4410, 4510 or 4610 can include various modules that include executable instructions to implement functionalities described herein. System memory 4410, 4510 or 4610 may include an operating system ("O/S") 4430, 4530 or 4630, as well as an application 4432, 4532 or 4632 and/or logic module 4450, 4550 or 4650. In the example shown in FIG. 44, system memory 4410 includes a user experience module 3812, an API management module 3808, traffic controller module 3806 and an autonomous vehicle service 3660 that includes a dispatch module 3654. The system memory 4550 shown in FIG. 45 includes a vehicle locator system 3624, a vehicle booking module 3632, a communication synchronizing module 3622, a customer satisfaction module 3634, a payment method module 3626, a vehicle request module 3630, a social networking module 3628, and an entertainment interface module 3636. The system memory 4650 shown in FIG. 46 includes an interior lighting control system 3604, a temperature control system 3608, a rerouting request system 3616, a seating control system 3618, a passenger security system 3650, a visual identification system 3652, an ambient sound system 3606, an emergency user interface terminal 3614, a road handling preferences module 3610, an autonomous voice response system 3612 that includes a probabilistic deterministic module 3702 and an emotive voice generation module 3704, and a planner module 3722 that includes a trajectory selection module 3724. One or more of the modules included in memory 4410, 4510 or 4610 can be configured to provide or consume outputs to implement one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, an autonomous vehicle management system or one or more of its components, or any process or device described herein, can be in communication (e.g., wired or wirelessly) with a mobile device, such as a mobile phone or computing device, or can be disposed therein.

In some cases, a mobile device, or any networked computing device (not shown) in communication with an autonomous vehicle service or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, an autonomous vehicle service or any of its one or more components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, an AV management system, including one or more components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A system comprising:
    an autonomous vehicle configured to drive autonomously on a roadway;
    an imaging sensor disposed on the autonomous vehicle;

one or more processors; and
computer-readable media storing instructions that, when executed by the one or more processors, configure the system to perform acts comprising:
receiving an instruction to navigate to a first location associated with retrieving a passenger;
receiving configuration data associated with the passenger;
controlling the autonomous vehicle to travel to the first location;
controlling a subsystem of the autonomous vehicle in accordance with the configuration data;
receiving, from the imaging sensor, image data associated with the first location:
identifying, from the image data, the passenger at the first location;
sending, to a user device associated with the passenger and with the autonomous vehicle proximate the first location, a request for authentication information;
receiving the authentication information;
controlling the autonomous vehicle, proximate the first location and based at least in part on the authentication information, to at least one of open a door associated with the autonomous vehicle or unlock the autonomous vehicle to permit access to a passenger compartment of the autonomous vehicle; and
controlling the autonomous vehicle to navigate from the first location to a second location.

2. The system of claim 1, wherein the configuration data comprises a setting associated with the subsystem, the acts further comprising:
receiving a command to adjust the subsystem;
controlling the subsystem in accordance with the command; and
updating, based at least in part on the command, the configuration data associated with the passenger.

3. The system of claim 1,
wherein the sending the request for authentication information is at least in part in response to identifying the passenger at the first location, and
wherein the controlling the subsystem is based at least in part on receiving the authentication information.

4. The system of claim 3, wherein the imaging sensor is a camera on the autonomous vehicle, the acts further comprising:
determining that facial features associated in the image data match a profile image associated with the passenger,
wherein the identifying the passenger is based at least in part on the match.

5. The system of claim 3, further comprising:
a microphone associated with the autonomous vehicle, the acts further comprising:
determining, based at least in part on voice recognition performed on an audio signal generated by the microphone, that the audio signal is associated with the passenger,
wherein the identifying the passenger is based at least in part on the audio signal being associated with the passenger.

6. A method comprising:
receiving a location of a user device associated with a user;
receiving, via a user input at the user device, a destination;
generating first instructions to dispatch an autonomous vehicle to the location to transport the user to the destination;
transmitting the first instructions to the autonomous vehicle;
determining, based at least in part on a user profile associated with the user, configuration data;
transmitting the configuration data to the autonomous vehicle, the configuration data being used by the autonomous vehicle to configure one or more subsystems of the autonomous vehicle;
receiving, from a sensor on the autonomous vehicle, sensor data associated with the location of the user device;
identifying, from the image data, the user proximate the location of the user device;
requesting, at least in part in response to the identifying the user and via the user device, authentication data;
receiving, from the user device and with the autonomous vehicle proximate the location, the authentication data; and
based on the authentication data, generating second instructions to at least one of open a door associated with the autonomous vehicle or unlock the autonomous vehicle to permit access of the user to a passenger compartment of the autonomous vehicle.

7. The method of claim 6, further comprising:
transmitting the second instructions to the autonomous vehicle.

8. The method of claim 6, wherein the configuration data is used by the autonomous vehicle to configure the one or more subsystems of the autonomous vehicle prior to the autonomous vehicle arriving at the location associated with the user device.

9. The method of claim 6, further comprising:
receiving one or more previous settings for the one or more subsystems; and
determining the configuration data based at least in part on the one or more previous settings.

10. The method of claim 9, wherein the configuration data comprises at least one of temperature configuration data, lighting configuration data, audio configuration data, or road handling configuration data.

11. The method of claim 6, further comprising:
receiving, from the user device, a second instruction to alter a configuration of the one or more sub-systems of the autonomous vehicle.

12. The method of claim 11, further comprising:
updating the configuration data based on the second instruction.

13. The method of claim 6, wherein the transmitting the configuration information is based at least in part on receiving the authentication information.

14. The method of claim 8, wherein identifying the user comprises:
receiving image data from a camera on the autonomous vehicle; and
determining that facial features in the image data match a profile image associated with the user.

15. The method of claim 8, wherein identifying the user comprises:
receiving audio data from a microphone on the autonomous vehicle; and
determining, based at least in part on voice recognition, that the audio data is associated with the user.

16. A method comprising:
receiving an instruction to navigate to a first location associated with a passenger;
receiving configuration data associated with the passenger;

controlling the autonomous vehicle to travel to the first location;
controlling, prior to the autonomous vehicle arriving at the first location, a subsystem of the autonomous vehicle in accordance with the configuration data;
receiving, from an imaging sensor associated with the autonomous vehicle, image data associated with the first location;
identifying, from the image data, the passenger at the first location;
sending, to a user device associated with the passenger and with the autonomous vehicle proximate the first location, a request for authentication information;
controlling the autonomous vehicle, based at least in part on receipt of the authentication information, to at least one of open a door associated with the autonomous vehicle or unlock the autonomous vehicle to permit access to a passenger compartment of the autonomous vehicle; and
controlling the autonomous vehicle to navigate from the first location to a second location.

17. The method of claim 16, further comprising:
receiving, from the user device, a command to adjust a setting of the subsystem;
controlling the sub-system in accordance with the command; and
updating, based at least in part on the command, the configuration data.

18. The system of claim 16, the acts further comprising:
receiving, from the user device, information about one or more profiles of users connected to the passenger on a social media network; and
determining the second location based at least in part on the one or more profiles.

19. The system of claim 16, wherein the subsystem is associated with an ambient feature of an interior of the autonomous vehicle.

20. The system of claim 16, wherein controlling the subsystem is based at least in part on receiving the authentication information.

* * * * *